(12) United States Patent
Izumiya et al.

(10) Patent No.: US 7,499,072 B2
(45) Date of Patent: Mar. 3, 2009

(54) COLOR IMAGE FORMING APPARATUS AND IMAGE FORMING SYSTEM THEREWITH

(75) Inventors: Kenji Izumiya, Hachioji (JP); Satoshi Ogata, Hachioji (JP); Eiji Nishikawa, Hino (JP); Yumiko Higashi, Kokubunji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 148 days.

(21) Appl. No.: 11/114,966

(22) Filed: Apr. 26, 2005

(65) Prior Publication Data

US 2005/0264646 A1 Dec. 1, 2005

(30) Foreign Application Priority Data

May 28, 2004 (JP) .............................. 2004-159783
Feb. 9, 2005 (JP) .............................. 2005-033165

(51) Int. Cl.
*B41J 2/435* (2006.01)
*B41J 2/47* (2006.01)
*B41J 2/525* (2006.01)

(52) U.S. Cl. .................................................... 347/249

(58) Field of Classification Search ................ 347/234, 347/232, 235, 248–250, 243, 252
See application file for complete search history.

(56) References Cited

U.S. PATENT DOCUMENTS

| | | | | |
|---|---|---|---|---|
| 4,660,077 A | * | 4/1987 | Kawamura et al. ......... 358/515 |
| 5,661,550 A | * | 8/1997 | Ko .............................. 399/45 |
| 6,188,419 B1 | * | 2/2001 | Katamoto et al. .......... 347/129 |
| 6,404,449 B1 | * | 6/2002 | Izumiya ...................... 347/116 |
| 6,421,139 B1 | * | 7/2002 | Takami et al. .............. 358/1.2 |
| 6,700,594 B1 | * | 3/2004 | McCormick et al. ....... 347/116 |
| 6,934,504 B2 | * | 8/2005 | Morita ........................ 399/394 |
| 2002/0159791 A1 | * | 10/2002 | Chen et al. .................. 399/167 |
| 2003/0174200 A1 | * | 9/2003 | Izumiya et al. ............. 347/249 |
| 2004/0086288 A1 | * | 5/2004 | Wibbels ....................... 399/45 |
| 2004/0246541 A1 | * | 12/2004 | Kohara ....................... 358/498 |

FOREIGN PATENT DOCUMENTS

| | | | |
|---|---|---|---|
| JP | 3452166 | | 8/1997 |
| JP | 3458878 | | 9/1997 |
| JP | 2000229443 A | * | 8/2000 |
| JP | 2003-262991 A | | 9/2003 |

OTHER PUBLICATIONS

Tom Harris. "How Laser Printers Work". Mar. 14, 2001 http://computer.howstuffworks.com/laser-printer.htm (Jan. 27, 2007).*

* cited by examiner

*Primary Examiner*—Huan H Tran
(74) *Attorney, Agent, or Firm*—Frishauf, Holtz, Goodman & Chick, P.C.

(57) ABSTRACT

A color image forming apparatus for forming a color image on a recording medium, includes: an image carrier; a polygon mirror; a signal forming device for forming a pseudo main scanning reference signal having a fixed cycle; and a controller for controlling image formation on a predetermined surface of the recording medium on the basis of the pseudo main scanning reference signal formed by the signal forming device and a main scanning reference signal which is formed by detecting a light beam that is scanned by the polygon mirror.

26 Claims, 26 Drawing Sheets

FIG. 7 (A)
MST-IDX 
FIG. 7 (B)
YIDX 
FIG. 7 (C)
YP-CLK 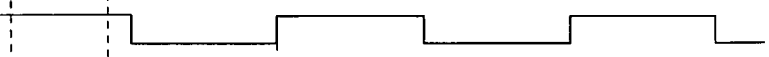
FIG. 7 (D)
CLK1 
DELAYED BY 2 CLK
FIG. 7 (E)
ADVANCE PHASE OF DRIVE CLK BY 2 CLK
YIDX 
FIG. 7 (F)
YP-CLK' 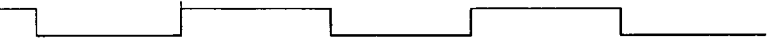

FIG. 9

| | | PLAIN PAPER | | | RECYCLED PAPER | | COATED PAPER | | | OHT (TRANSPARENCY) SHEET | |
|---|---|---|---|---|---|---|---|---|---|---|---|
| | | PLAIN PAPER A | PLAIN PAPER B | ⋯ | RECYCLED PAPER A | RECYCLED PAPER B | COATED PAPER A | COATED PAPER B | ⋯ | OHT A | OHT B |
| FIXING (°C) | FRONT | 200 | 210 | ⋯ | 190 | 190 | 195 | 185 | ⋯ | 190 | 185 |
| | REAR | 200 | 205 | ⋯ | 195 | 185 | 195 | 185 | ⋯ | 190 | 185 |
| TRANSFER (μm) | FRONT | 40 | 30 | ⋯ | 45 | 35 | 50 | 70 | ⋯ | 60 | 65 |
| | REAR | 45 | 35 | ⋯ | 45 | 35 | 50 | 70 | ⋯ | 65 | 65 |
| ⋮ | ⋮ | | | | | | | | | | |
| MAGNIFICATION | FRONT | +0.3 | +0.3 | ⋯ | +0.4 | +0.4 | +0.4 | -0.4 | ⋯ | +0.3 | +0.3 |
| | REAR | -0.5 | -0.6 | ⋯ | -0.6 | -0.7 | -0.6 | -0.9 | ⋯ | -0.5 | -0.5 |

KIND OF PAPER

AFTER FIXING

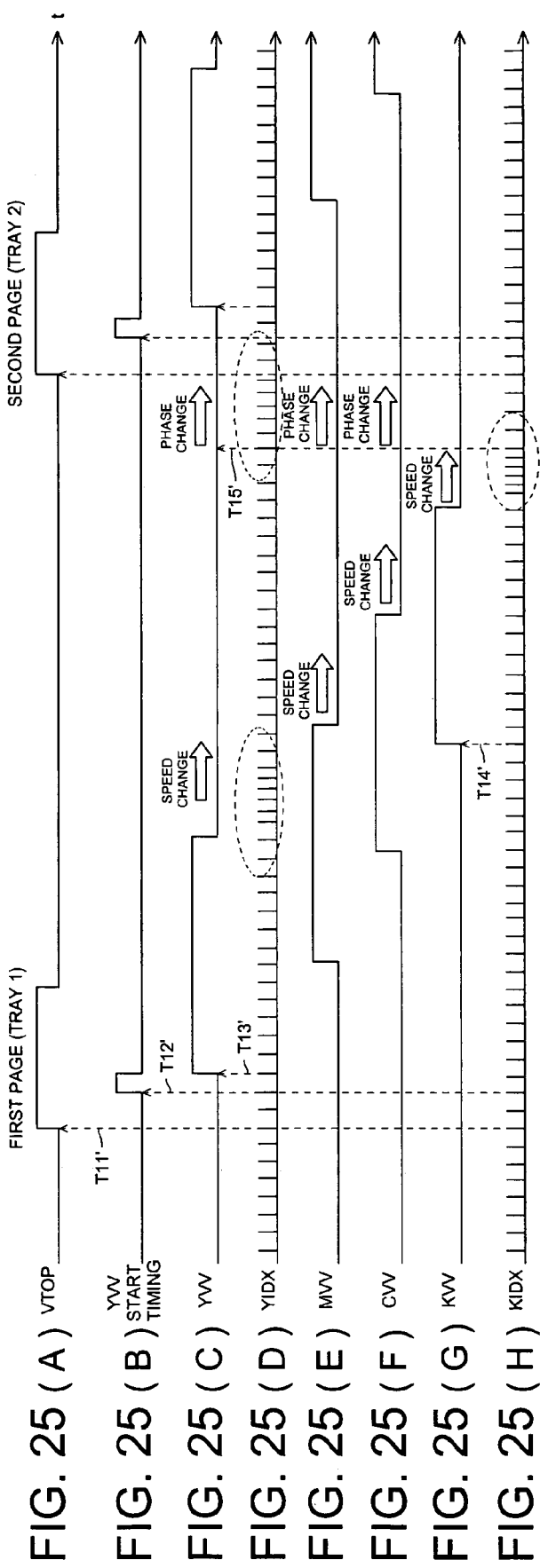

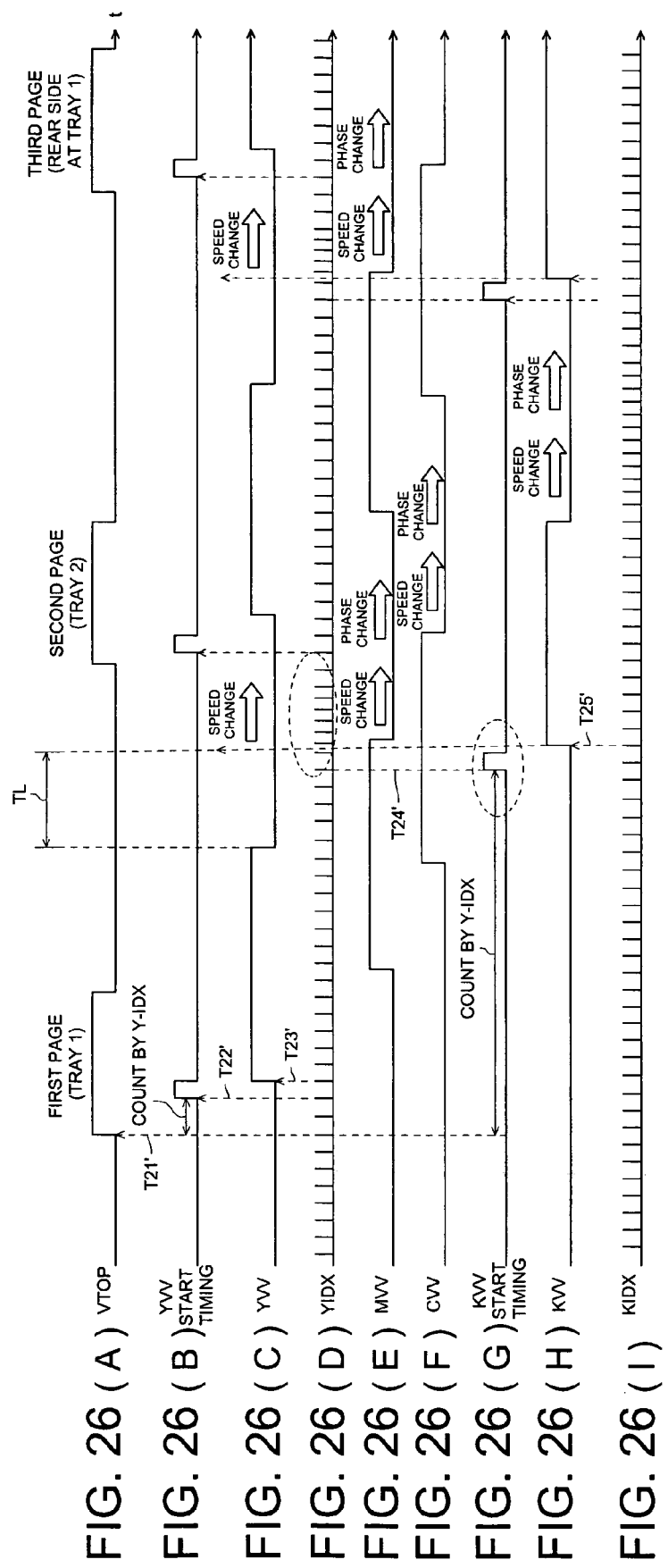

COLOR IMAGE FORMING APPARATUS AND IMAGE FORMING SYSTEM THEREWITH

This application claims priority from Japanese Patent Application Nos. 2004-159783 filed on May 28, 2004 and 2005-033165 filed on Feb. 9, 2005, which are incorporated hereinto by reference.

BACKGROUND OF THE INVENTION

The present invention relates to a color image forming apparatus and an image forming system applicable preferably to a color image forming apparatus, a facsimile machine thereof, a digital copying machine thereof and a multifunctional machine thereof.

In recent years, a tandem type color printer, a color copying machine and a multifunctional machine thereof have come into widespread use. The color image forming apparatus is equipped with various types of image writing unit for yellow (Y), magenta (M), cyan (C) and black (BK), development means, photoconductor drum, intermediate transfer belt and fixing apparatus.

In the Y-color image writing unit, for example, an electrostatic latent image is generated on the photoconductor drum based on the Y-color image data. The development means attaches Y-color toner to the electrostatic latent image generated on the photoconductor drum to form a color toner image. The photoconductor drum transfers the toner image onto the intermediate transfer belt. The same processing is applied to other colors such as M, C and BK. The color toner image transferred onto the intermediate transfer belt is transferred onto paper and is then fixed in position by a fixing apparatus.

The color image forming apparatus of this type that allows formation of color image on both sides of paper is also developed and manufactured. The duplex image forming function is used to create a booklet, for example. Paper thicker than the paper used in the book is often used as the paper for the front cover and back cover. Subsequent to duplex image formation, the paper for the front and back covers is subjected to double folding and stapling. In such a process of duplex image formation, the paper is known to shrink after an image has been formed on one side of paper. This is because the paper with a color toner image transferred thereon is heat-shrunk by the process of fixing. The degree of shrinkage is more serious for thicker paper. Thus, to registrate the image positions of the paper front and rear surfaces, the image forming conditions must be modified.

In connection with the image writing unit of this type, Patent Document 1 discloses a color image forming apparatus. This color image forming apparatus is provided with a change means for controlling the change of a clock frequency. When the image forming operation is shifted from one side of the paper to the other side, this change means controls the change of a pixel clock frequency for controlling a laser drive circuit and a drive clock frequency for controlling a polygon motor. Provision of this change means allows the image sizes on the front and rear to be agreed.

FIGS. 23(A) through (D) are time charts representing the operation example (based on BK color) during image formation in the prior art image writing units for Y, M, C and BK colors.

For example, assume that an instruction is given to start the front surface image formation at time t1' during duplex image formation in the image writing units or Y, M, C and BK colors. Then the Y-color sub-scanning valid area signal (hereinafter referred to as YVV) rises at time t2' in FIG. 23(A). The time when the YVV signal stays on a high level (hereinafter referred to as H level) indicates the time duration of Y-color image formation (in progress on the front surface of paper).

Further, the M-sub-scanning valid area signal (hereinafter referred to as MVV) shown in FIG. 23(B) rises at time t3'. The H level period of the MVV signal indicates the time duration of M-image formation (in progress on the front surface of paper). The C-sub-scanning valid area signal (hereinafter referred to as CVV) rises at time t4' shown in FIG. 23(C). The H level period of the CVV signal indicates the time duration of C-image formation (in progress on the front surface of paper).

When the YVV signal falls to a low level (hereinafter referred to as L level) at time t5', processing of Y-color image formation terminates. Further, the BK-sub-scanning valid area signal (hereinafter referred to as KVV) rises at time t6' shown in FIG. 23(D). The H level period of the KVV signal indicates the time duration of K-image formation (in progress on the front surface of paper).

When the MVV signal falls to a low level (hereinafter referred to as L level) at time t7', processing of M-image formation terminates. Further, when the CVV signal falls to a low level (hereinafter referred to as L level) at time t8', processing of C-image formation terminates. If the KVV signal falls to a low level (hereinafter referred to as L level) at time t9, processing of BK-image formation terminates.

At time t10', the BK-image writing unit starts control of changing the rotary speed (scanning speed) of the polygon mirror. The control of changing the polygon mirror rotary speed in the Y, M, C and BK color image writing units is carried out prior to control of the BK color rotary speed. It is performed after termination of Y, M, C and BK color image formation. Further, Y, M, C and BK color polygon mirror surface phase control is carried out in conformity to the BK-color main scanning reference signal. Thus, it is performed after rotary speed control of changing the BK-color rotary speed has terminated and the rotary speed has been stabilized.

Assume that an instruction is given to start rear surface image formation upon completion of the surface phase control such as change of the rotary speed in the BK-color image writing unit and change of the Y, M and C color polygon mirror surface phase, for example, at time t11' after the lapse of PLL lock wait time Tε. Then the Y-color YVV signal rises at time t12' shown in FIG. 23(A). The H level period of the YVV signal indicates the time duration of Y-color image formation (in progress on the rear surface).

After that, the M-color MVV signal rises at time t13' as shown in FIGS. 23(B) through (D). Then the BK-color KVV signal rises at time 16' subsequent to fall of the YVV signal at time t15'. The timed interval of the generation of such a sub-scanning valid area signal is controlled based on the main scanning reference signal (hereinafter referred to as index signal) of each color. The index signal is a signal obtained by detecting the optical beam reflected from the polygon mirror.

Incidentally, the PLL lock wait time Tε shown in FIG. 23(D) is necessary to control the rotary speed of the final BK-color polygon mirror for the rear surface of paper and the Y, M and C color polygon mirror surface phase. It is the time before the BK-color polygon mirror rotation is stabilized subsequent to change of the rotary speed and surface phase. The control of changing the rotary speed and surface phase of this type is necessary to change the timed interval for image formation, since the size of paper in image formation on the paper rear surface is slighted reduced as compared to the size of paper in image formation on the paper front surface (refer to Patent Document 1).

FIGS. 24(A) and (B) are explanatory diagrams showing an example of paper shrinking in the duplex image formation mode. Paper P shown in FIG. 24(A) is in the state just before being fixed, after a color toner image has been secondarily transferred thereon. The paper P has a length of L mm and a width of W mm. The paper P' shown in FIG. 24(B) is in the state after the paper P has been fixed. The length of the paper P' has been reduced to L' mm, and the width to W' mm. The paper size is considered to be reduced by evaporation of moisture. The image on the rear surface must be formed in response to such a reduced size of the paper P. Incidentally, the image formation conditions must conform to the paper size subsequent to shrinkage, L' mm×W' mm. Otherwise, the image formation positions (sizes) of the front and rear surfaces will be misaligned.

In response to such a reduced size of the paper P, the frequency of the polygon motor drive clock (hereinafter referred to as CLK) is changed. Assume that the polygon drive CLK frequency before shrinkage, viz., during image formation on the front surface is F0, and the polygon drive CLK frequency after shrinkage, viz., during image formation on the rear surface is F. Then F=F0×L/L' is set.

Further, the pixel CLK frequency for controlling the laser beam is changed. Assume that the pixel CLK frequency prior to shrinkage is f0, and the pixel CLK frequency subsequent to shrinkage is f. Then f=(L/L')×(W/W')×f0 is set. As described above, in response to the shrinkage of the paper P, the polygon drive CLK frequency and pixel CLK frequency are changed, whereby an image accurately registered on the front and rear surfaces can be obtained.

Assume that the process linear speed prior to shrinkage is V0, process-to-process gap prior to shrinkage is G0, distance between units is process gap G and process lineal speed is V. When the polygon drive CLK frequency has been changed from F0 to F, then:

1. The apparent process linear speed V will be changed to V0×F0/F=V0×L'/L.
2. The process-to-process gap G (pixel) will be changed to G0×V0/V=G0 ×L/L'.

As described above, the process linear speed V will undergo a change. Thus, the amount of correcting the color misalignment corresponding to process-to-process gap G requires correction of the speed amount of the front-to-rear magnification change. Accordingly, if polygon mirror surface phase adjustment function is provided, the surface phase is controlled when front/rear switching is performed. The aforementioned polygon mirror rotary speed and polygon mirror surface phase for Y, M and C colors is carried out are controlled at the time of duplex image formation as well as tray switching. Here the process linear speed corresponds to the rotary speed of the photoconductor as an image forming member for image formation.

FIGS. 25(A) through (H) are time charts representing examples of image formation (BK-color as a reference) in an Y, M, C and BK color image writing unit according to the prior art at the time of tray switching.

After the leading edge of the paper fed out of the tray 1 has been detected by the leading edge sensor (not illustrated), the signal VTOP given in FIG. 25(A) rises at time T11' synchronized with the BK-color index signal (hereinafter referred to as KIDX signal) shown in FIG. 25(H). At the YVV signal start timing shown in FIG. 25(B), the KIDX counter (not illustrated) starts to count the pulse of the KIDX signal and the YVV signal rises at time T12' synchronized with the KIDX signal. The YVV signal shown in FIG. 25(C) rises at time T13' synchronized with Y-color index signal (hereinafter referred to as YIDX signal) shown in FIG. 25(D). When this YVV signal stays on the H level, a Y-color image is formed on the paper from the tray 1. Upon image formation, the Y-color polygon mirror rotary speed is controlled. The YIDX signal frequency fluctuates when the speed change is controlled.

In the similar manner, an M-color image is formed on the paper from the tray 1 when the MVV signal shown in FIG. 25(E) stays on the H level. Upon image formation, the polygon mirror rotary speed is controlled. A C-color image is formed on the paper from the tray 1 when the CVV signal shown in FIG. 25(F) stays on the H level. Upon image formation, the polygon mirror rotary speed is controlled.

The KVV signal shown in FIG. 25(G) rises at time T14' synchronized with the KIDX signal shown in FIG. 25(H). A BK-color image is formed on the paper from the tray 1 when the KVV signal stays on the H level. Upon image formation, the BK-color polygon mirror rotary speed is controlled. The KIDX signal frequency fluctuates when the speed change is controlled.

In the example of image formation at the time of tray switching, the surface phase of Y, M and C color polygon mirror is controlled based on the KIDX signal. Accordingly, this control starts subsequent to completion of the BK-color polygon mirror rotary speed control. Image formation on the paper from tray 2 starts subsequent to control of the Y-color polygon mirror surface phase control.

As described above, in the example of image formation at the time of tray switching using the BK color as a reference, the phase cannot be changed until the BK-color speed change is completed. Further, image formation on the next sheet of paper (fed from the tray 2) cannot be started until the Y-color phase change is completed.

A light beam scanning apparatus is shown in the Patent Document 2. This light beam scanning apparatus is provided with: a rotary reference signal generation means for generating a rotary reference signal corresponding to each polygon mirror; and a phase control means for controlling the rotary reference signal generation means in such a way that the light beam detection signals corresponding to the polygon mirrors will be placed in a desired positional relationship, with reference to the light beam detection signal corresponding to the reference polygon mirror. Such a phase control means corrects the color misalignment of less than one scan pitch.

The Patent Document 3 discloses a laser beam scanning apparatus. This laser beam scanning apparatus is provided with a rotary phase control means that calculates the time difference between the light beam detection signal corresponding to the reference polygon mirror and the light beam detection signals corresponding to the remaining polygon mirrors; and compares the phase control data based on this time difference with the phase control data corresponding to the reference polygon mirror, thereby generating a rotary frequency. Such a rotary phase control means provides a simple control of the direction of the mirror surface of the polygon mirror.

Patent Document 1 represents Official Gazette of Japanese Patent Tokkai 2003-0262991 (page 3 and FIG. 3), Patent Document 2 represents Official Gazette of Japanese Patent Tokkaihei 15-3452166 (page 7 and FIG. 2), and Patent Document 3 represents Official Gazette of Japanese Patent Tokkaihei 15-3458878 (page 5 and FIG. 1).

It should be noted that the prior art color image forming apparatus has the following problems.

(i). In the color image forming apparatus disclosed in the Patent Document 1, the example of the operations at the time of duplex image formation shown in FIGS. 23(A) through (D) (wherein BK color is used as a reference) shows that the image formation timing is determined by the signal (non-pseudo index signal) obtained by detecting the light beam reflected by the BK-color polygon mirror, whereby the YVV signal, MVV signal, CVV signal and KVV signal are generated. Accordingly, in the duplex image formation mode, image formation signal for starting image formation on the next page cannot be issued until the final BK-color image formation on the front paper is completed. In the example given in FIG. 23(D), the image formation start signal for starting image formation on the reserve surface of paper can be issued only after the lapse of the PLL lock wait time Tε required to control the rotary speed of the final BK-color polygon mirror for the front page of the paper and the Y, M and C color polygon mirror surface phase. This PLL lock wait time adversely affects the productivity of the color image forming apparatus.

(ii). The aforementioned problem is found also in the example of image formation operation at the time of tray switching shown in FIGS. 25(A) through (G). Namely, phase cannot be changed until the BK-color speed change is completed and the KIDX is stabilized. Further, image formation on the sheets of paper fed out of the tray 2 cannot be started until Y-color speed change is completed and the YIDX is stabilized.

(iii). When a color image forming apparatus is configured using the laser beam apparatus disclosed in Patent Documents 2 and 3, any one of a plurality of image writing units is regarded as a reference unit, and the control means controls the surface phase of the polygon mirror corresponding to that signal. Thus, the surface phase control can be started only after the lapse of time required for stabilization of the index signal corresponding to the reference polygon mirror.

(iv). Further, it is necessary to use a color tandem machine to adjust the speed of the polygon mirror and to regulate the apparent process linear speed. The surface phase in addition to the rotary speed adjustment of the polygon mirror must be controlled at the time of registering the front and rear surfaces. This arrangement adversely affects the productivity.

(v). One way to solve these problems is as follows: Based on the index signal of the color for the first image formation on this sheet of paper, the timed interval for image formation in the remaining M, C and BK colors is determined, and the paper from the next tray 2 is fed out during image formation in other colors on this sheet, thereby starting image formation in the first color on this sheet. This method also produces a time lag, which adversely affects the productivity of the color image forming apparatus.

FIGS. 26(A) through (H) are time charts representing the examples of operations (wherein Y color is used as a reference) related to the improved method (proposal) of image formation timing in a color image forming apparatus.

The leading edge of the paper fed out of the tray 1 and the VTOP signal shown in FIG. 26(A) rises at time T21' synchronized with the YIDX signal shown in FIG. 26(D). The YIDX counter (not illustrated) is activated, YIDX signal pulses are counted, and the YVV start timing signal shown in FIG. 26(B) rises at time T22' synchronized with the YIDX signal. The YVV start timing signal shown in FIG. 26(C) rises at time T23' synchronized with the YIDX signal shown in FIG. 26(D). When the YVV signal stays on the H level, Y-color image formation is applied to the paper from the tray 1.

The rotary speed of the Y-color polygon mirror is controlled after the KVV signal shown in FIG. 26(H) has risen. This is because image formation timing in each color is based on the Y color. During the speed change control, the YIDX signal frequency fluctuates. M-color image formation on the paper from the tray 1 is carried out when the MVV signal shown in FIG. 26(E) stays on the H level. Upon completion of this formation, the rotary speed of the M-color polygon mirror and phase change thereof are controlled. C-color image formation on that paper is carried out when the CVV signal shown in FIG. 26(F) remains on the H level. Upon completion of this formation, the rotary speed of the C-color polygon mirror and phase change thereof are controlled.

The KIDX counter (not illustrated) is activated, YIDX signal pulses are counted, and the KVV start timing signal shown in FIG. 26(G) rises at time T24' synchronized with the YIDX signal. The KVV start timing signal shown in FIG. 26(H) rises at time T25' synchronized with the YIDX signal shown in FIG. 26(I). When the KVV signal stays on the H level, BK-color image formation is applied to the paper from the tray 1. Upon completion of this formation, the rotary speed of the BK-color polygon mirror and surface-phase thereof are controlled. During the speed and phase change control, the KIDX signal frequency fluctuates.

The example of the image formation operation at the time of tray switching provides an advantage in that the Y-color image formation onto the paper from the tray 2 can be started before completion of the image formation onto the paper from the tray 1. The image formation speed can be increased by the amount corresponding to this advantage as compared to the Patent Document 1. However, in this improved version of image formation startup timing method (proposal), a YIDX signal is used to determine the BK-color KVV start timing. Accordingly, the Y-color polygon mirror rotary speed control cannot be initiated before the BK-color KVV start timing is established and the KVV signal rises. In FIG. 26(C), time lag TL is defined as the time from the completion of Y-color image formation to the rise of the BK-color KVV signal shown in FIG. 26(H). Thus, the time lag TL may have an adverse effect on the productivity of the color image forming apparatus.

SUMMARY OF THE INVENTION

To solve these prior art problems, it is an object of the present invention to provide a color image forming apparatus and an image forming system capable of allowing color image formation to be started without depending on the index signal by the polygon mirror set for a reference color or without waiting for completion of the final color image formation on the paper, and ensuring color image formation to be achieved without having an adverse effect on the productivity.

To achieve the aforementioned object, the present invention is embodied in the following three structures 1 through 3:

1. A color image forming apparatus for forming a color image on a recording medium, comprising: an image carrier; a polygon mirror; a signal forming device for forming a pseudo main scanning reference signal having a fixed cycle; and a controller for controlling image formation on a predetermined surface of the recording medium on the basis of a main scanning reference signal which is a reference signal when a light beam is scanned on the image carrier, and a cycle of which varies according to a rotary speed control and a surface phase control of the polygon mirror, and the pseudo main scanning reference signal formed by the signal forming device.

2. A color image forming apparatus for forming a color image on a recording medium, comprising: an image carrier; a polygon mirror; a signal forming device for forming a pseudo main scanning reference signal having a fixed cycle; and a controller for controlling image formation on a predetermined surface of the recording medium on the basis of the pseudo main scanning reference signal formed by the signal forming device and a main scanning reference signal which is formed by detecting a light beam that is scanned by the polygon mirror.

3. An image forming system comprising: a color image forming apparatus having an image carrier and a polygon mirror for forming a color image on a recording medium; the color image forming apparatus comprising, a signal forming device for forming a pseudo main scanning reference signal, capable of setting to a predetermined cycle with respect to a main scanning reference signal which is a reference signal when a light beam is scanned on the image carrier, and a cycle of which varies according to a rotary speed control and a surface phase control of the polygon mirror, and a controller for controlling image formation on a predetermined surface of the recording medium on the basis of the main scanning reference signal and the pseudo main scanning reference signal formed by the signal forming device; an information processing apparatus for controlling an input and an output of the color image forming apparatus; and a communication device for connecting the color image forming apparatus with the information processing apparatus.

BRIEF DESCRIPTION OF THE DRAWINGS

FIGS. 7(A) through (F) are time charts representing an example of changing the phase of the polygon drive CLK signal phase;

FIG. 9 is a chart showing an example of a control table for each type of paper;

FIGS. 25(A) through (H) are time charts representing an example of operations in switching the front/rear image formation mode of an Y, M, C and BK-color image writing unit of the prior art (based on BK-color); and FIGS. 26(A) through (I) are time charts representing an example of operation in an improved version of image formation start timing method (proposal) (based on Y-color).

DETAILED DESCRIPTION OF THE PREFERRED EMBODIMENT

The following describes the color image forming apparatus and image forming system as an embodiment of the present invention with reference to drawings.

Embodiment 1

Figure 1:
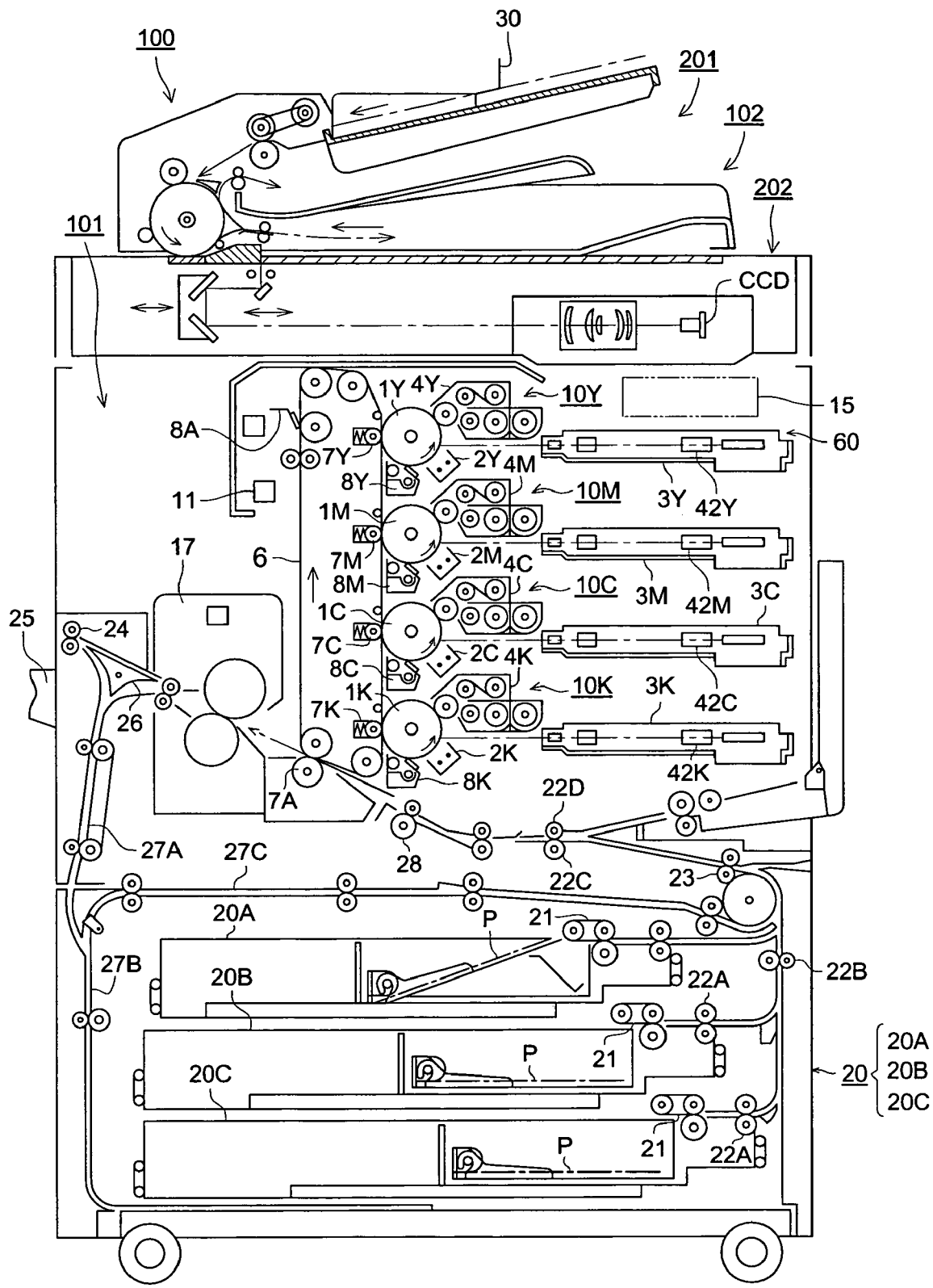
FIG. 1 is a conceptual diagram representing an example of the configuration of a color copying machine 100 as a first embodiment of the present invention.

FIG. 1 is a conceptual diagram representing an example of the configuration of a color copying machine 100 as a first embodiment of the present invention.

The color copying machine 100 shown in FIG. 1 is an example of a color image forming apparatus. It is equipped with a function of forming a color image on both sides of a predetermined sheet of paper. The color image forming apparatus of the present embodiment is applicable to a color printer, facsimile machine and multifunctional machine thereof, in addition to the color copying machine 100.

The color copying machine 100 is constituted by a copying machine proper 101 and image reading apparatus 102. An image reading apparatus 102 composed of an automatic document feed apparatus 201 and a document image scanning and exposure apparatus 202 is mounted on the top of the copying machine proper 101. A document 30 mounted on the document platen of the automatic document feed apparatus 201 is conveyed by a conveyance means. The image on one side or both sides of the document is scanned and exposed by the optical system of the document image scanning and exposure apparatus 202. The incoming light reflecting the document image is read by a line image sensor CCD.

The analog image signal having been subjected to photoelectric conversion by the line image sensor CCD is subjected to analog processing, analog-to-digital conversion, shading correction or image compression by the image processing means (not illustrated), and is turned into digital image data Din. After having been converted into the Y, M, C and BK-color image data Dy, Dm, Dc and Dk, the image data Din is sent to the image writing units 3Y, 3M, 3C and 3K constituting an image forming means 60.

The aforementioned automatic document feed apparatus 201 continuously reads the contents of a plurality of the documents 30 at a stroke, and stores the document information into a storage means (electronic RDH function). This electronic RDH function is conveniently used when copying the contents of a plurality of documents by the copying function or sending a plurality of document 30 by the facsimile function.

The copying machine proper 101 constitutes the tandem type color image forming apparatus. It is equipped with four image forming units (image forming device) 10Y, 10M, 10C and 10K, an endless intermediate transfer belt 6, a sheet conveyance means including an automatic sheet re-feed mechanism (ADU mechanism), a fixing apparatus 17 for fixing a toner image, and a sheet feed means 20 for feeding the transfer material P (hereinafter referred to as sheet of paper) to the image forming device. The sheet feed means 20 is mounted below the image forming device. The sheet feed means 20 is composed of three sheet feed trays 20A, 20B and 20C, for example. The paper P fed out from the sheet feed means 20 is fed below the image forming unit 10K.

The image forming units 10Y, 10M, 10C and 10K constitute the image forming means 60 and are provided with a polygon mirror and a photoconductor drum for each color. Based on the main scanning reference signal (hereinafter referred to as index signal) and pseudo main scanning reference signal (hereinafter referred to as pseudo index signal), they form color images. For example, the image forming unit 10Y includes a polygon mirror 42Y and photoconductor drum (image forming member) 1Y. The image forming unit 10M includes a polygon mirror 42M and photoconductor drum (image forming member) 1M. The image forming unit 10C includes a polygon mirror 42C and photoconductor drum (image forming member) 1C. The image forming unit 10K includes a polygon mirror 42K and photoconductor drum (image forming member) 1K.

In this example, the image forming unit 10Y forming a yellow (Y)-color image has a photoconductor drum 1Y for forming Y-color toner image, an Y-color electrostatic charging means 2Y arranged around the photoconductor drum 1Y, an image writing means 3Y, a development means 4Y and an image forming member cleaning means 8Y.

The image forming unit 10M forming a magenta (M)-color image has a photoconductor drum 1M for forming M-color toner image, an M-color electrostatic charging means, an image writing means 3M, a development means 4M and an image forming member cleaning means 8M. The image forming unit 10C forming a cyan (C)-color image has a photoconductor drum 1C for forming C-color toner image, an C-color electrostatic charging means, an image writing means 3C, a development means 4C and an image forming member cleaning means 8C. The image forming unit 10K forming a black (BK)-color image has a photoconductor drum 1K for forming K-color toner image, an K-color electrostatic charging means 2K, an image writing means 3K, a development means 4K and an image forming member cleaning means 8K.

The electrostatic charging means 2Y and image writing means 3Y, electrostatic charging means 2M and image writing means 3M, electrostatic charging means 2C and image writing means 3C, and electrostatic charging means 2K and image writing means 3Y constitute a lattice point forming means. Development performed by the development means 4Y, 4M, 4C and 4K is the reversal development carried out by application of the development bias obtained by superimposing a. c. voltage on the d. c. voltage having the same polarity as that of the toner (negative in the present embodiment). The intermediate transfer belt 6 is wound by a plurality of rollers and is rotatably supported. The intermediate transfer belt 6 is used to transfer the toner images of Y-, M-, C- and BK-color formed on each of the photoconductor drums 1Y, 1M, 1C and 1K.

The following describes the overview of the image forming process. Color images formed by image forming units 10Y, 10M, 10C and 10K are sequentially transferred (primarily) onto the rotating intermediate transfer belt 6 by means of the primary transfer rollers 7Y, 7M, 7C and 7K to which the primary transfer bias (not illustrated) having the polarity opposite to that of the toner to be used is applied. Color toner images are superimposed (synthesized) thereon, whereby color images are formed. The color image is transferred from the intermediate transfer belt 6 to paper P.

Paper P stored in the sheet feed means 20A, 20B and 20C is fed by a feedout roller 21 and a sheet feed roller 22A arranged on each of the sheet feed means 20A, 20B and 20C. After passing through the sheet feed rollers 22A, 22B, 22C and 22D, paper is conveyed to the secondary transfer roller 7A. Color images are transferred collectively on one side (front surface) of the paper P (secondary transfer).

The paper P with the color image transferred thereon is fixed in position by the fixing apparatus 17. Being sandwiched between ejection rollers 24, the paper P is placed on the ejection tray 25 located outside the apparatus. The transfer toner remaining on the peripheral surface of the photoconductor drums 1Y, 1M, 1C and 1K is cleaned by the cleaning means 8Y, 8M, 8C and 8K, whereby the next image forming cycle starts.

In the duplex image formation mode, an image is formed on one side (front surface). The paper P ejected from the fixing apparatus 17 is branched off from the sheet ejection path by the branching means 26. After passing through the circulating paper feed path 27A located below, the front/rear sides of the paper are reversed by a reversing conveyance path 27B. Passing through the re-feed conveyance path 27C, the sheets of paper P meet one another at the sheet feed roller 22D. The paper P having been reversed and conveyed is again fed to the secondary transfer roller 7A through the resist rollers 23 and 28. A color image (color toner image) is transferred collectively on the other side (rear surface) of the paper P.

The paper P on which the color image has been transferred is fixed in position by the fixing apparatus 17. Being sandwiched between ejection rollers 24, the paper P is placed on the ejection tray 25 located outside the apparatus. After the color image has been transferred onto the paper P by the secondary transfer roller 7A, the remaining toner is removed from the intermediate transfer belt 6 by the cleaning means 8A for the intermediate transfer belt, wherein the paper P is subjected to curvature-separation by the belt.

Paper P used for image formation includes thin paper of about 52.3 through 63.9 kg/m$^2$ (per 1000 sheets), plain paper of about 64.0 through 81.4 kg/m$^2$ (per 1000 sheets), heavy paper of 83.0 through 130.0 kg/m$^2$ (per 1000 sheets) or extra heavy paper of 150.0 kg/m² (per 1000 sheets). The thickness of paper P to be used ranges 0.05 to 0.15 mm.

The copying machine proper 101 is provided with a control means 15. When an image is formed on both sides of a predetermined paper, image formation on a predetermined surface of paper P is controlled based on the index signal the frequency of which is changed when the rotary speed of the polygon mirror 42Y is changed or when the surface phase is controlled, and a plurality of pseudo index signals with its frequency fixed with reference to this index signal.

Figure 2:
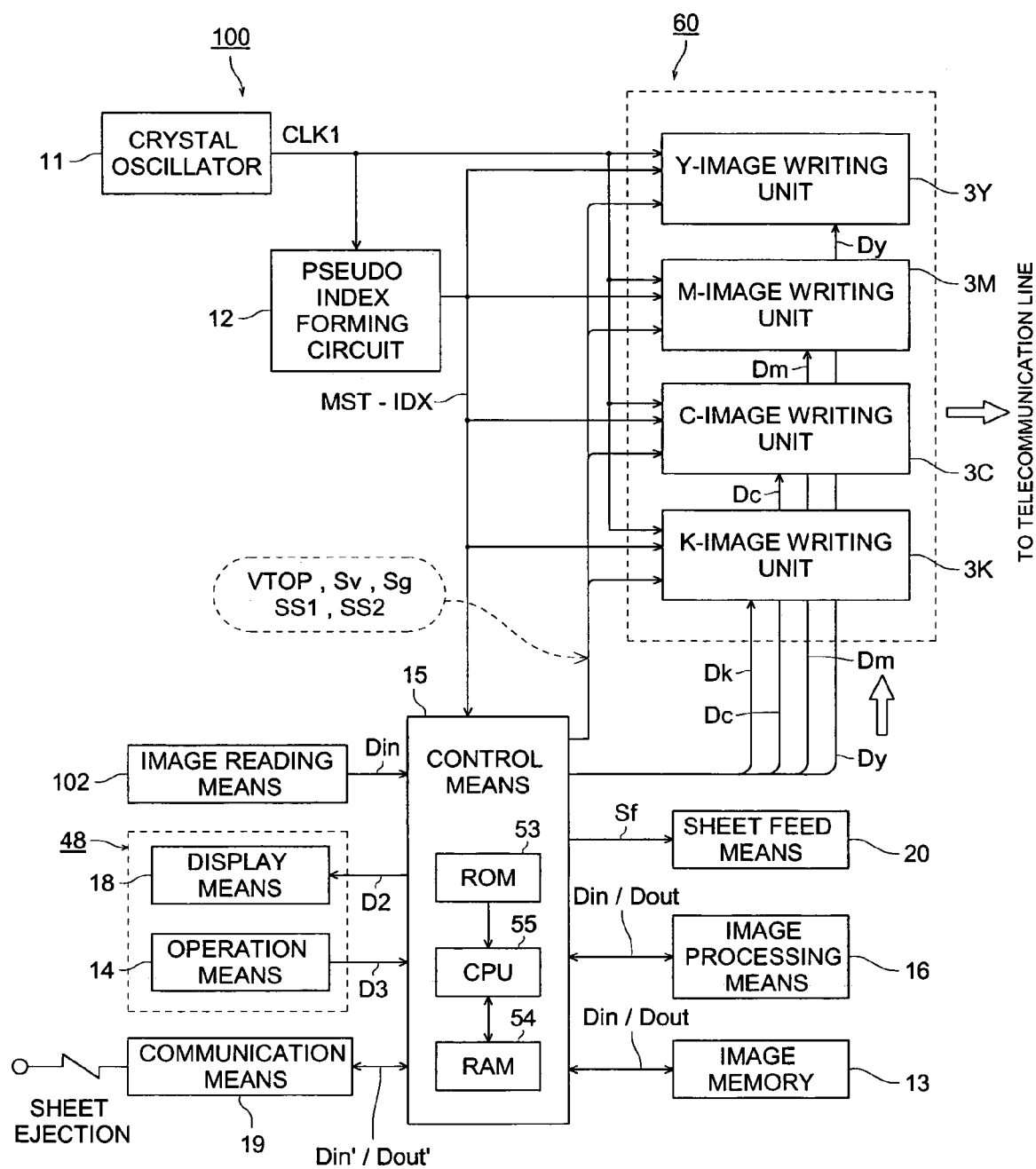
FIG. 2 is a block diagram representing an example of the configuration of the control system of the color copying machine 100.

FIG. 2 is a block diagram representing an example of the configuration of the control system of the color copying machine 100. The color copying machine 100 in FIG. 2 has a control means 15 for determining the image formation start timing for a predetermined surface of paper P based on the pseudo index signal. This control means 15 is connected with a pseudo index forming circuit 12, image memory 13, image processing means 16, communication means 19, sheet feed means 20, operation panel 48, image forming means 60 and image reading apparatus 102.

The control means 15 is provided with a ROM (Read Only Memory) 53, a RAM (Random Access Memory) 54 for work and a CPU (Central Processor Unit) 55. The ROM 53 includes system program data for overall control of the copying machine, and data for controlling the rotary speed of the polygon mirror 42Y or others. The RAM 54 temporarily includes control commands and others for execution of various modes.

When the CPU 55 has been turned on, system program data is read from the ROM 53, and the system is booted so that the copying machine is placed under overall control. When a color image has been formed on a predetermined sheet of paper P, the CPU 55 provides color control on a predetermined sheet of paper P, based on the index signal the frequency of which is changed when the rotary speed of the polygon mirror 42Y is changed or when the surface phase is controlled, and the pseudo index signals with its frequency fixed. For example, the CPU 55 determines the image formation start trigger (VTOP) signal for color image formation from the front side of paper P to the rear side, and the VTOP signal for color image formation in switching the sheet feed from tray 1 to tray 2, based on a single pseudo index signal.

The operation panel 48 is connected to the control means 15, and contains a operation means 14 (not illustrated) composed of a touch panel, and a display means 18 composed of a liquid crystal display panel. The operation panel 48 uses an input means based on the GUI (Graphical User Interface). The power switch is provided on the operation panel 48. The display means 18 is interlocked, for example, with the operation means 14 to provide display operation.

The operation panel 48 is operated for the selection of the image formation condition and sheet feed trays 20A, 20B and 20C. For example, the operation means 14 is operated when selecting a type of paper P from plain paper, recycled paper, coated paper and OHT paper, or one of sheet feed trays 20A, 20B and 20C. Thus, the image formation conditions are set. The image formation conditions and sheet feed tray select information set by the operation panel 48 is outputted to the CPU 55 in the form of operation data D3.

The aforementioned control means 15 controls color image formation on a predetermined side of paper P based on the operation data D3 output from the operation means 14 and information received via the communication means 19. For example, the control means 15 applies processing of the size adjustment of the front and rear surfaces of paper P and registration of front and rear surfaces of paper P, in conformity to the preset one of sheet feed trays 20A, 20B and 20C and the preset type of paper P.

Connected to the control means 15, the image reading apparatus 102 reads an image from the document 30 shown in FIG. 1, and outputs the digital color image data Din (R, G and B color component data) to the control means 15. The control means 15 stores the image data Din in the image memory 13. The image processing means 16 reads the image data Din from the image memory 13 and applies color conversion of R, G and B color component data into Y-color image data Dy, M-color image data Dm, C-color image data Dc and BK-color image data Dk. The image data Dy, Dm, Dc and Dk of Y, M, C and K colors subsequent to color conversion is stored in the image memory 13 or Y, M, C and K color image memory (not illustrated).

The communication means 19 is connected to a communication circuit such as a LAN (Local Area Network) and is used for communication with an external computer or others. When the color copying machine 100 is used as a printer, the communication means 19 receives the print data Din' from the external computer in the print mode. The print data Din' also includes the image formation condition and sheet feed tray selection information. The sheet feed means 20 is connected with a motor (not illustrated) for driving the sheet feed trays 20A, 20B and 20C. The sheet feed means 20 controls rotation of the motor based on the sheet feed control signal Sf and conveys the paper P fed out of the sheet feed tray 20A, 20B or 20C, to the image formation device. The sheet feed control signal Sf is supplied to the sheet feed means 20 from the control means 15.

The image forming means 60 has Y, M, C and K color image writing means 3Y, 3M, 3C and 3K, and inputs the Y, M, C and K color image data Dy, Dm, Dc and Dk from the Y, M, C and K color image memories so that an image is formed on a predetermined surface of the paper P, based on the Y, M, C and K color index signal and pseudo index signal. The image data Dy, Dm, Dc and Dk for Y, M, C and K colors may be received from an external computer via the communication means 19.

The control means 15 is connected with the pseudo index forming circuit 12 constituting an example of the signal generation means. The pseudo index forming circuit is used to generate the index signal as a reference signal in color image formation mode. Whereas the cycle of the slave index signal (hereinafter referred to as IDX signal) is changed by control of the rotary speed and surface phase of the polygon mirror 42Y, the pseudo index signal is not affected by a change in the cycle of the polygon mirror. It can be set to a predetermined cycle. The pseudo index signal is a master index signal for the IDX signal. It will be called MST-IDX signal hereafter.

The IDX signal is present for each color. The YIDX signal is a reference signal for controlling the rotary speed and surface phase of the Y-color polygon mirror 42Y and scanning the laser beam on the photoconductor drum 1Y. It is obtained by detecting the laser beam reflected from the polygon mirror 42Y. The MIDX signal is a reference signal for controlling the rotary speed and surface phase of the M-color polygon mirror 42M and scanning the laser beam on the photoconductor drum 1M. It is obtained by detecting the laser beam reflected from the polygon mirror 42M. The CIDX signal is a reference signal for controlling the rotary speed and surface phase of the C-color polygon mirror 42C and scanning the laser beam on the photoconductor drum 1C. It is obtained by detecting the laser beam reflected from the polygon mirror 42C. The KIDX signal is a reference signal for controlling the rotary speed and surface phase of the K-color polygon mirror 42K and scanning the laser beam on the photoconductor drum 1K. It is obtained by detecting the laser beam reflected from the polygon mirror 42K.

The control means 15 determines the image formation start trigger (VTOP) signal for color image formation from the front side of paper P to the rear side, and the VTOP signal for color image formation in switching the sheet feed from tray 1 to tray 2, based on a single MST-IDX signal. Based on the MIDX signal generated by the pseudo index forming circuit 12 and IDX signal, the control means 15 controls color image formation on a predetermined surface of paper P. When color is formed on the front and rear of the paper, for example, this arrangement allows the image sizes to be aligned on the front and rear surfaces of the paper P, even if paper P has shrunken subsequent to image formation on the surface. When a color image is formed by switching the sheet feed from tray 1 to tray 2, this arrangement allows the image sizes of different types of paper to be aligned even if the type of paper is different between the tray 1 and tray 2.

The pseudo index forming circuit 12 is connected with a crystal oscillator 11 as an example of a signal generation source. The crystal oscillator 11 generates the reference clock signal (hereinafter referred to as CLK1). The CLK1 are outputted to the pseudo index forming circuit 12 and image writing means 3Y, 3M, 3C and 3K for Y, M, C and K colors.

Figure 3:
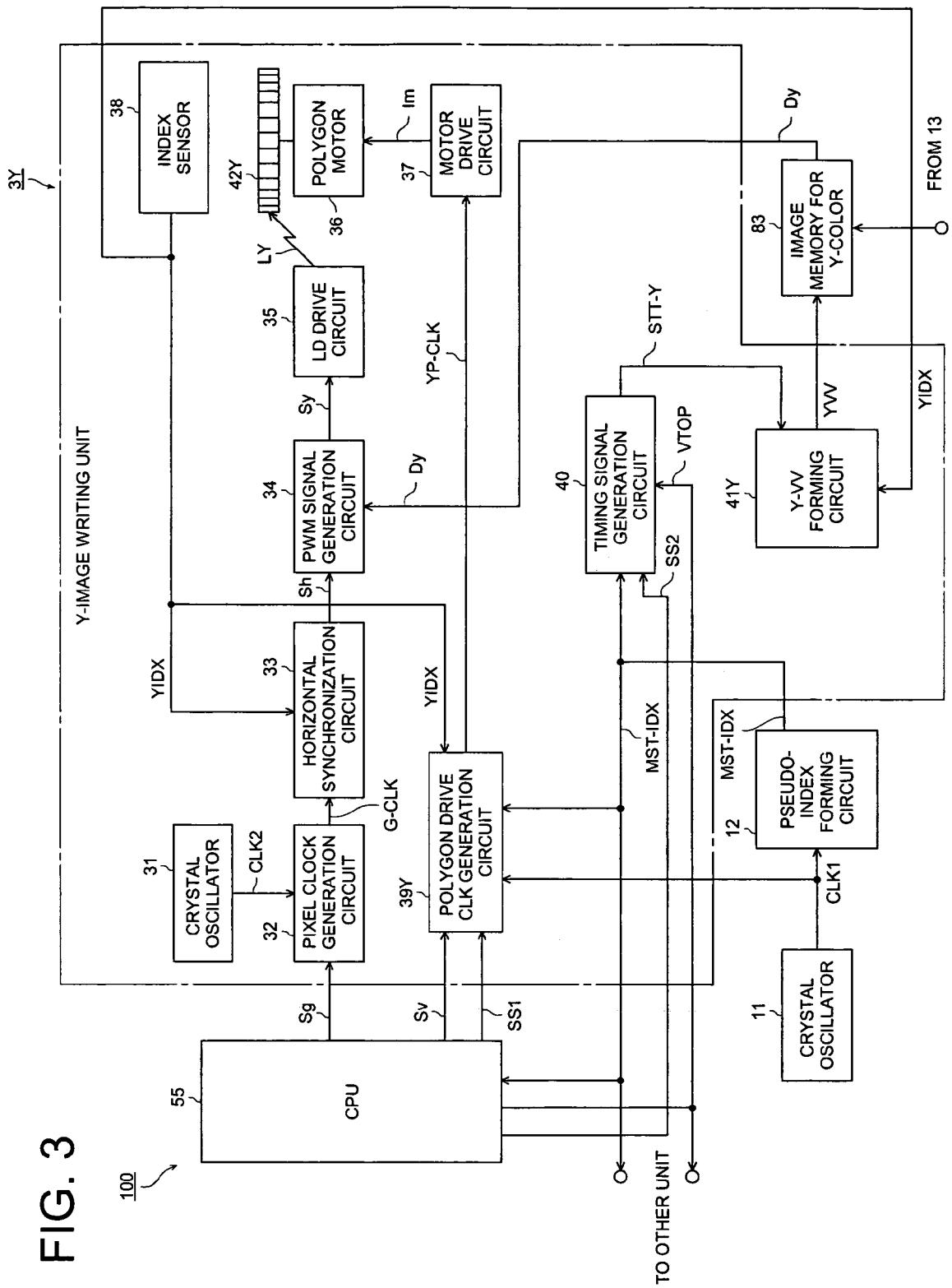
FIG. 3 is a block diagram showing an example of the configuration of the Y-color image writing unit and the peripheral circuit thereof, extracted from FIG. 2.

FIG. 3 is a block diagram showing an example of the configuration of the Y-color image writing unit 3Y and the peripheral circuit thereof shown in FIG. 2. The Y-color image writing unit 3Y shown in FIG. 2 is connected to the crystal oscillator 11, pseudo index forming circuit 12 and CPU 55. The image writing unit 3Y is composed of a crystal oscillator 31, an image clock generation circuit 32, horizontal synchronization circuit 33, PWM signal generation circuit 34, laser (LD) drive circuit 35, polygon motor 36, motor drive circuit 37, index sensor 38, polygon drive CLK generation circuit 39Y, timing signal generation circuit 40 and Y-VV (Valid) generation circuit 41Y, for example.

The pseudo index forming circuit 12 operates to ensure that the MST-IDX1 signal and MST-IDX2 signal as the pseudo index signals are generated, based on the CLK1 signal for generating the Y-color (common to all colors) polygon drive clock signal (hereinafter referred to as YP-CLK signal). The CLK1 signal is outputted to the pseudo index forming circuit 12 and polygon drive CLK generation circuit 39Y from the crystal oscillator 11. Here assume that the cycle of the YP-CLK signal (polygon drive clock) is Tp, that of the MST-IDX1 signal and MST-IDX2 signal is Ti, and natural numbers are n and m. Then the relationship between one cycle of the polygon drive CLK signal and one cycle of the MST-IDX1 signal and MST-IDX2 signal is set to Tp×n=Ti×m (where n≦m). In this example, the pseudo index forming circuit 12 process the CLK1 signal obtained from the crystal oscillator 11 so as to meet the aforementioned setting conditions, and generates an MST-IDX signal.

The polygon drive CLK generation circuit process the CLK1 signal so as to meet the aforementioned setting conditions, and generates an YP-CLK signal. As described above, the MST-IDX signal whose cycle is fixed and correctly aligned with that of the actually generated YIDX signal can be created, using the same crystal oscillator 11.

Based on the sequence program, the CPU 55 outputs the selection control signal SS1 to the polygon drive CLK generation circuit 39Y. The selection control signal SS1 is set before the surface phase control of the polygon mirror 42Y or the like starts. Similarly, based on the surface phase of the polygon mirror 42Y, the CPU 55 outputs the selection control signal SS2 to the timing signal generation circuit 40. The selection control signal SS2 is generated based on the control command to instruct the image formation on the rear surface and switching of the tray, and is set before the image top signal (hereinafter referred to as VTOP) rises. The VTOP signal provides alignment between paper P conveyance timing and image formation timing.

The selection control signals SS1 and SS2 indicates the selection of the front surface or tray 1, for example, on the low level (hereinafter referred to as L level), and the selection of the rear surface or tray 2, for example, on the high level (hereinafter referred to as H level). This arrangement allows the CPU 55 to control the frequency of the YP-CLK signal supplied to the polygon motor 36, for each of the image forming units 10Y, 10M, 10C and 10K.

Connected with an image clock generation circuit 32, the crystal oscillator 31 oscillates the reference block signal (hereinafter referred to as CLK2 signal) and outputs it to the image clock generation circuit 32. Based on the frequency control signal Sg, the image clock generation circuit 32 generates the Y-color pixel clock signal (hereinafter referred to as G-CLK signal) and outputs to the horizontal synchronization circuit 33. For example, the value obtained by multiplying the frequency of the G-CLK signal in the front surface image formation mode by (L/L')·(W/W') is set as an Y-color pixel clock frequency f.

Connected to the image clock generation circuit 32 and PWM signal generation circuit 34, the horizontal synchronization circuit 33 detects the horizontal synchronization signal Sh based on the YIDX signal and outputs it to PWM signal generation circuit 34. The YIDX signal is outputted from the Y-color index sensor 38 to the horizontal synchronization circuit 33 and also to the polygon drive CLK generation circuit 39Y. The index sensor 38 is composed of a light receiving device.

Further, the PWM signal generation circuit 34 allows the Y-color image data Dy to be inputted from the image memory 83. After the image data Dy has undergone pulse width modification, the PWM signal generation circuit 34 allows the Y-color laser drive signal Sy to be outputted to the LD drive circuit 35. The PWM signal generation circuit 34 is connected with the LD drive circuit 35, which is connected with a laser diode (not illustrated). Based on the Y-color laser drive signal Sy, the LD drive circuit 35 drives the laser diode and generates Y-color laser beam LY of a predetermined intensity, which is radiated to the polygon mirror 42Y.

The pseudo index forming circuit 12 is connected with the timing signal generation circuit 40 to determine the Y-color image formation start timing. The timing signal generation circuit 40 is further connected with the CPU 55. Based on the VTOP signal outputted from the CPU 55 and selection control signal SS2, the timing signal generation circuit 40 selects the MST-IDX signal outputted from the pseudo index forming circuit 12. At the same time, it counts the pulses of the MST-IDX signals, and determines the Y-color image formation start timing for starting image formation on the front surface of paper based on the pulse count. When the Y-color image formation start timing has been determined, the image formation start signal (hereinafter referred to as STT signal) is outputted to the Y-VV forming circuit 41Y.

Based on the STT signal outputted from the timing signal generation circuit 40, the Y-VV forming circuit 41Y counts the pulses of the YIDX signal, and creates the Y-color sub-scanning valid area signal (hereinafter referred to as YVV signal) for the front surface of paper, based on the pulse count. The YVV signal is outputted to the image memory 83.

The aforementioned PWM signal generation circuit 34 is connected with the Y-color image memory 83, from which the Y-color image data Dy is read in the image formation mode for the rear surface of paper, based on the YVV signal. The R, G and B-color image data is read from the image memory 13 shown in FIG. 2, by the image processing means 16, and the image data Dy is one of Y, M, C and BK color image data items obtained by color conversion of the R, G and B-color image data.

The timing signal generation circuit 40 selects the MST-IDX signal outputted from the pseudo index forming circuit 12 immediately before rear surface image formation starts, according to the VTOP signal and selection control signal SS2 outputted from the CPU 55, and counts the pulses of the MST-IDX signal, and determines the Y-color image formation start timing for starting image formation on the rear surface of paper based on the pulse count. When the Y-color image formation start timing has been determined, the STT signal is outputted to the Y-VV forming circuit 41Y.

Based on the STT signal outputted from the timing signal generation circuit 40, the Y-VV forming circuit 41Y counts the pulses of the YIDX signal, and creates the Y-color YVV signal for the front surface of paper, based on the pulse count. The YVV signal is outputted to the Y-color image memory 83.

The crystal oscillator 11, pseudo index forming circuit 12 and CPU 55 are connected with the polygon drive CLK generation circuit 39Y, and operation is performed in such a way that the Y-color polygon drive CLK signal (YP-CLK signal) is generated, according to the YIDX signal, CLK1 signal, MST-IDX signal, speed setting signal Sv and selection control signal SS1.

The speed setting signal Sv and the selection control signal SS1 are outputted from the CPU 55 to the polygon drive CLK generation circuit 39Y in the front/rear surface image formation mode. The YIDX signal is outputted from the index sensor 38 to the polygon drive CLK generation circuit 39Y. The CLK1 signal is outputted from the crystal oscillator 11 to the polygon drive CLK generation circuit 39Y. The MST-IDX signal is outputted from the pseudo index forming circuit 12 to the polygon drive CLK generation circuit 39Y. An example of the internal configuration of the polygon drive CLK generation circuit 39Y will be described with reference to FIG. 4.

The polygon drive CLK generation circuit 39Y is connected with a motor drive circuit 37. The motor drive circuit 37 is connected with the polygon motor 36 and drives the polygon motor 36 according to the YP-CLK signal. The polygon motor 36 is provided with the polygon mirror 42Y, which is driven in the direction of main scanning by the drive force of the polygon motor 36.

The laser beam LY radiated from a diode (not illustrated) in the aforementioned LD drive circuit 36 is used for main scanning of the photoconductor drum 1Y rotating in the direction of sub-scanning through the rotation of the polygon mirror 42Y. An electrostatic latent image is written to the photoconductor drum 1Y. The electrostatic latent image written to the photoconductor drum 1Y is developed by an Y-color toner member. The Y-color toner image on the photoconductor drum 1Y is transferred to the intermediate transfer belt 6 rotating in the direction of sub-scanning (primary transfer).

The image writing means 3M, 3C and 3K for other colors have the same configuration and functions, and will not be described to avoid duplication. In this example, crystal oscillator 31, image clock generation circuit 32, horizontal synchronization circuit 33, PWM signal generation circuit 34, polygon drive CLK generation circuit 39Y, timing signal generation circuit 40 and Y-VV forming circuit 41Y have been included in the image writing means 3Y for explanation, but the present invention is not restricted to this arrangement. These circuit elements can be included in the image processing means 16 or control means 15.

In this case, it is also possible to make such arrangements that the CPU 55 is provided with the function of the timing signal generation circuit 40. Then in the front surface image formation mode, the image top signal VTOP is raised according to the MST-IDX signal, and the pulses of the MST-IDX signal are counted based on this VTOP signal. The first Y-color image formation start timing for the front surface of paper is determined according to the pulse count. The image writing means 3Y and others are controlled in such a way that, based on the STT signal (image formation start signal) determined in this manner, the pulse of the Y-color YIDX signals are counted, and then the Y-color YVV signal for the front surface of paper is created according to the pulse count.

In the rear surface image formation mode, the CPU 55 causes the image top signal VTOP to rise according to the MST-IDX signal. Based on this VTOP signal, the pulses of the MST-IDX signal are counted. The first Y-color image formation start timing for the rear surface is determined according to the pulse count.

The CPU 55 may control the input/output of the pseudo index forming circuit 12 and image writing means 3Y in such a way that the pulses of YIDX signal for each color are counted based on the image formation start timing determined in this manner, and then the Y-color YVV signal for the rear surface of paper is generated according to the pulse count.

In this example, apart from the YVV signal generation control, when controlling the surface phase of the polygon mirror 42Y and others, the CPU 55 may control the surface phase of the polygon mirror 42Y according to the MST-IDX signal after the MST-IDX signal has been selected for each color.

In this example, the CPU 55 controls the frequency of the YP-CLK signal for each color in the order in which the image formation in each color on the front surface of paper has completed. The CPU 55 sets the rotary speed of the polygon mirror 42Y and others to that of the rear surface of paper, and then controls the surface phase in response to the MST-IDX signal. This control method allows the CPU 55 to control the change in the rotary speed and surface phase of the polygon mirror 42Y and others, upon termination of image formation in each color, based on the MST-IDX signal set to a predetermined cycle, without depending on the reference color IDX signal. Furthermore, this arrangement allows the CPU 55 to control the change in the rotary speed and phase of the polygon mirror of the relevant color, without having to wait for the stabilization of the rotary speed of the polygon mirror 42K set to a reference color, and without having to wait for the adjustment of timing prior to startup of image formation in all other colors.

Figure 4:
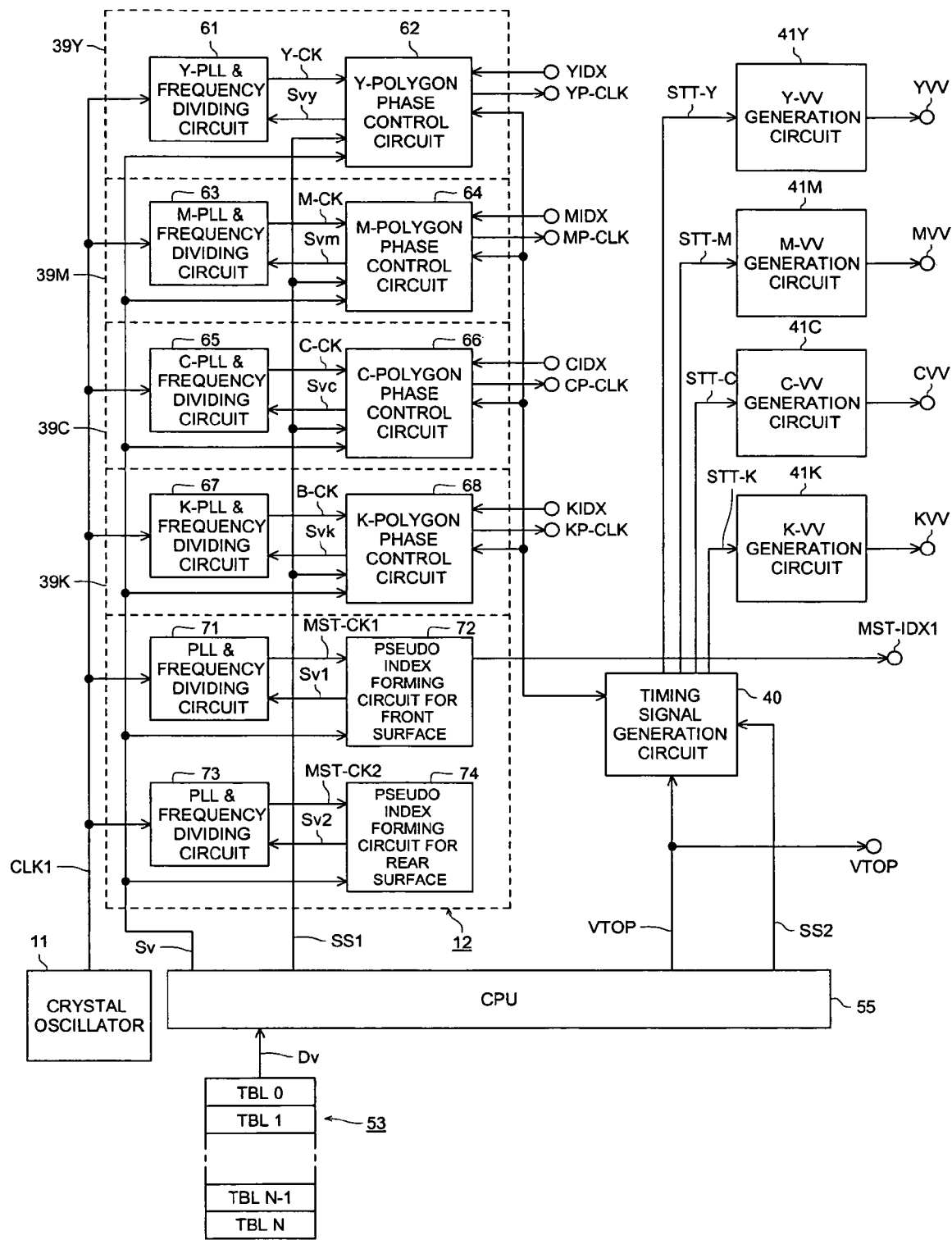
FIG. 4 is a block diagram showing an example of the extracted configuration of polygon drive CLK generation circuits and the peripheral circuits thereof in the image writing means for various color.

FIG. 4 is a block diagram showing an example of the extracted configuration of polygon drive CLK generation circuits 39Y, 39M, 39C and 39K, and the peripheral circuits thereof in the image writing means 3Y, 3M, 3C and 3K for various colors.

The pseudo index forming circuit 12, and polygon drive CLK generation circuits 39Y, 39M, 39C and 39K shown in FIG. 4 are connected to the crystal oscillator 11 as well as to the CPU 55. The CPU 55 is connected with the Y-VV forming circuit 41Y, 41M, 41C and 41K.

The pseudo index forming circuit 12 is composed, for example, of a PLL & frequency dividing circuit 71 and a pseudo index forming circuit 72. The PLL & frequency dividing circuit 71 is connected to the crystal oscillator 11. Based on the speed setting signal Sv, the PLL & frequency dividing circuit 71 divides the frequency of the CLK1 signal outputted from the crystal oscillator 11, and causes the master frequency dividing clock signal (hereinafter referred to as MST-CK signal) to be outputted to the pseudo index forming circuit 72. The pseudo index forming circuit 72 is connected to the PLL & frequency dividing circuit 71 and CPU 55. Based on the speed setting signal Sv outputted from the CPU 55, the pseudo index forming circuit 72 causes the speed setting signal Sv for MST-CK signal to be outputted to the PLL & frequency dividing circuit 71, whereby oscillation is controlled. This oscillation control allows the pseudo index forming circuit 72 to generate the MST-IDX signal having a predetermined cycle, based on the MST-CK signal.

The polygon drive CLK generation circuit 39Y is composed of the Y-PLL & frequency dividing circuit 61 and Y-polygon phase control circuit 62. Based on the speed setting signal Svy outputted from the Y-polygon phase control circuit 62, the Y-PLL & frequency dividing circuit 61 divides the frequency of the CLK1 signal outputted from the crystal oscillator 11 and causes the frequency dividing clock signal (hereinafter referred to as Y-CK signal) to be outputted to the Y-polygon phase control circuit 62.

The Y-polygon phase control circuit 62 is connected with the Y-PLL & frequency dividing circuit 61, and operates to ensure that the speed setting signal Sv outputted from the CPU 55 and the Y-CK signal generation speed setting signal Svy based on the selection control signal SS1 are outputted to the Y-PLL & frequency dividing circuit 61, whereby oscillation is controlled. For example, when the image formation mode shifts from the front surface image formation mode to the rear surface image formation mode, the CPU 55 supplies the speed setting signal Sv to the Y-polygon phase control circuit 62, by referring to the speed shift data of N frequency division data tables stored in the ROM 53.

After determining that front surface image formation by the image writing means 3Y has been completed, the CPU 55 ensures that the value obtained by multiplying the polygon drive CLK frequency by L/L' is set as the polygon drive CLK frequency of the YP-CLK signal in the rear surface image formation mode, whereby the speed setting signal (frequency control signal) Sv is outputted to the polygon drive CLK generation circuit 39Y.

The Y-polygon phase control circuit 62 detects the phase difference between the rising edge of the YIDX signal detected by the index sensor 38 and the rising edge of the pseudo index signal (MST-IDX signal) selected by the selection control signal SS1. Based on this phase difference, the Y-polygon phase control circuit 62 controls the phase of the YP-CLK signal.

This arrangement allows the polygon drive CLK generation circuit 39Y to generate the YP-CLK signal for image formation on paper supplied from the tray 2, according to the speed setting signal Sv outputted from the CPU 55, whereby the YP-CLK signal with its frequency and phase adjusted is outputted to the polygon motor 36 in the image writing means 3Y.

The polygon drive CLK generation circuit 39M is composed of an M-PLL & frequency dividing circuit 63 and an M-polygon phase control circuit 64. Based on the speed setting signal Svm outputted from the Y-polygon phase control circuit 62, the M-PLL & frequency dividing circuit 63 divides the frequency of the CLK1 signal outputted from the crystal oscillator 11 and outputs the frequency dividing signal (hereinafter referred to as M-CK signal) to the M-polygon phase control circuit 64.

Connected to the CPU 55 and M-PLL & frequency dividing circuit 63, the M-polygon phase control circuit 64 outputs to the M-PLL & frequency dividing circuit 63 the speed setting signal Sv outputted from the CPU 55 and the speed setting signal Svm for M-CK signal generation based on the selection control signal SS1, whereby oscillation is controlled. For example, when the image formation mode shifts the front surface image formation mode to the rear surface image formation mode, the CPU 55 supplies the speed setting signal Sv to the M-polygon phase control circuit 64, by referring to the frequency division data table.

Connected to an M-VV forming circuit 41M, the M-polygon phase control circuit 64 selects the MST-IDX signal outputted from the pseudo index forming circuit 12, in the front surface image formation mode or in the rear surface image formation mode, based on the VTOP signal and selection control signal SS2 outputted from the CPU 55. At the same time, it counts the pulses of the MST-IDX signal according to the VTOP signal and generates the M-color image formation start signal STT-M. Furthermore, according to the SST-M signal, it counts the pulses of the MDIX signal, and generates the M-color MVV signal (M-color sub-scanning valid area signal) in the front surface image formation mode, based on the pulse count. The MVV signal is outputted to an LD drive circuit (not illustrated), motor drive circuit and M-color image memory by the image writing means 3M shown in FIG. 2. The MVV signal is used, for example, as a read-out control signal when reading out the first image data Dm from the M-color image memory.

Immediately before termination of the front surface image formation or before switching of paper feed from the tray 1 to the tray 2, based on the selection control signal SS2 outputted from the CPU 55, the M-VV forming circuit 41M selects the MST-IDX signal outputted from the pseudo index forming circuit 12. At the same time, the M-VV forming circuit 41M counts the pulses of the MST-IDX signal according to the VTOP signal and generates the M-color image formation start signal STT-M. Based on the SST-M signal, the M-VV forming circuit 41M counts the pulses of the MIDX signal and generates the M-color MVV signal according to the pulse count. The MVV signal is outputted to an LD drive circuit (not illustrated), motor drive circuit and M-color image memory (not illustrated) by the image writing means 3M. The MVV signal is used, for example, as a read-out control signal when reading out the second image data Dm from the M-color image memory.

The polygon drive CLK generation circuit 39C is composed of an C-PLL & frequency dividing circuit 65 and a C-polygon phase control circuit 66. Based on the speed setting signal Svc outputted from the C-polygon phase control circuit 62, the C-PLL & frequency dividing circuit 65 divides the frequency of the CLK1 signal outputted from the crystal oscillator 11 and outputs the frequency dividing signal (hereinafter referred to as C-CK signal) to the C-polygon phase control circuit 66.

Connected to the CPU 55 and C-PLL & frequency dividing circuit 65, the C-polygon phase control circuit 66 outputs to the C-PLL & frequency dividing circuit 65 the speed setting signal Sv outputted from the CPU 55 and the speed setting signal Svc for C-CK signal generation based on the selection control signal SS1, whereby oscillation is controlled. For example, when the image formation mode shifts from the front surface image formation to the rear surface image formation, the CPU 55 supplies the speed setting signal Sv to the C-PLL & frequency dividing circuit 65, by referring to the frequency division data table. Further, when switching the sheet feed from tray 1 to tray 2, the CPU 55 supplies speed setting signal Sv to the C-PLL & frequency dividing circuit 65 by referring to the frequency division data table.

Connected to the C-VV forming circuit 41C, the C-polygon phase control circuit 66 selects the MST-IDX signal outputted from the pseudo index forming circuit 12, in the front surface image formation mode, based on the VTOP signal and selection control signal SS2 outputted from the CPU 55. At the same time, it counts the pulses of the MST-IDX signal according to the VTOP signal and generates the C-color image formation start signal STT-C. Furthermore, according to the SST-C signal, it counts the pulses of the CIDX signal, and generates the C-color CVV signal (C-color sub-scanning valid area signal) in the front surface image formation mode, based on the pulse count. The CVV signal is outputted to an LD drive circuit (not illustrated), motor drive circuit and C-color image memory by the image writing means 3C shown in FIG. 2. The CVV signal is used, for example, as a read-out control signal when reading out the first image data Dc from the C-color image memory.

Immediately before termination of the front surface image formation or before switching of paper feed from the tray 1 to the tray 2, based on the selection control signal SS2 outputted from the CPU 55, the C-VV forming circuit 41C selects the MST-IDX signal outputted from the pseudo index forming circuit 12. At the same time, the C-VV forming circuit 41C counts the pulses of the MST-IDX signal according to the VTOP signal and generates the C-color image formation start signal STT-C. Based on the SST-C signal, the C-VV forming circuit 41C counts the pulses of the CIDX signal and generates the C-color CVV signal according to the pulse count. The CVV signal is outputted to an LD drive circuit (not illustrated), motor drive circuit and C-color image memory (not illustrated) by the image writing means 3C. The CVV signal is used, for example, as a read-out control signal when reading out the second image data Dc from the C-color image memory.

The polygon drive CLK generation circuit 39K is composed of an K-PLL & frequency dividing circuit 67 and a polygon phase control circuit 68. Based on the speed setting signal Svk outputted from the K-polygon phase control circuit 68, the K-PLL & frequency dividing circuit 67 divides the frequency of the CLK1 signal outputted from the crystal oscillator 11 and outputs the frequency dividing signal (hereinafter referred to as K-CK signal) to the K-polygon phase control circuit 68.

Connected to the CPU 55 and K-PLL & frequency dividing circuit 67, the K-polygon phase control circuit 68 outputs to the K-PLL & frequency dividing circuit 67 the speed setting signal Sv outputted from the CPU 55, and the speed setting signal Svk for K-CK signal generation based on the selection control signal SS1, whereby oscillation is controlled. For example, when the image formation mode shifts from the front surface image formation to the rear surface image formation, the CPU 55 supplies the speed setting signal Sv to the K-PLL & frequency dividing circuit 68, by referring to the frequency division data table. Further, when switching the sheet feed from tray 1 to tray 2, the CPU 55 supplies speed setting signal Sv to the K-PLL & frequency dividing circuit 65 by referring to the frequency division data table.

Connected with the K-VV forming circuit 41K, the K-polygon phase control circuit 68 selects the MST-IDX signal outputted from the pseudo index forming circuit 12, in the front surface image formation mode, based on the VTOP signal and selection control signal SS2 outputted from the CPU 55. At the same time, it counts the pulses of the MST-IDX signal according to the VTOP signal and generates the BK-color image formation start signal STT-K. Furthermore, according to the SST-K signal, it counts the pulses of the KIDX signal, and generates the BK-color KVV signal (BK-color sub-scanning valid area signal) in the front surface image formation mode, based on the pulse count. The KVV signal is outputted to an LD drive circuit (not illustrated), motor drive circuit and K-color image memory by the image-writing means 3K shown in FIG. 2.

Immediately before termination of the front surface image formation or before switching of paper feed from the tray 1 to the tray 2, based on the selection control signal SS2 outputted from the CPU 55, the K-VV forming circuit 41K selects the MST-IDX signal outputted from the pseudo index forming circuit 12. At the same time, the K-VV forming circuit 41K counts the pulses of the MST-IDX signal according to the VTOP signal and generates the BK-color image formation start signal STT-K. Based on the SST-K signal, the K-VV forming circuit 41K counts the pulses of the KIDX signal and generates the BK-color KVV signal in the rear surface image formation, for example, according to the pulse count. The KVV signal is outputted to an LD drive circuit (not illustrated), motor drive circuit and BK-color image memory (not illustrated) by the image writing means 3K.

Figure 5:
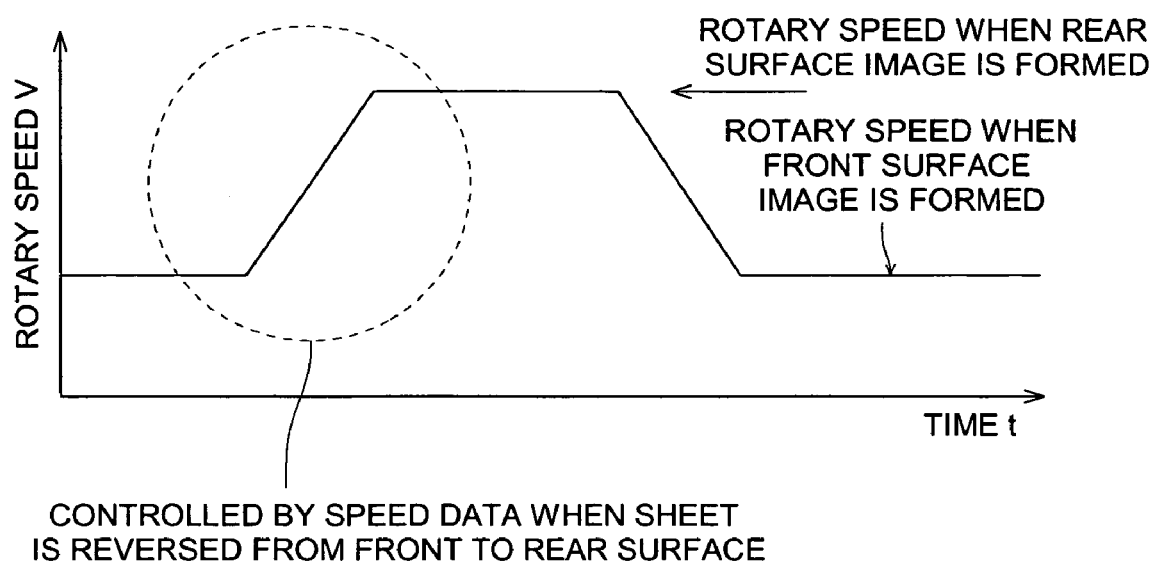
FIG. 5 is a graphic chart showing an example of the speed characteristics of a polygon motor for switching the front/rear image formation mode.

FIG. 5 is a graphic chart showing an example of the speed characteristics of a polygon motor 36 for switching the front/rear image formation mode. In FIG. 5, time t is plotted on the horizontal axis and the rotary speed V of the polygon mirror 42Y is plotted on their vertical axis. In this example, the rotary speed of the polygon mirror 42Y in the front surface image formation mode is expressed as V1, and the rotary speed of the polygon mirror 42Y in the rear surface image formation mode is expressed as V2. The relationship between rotary speeds V1 and V2 is set to V2>V1.

Thus, when shifting from the front surface image formation of the first sheet of paper to the rear surface image formation (hereinafter referred to as "at the time of speed shift"), the aforementioned arrangement allows a speed control of gradually raising the rotary speed, for example. In the figure, the speed data at the time of speed shift is stored as a frequency dividing table in the ROM 53, and the frequency dividing table is used for referencing. The frequency dividing table is decoded, for example, by the CPU 55 and is outputted to the each of the Y-polygon phase control circuits 62, 64, 66 and 68 of FIG. 4 as a speed setting signal Sv.

When duplex image formation is made on the second sheet of paper subsequent to termination of duplex image formation on the first sheet of paper, and the rear surface image formation of the first sheet is shifted to the front surface image formation of the second sheet, speed control is provided in such a way as to reduce the rotary speed gradually. The frequency division at the time of speed shift in this case is also stored in the frequency dividing table of the ROM 53 and this frequency dividing table is used for referencing. This arrangement enables the rotary speed of the polygon mirror 42Y and others to be controlled at the time of switching the front/rear surface image formation mode.

Figure 6:
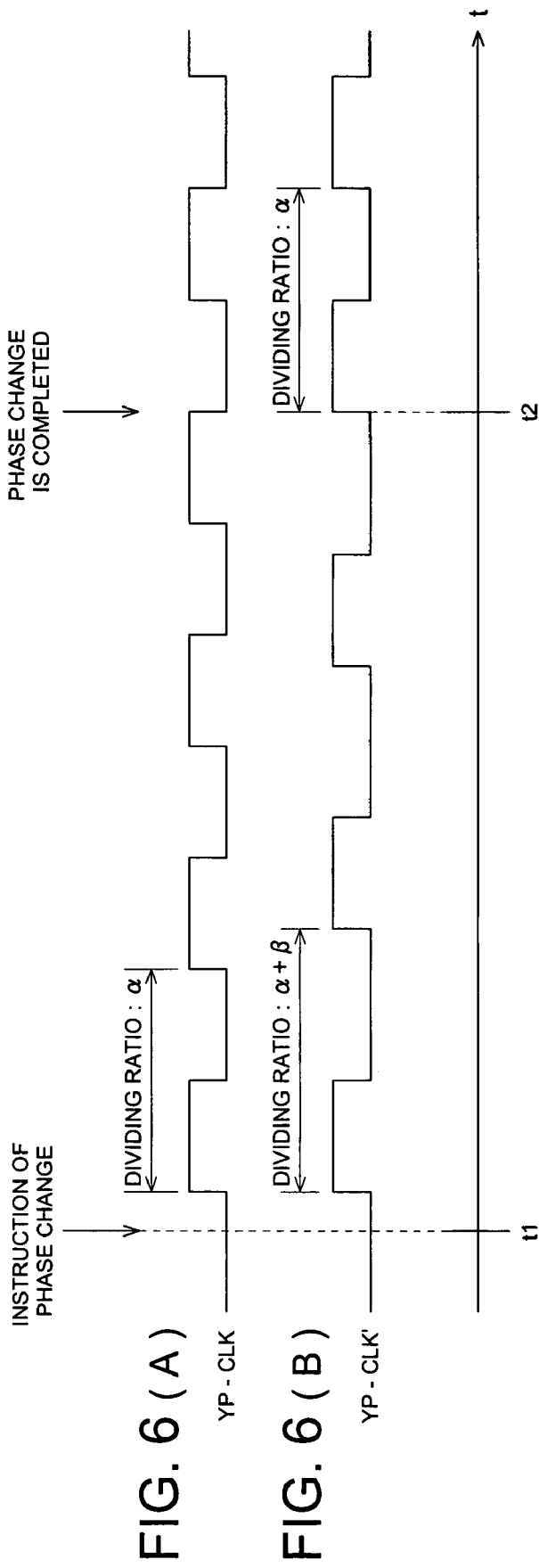
FIGS. 6(A) and (B) are time charts representing an example of controlling the phase of the Y-polygon phase control circuit 62 and others for switching the front/rear surface image formation mode, or switching the tray.

FIGS. 6(A) and (B) are time charts representing an example of controlling the phase of the Y-polygon phase control circuit 62 and others for switching the front/rear surface image formation mode, or switching the tray. In FIGS. 6(A) and (B), time t is plotted on the horizontal axis and the amplitude of the polygon drive CLK signal (YP-CLK signal) is plotted on their vertical axis.

In this example, the normal division ratio is a and that at the time of phase shift is ($\alpha+\beta$). Under this condition, the case of reversing the phase of the LK is assumed. $\beta$ is a constant, and $0<\beta\leq 1$. In this case, if the phase change instruction is given at time t1, for example, the phase of the YP-CLK signal lags $\beta$. Agreement is reached between the falling edge of the waveform the YP-CLK signal at time t2 and the rising edge of the waveform of the YP-CLK' signal wherein the phase of the YP-CLK signal lags $\beta$. Thus, the shift in excess of time t2 is carried out so as to output the YP-CLK' as the reversal of division ratio α. In this example, the case of reversing the phase of the YP-CLK signal has been discussed. In the case of phase from 0° through 180°, the phase of the YP-CLK signal can be controlled by specifying a constant β.

In this example, when the rotary speed and surface phase of the polygon mirror 42Y are controlled at the time of switching the front/rear image formation mode, the CPU 55 gives an instruction of Front Surface Image Formation or Rear Surface Image Formation to the image writing means 3Y and others before the rise of the image top signal (VTOP signal) in the case of changing the rotary speed, and before the start of surface phase in the case of controlling the surface phase. This procedure controls timing signal generation circuit 40 to select the MST-IDX signal according to the setting of the front surface image formation or rear surface image formation at the time of VTOP signal detection, and to count the pulses of the MST-IDX signal.

The control provided in the aforementioned manner makes it possible to control the changes in the rotary speed and surface phase of the polygon mirror 42Y and others, subsequent to termination of image formation in each color, according to the MST-IDX signal set at a predetermined cycle. This arrangement allows the change in the rotary speed of the polygon mirror 42Y and others and the change in the surface phase to be controlled, without having to wait for stabilization of the rotary speed of the polygon mirror 42K set to the reference color, and without having to wait for the adjustment of the timing before the start of image formation in all other colors. Moreover, this arrangement ensures a high accuracy and high productivity in the image formation on both the front and rear surfaces of paper P, with a high-precision color resist formed, without being affected by fluctuation of the indexing interval caused by changes in the rotary speed of the polygon mirror 42Y and others or in the surface phase.

When the rotary speed and surface phase of the polygon mirror 42Y and others are changed at the time of switching between the trays, the CPU 55 gives information on tray 1 or tray 2 to the image writing means 3Y and others before the rise of the image top signal (VTOP signal) in the case of changing the rotary speed, and before the start of surface phase in the case of controlling the surface phase. This procedure controls timing signal generation circuit 40 to select the MST-IDX signal according to the setting of the tray 1 or tray 2 at the time of VTOP signal detection, and to count the pulses of the MST-IDX signal.

The control provided in the aforementioned manner makes it possible to control the changes in the rotary speed and surface phase of the polygon mirror 42Y and others, subsequent to termination of image formation in each color, according to the MST-IDX signal set at a predetermined cycle. This arrangement allows the change in the rotary speed of the polygon mirror 42Y and others and the change in the surface phase to be controlled, without having to wait for stabilization of the rotary speed of the polygon mirror 42K set to the reference color, and without having to wait for the adjustment of the timing before the start of image formation in all other colors. Moreover, this arrangement permits color image formation on a predetermined surface of paper P fed from the tray 2 with a high-precision color resist formed at the time of tray switching, without being affected by fluctuation of the indexing interval caused by changes in the rotary speed of the polygon mirror 42Y and others or in the surface phase. This arrangement also ensures a high accuracy in image formation and high productivity in the processing of color image formation.

FIGS. 7(A) through (F) are time charts representing an example of changing the phase of the polygon drive CLK signal phase of the image writing means 3Y and others. In this example, phase control shown in FIGS. 6(A) and (B) is applied to the Y-color YP-CLK signal. For example, in the image writing means 3Y, the phase of the YP-CLK signal whose timing is controlled by the YIDX signal with a two-clock lag behind the CLK1 signal with reference to the MST-IDX signal is changed into the YP-CLK' signal, subsequent to phase reversal, whose timing is controlled, using the YIDX signal synchronized with the MST-IDX signal by advancing the phase by two clocks with the CLK1 signal.

When the MST-IDX signal shown in FIG. 7(A) is used as a reference, the YIDX signal shown in FIG. 7(B) has a two-clock lag behind the CLK1 signal shown in FIG. 7(D) in some cases, in the image writing means 3Y shown in FIG. 3. Further, the YP-CLK signal given in FIG. 7(C) has its timing controlled by the YIDX signal of FIG. 7(B). The phase of this YIDX signal is advanced two clocks by the CLK1 signal to achieve synchronization with the MST-IDX signal. This procedure allows the timing of the Y'P-CLK signal of FIG. 7(F) subsequent to phase reversal to be controlled by the YIDX signal of FIG. 7(E).

As described above, if the cycle of the YIDX signal controlled by the MST-IDX signal and that of the YP-CLK signal controlled by this YIDX signal are in the relation of α to 1 (where α is an integer), then the phase relation between the YIDX signal controlled by the MST-IDX signal and the YP-CLK signal controlled by the YIDX signal is determined uniquely. This allows the phase change to be controlled, as described above. The polygon drive CLK signal such as the YP-CLK signal can be obtained by dividing the frequency of the CLK1 signal shown in FIG. 7(D).

Figure 8:
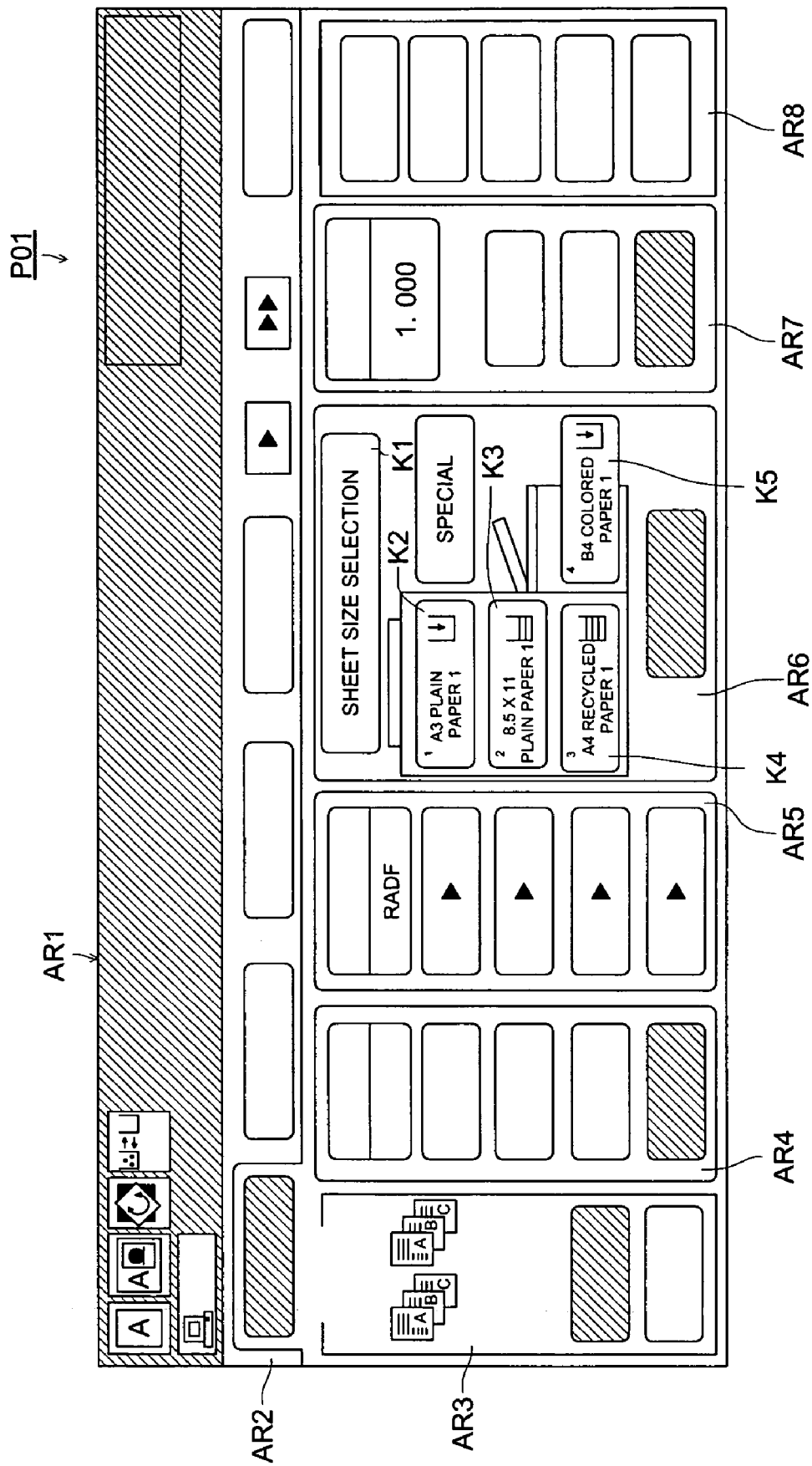
FIG. 8 is a conceptual diagram showing an example of display on the basic setting screen P01 in the operation panel 48.

FIG. 8 is an conceptual diagram showing an example of display on the basic setting screen P01 in the operation panel 48. The basic setting screen P01 shown in FIG. 8 is displayed on the operation panel 48 after power has been turned on, for example, following the wake-up screen and warm-up screen. The basic setting screen P01 is composed, for example, of a message area AR1 and an output job display area AR2. The message area AR1 contains a message, such as "You can reserve copying. Press an unoccupied JOB".

The output job display area AR2 comprises a finish display area AR3, a color/monochrome select display area AR4, an image formation mode area AR5, a paper size select display area AR6, a scaling factor setting display area AR7, and an application setting display area AR8. The color/monochrome select display area AR4 contains the icons "Single color", "Black/white" and "Automatic" to permit selection of the color mode. The image formation mode area AR5 contains the ions "Simplex/duplex select (RADF)", "Duplex→duplex", "Duplex→simplex", "Simplex→duplex" and "Simplex→simple". In this example, the "Simplex→duplex" and "Simplex→simple" icons are displayed by default.

The paper size select display area AR6 contains an icon key K1, "Paper size selection". Ion keys K1 through K5, "A3-sized plain paper 1", "8.5×11 plain paper 1", "A4-sized recycled paper 1" and "B4-sized colored paper 1", for example, will appear when this icon key K1 is pressed. The "Magnification: 1.000", "Automatic" and "Scaling" and "Life size" are indicated on the scaling factor setting display area AR7. An "Application setting" icon appears on the application setting display area AR8. The "Application setting" icon contains the indications of "Image quality adjustment", "Document setting", "Application function", "Automatic image rotation release" and "Document read". When selecting the type of paper, the user can select one of the keys K1 through K5 from the paper size select display area AR6.

FIG. 9 is a chart showing an example of a control table for each type of paper. The image formation condition setting table shown in FIG. 9 is stored in the ROM 53, for example. This control table provides setup items—such as fixing temperature (° C.), transfer current (μA) and magnification—to be selected according to the type of paper such as plain paper, recycled paper, coated paper and OHT paper.

In this example, the fixing temperature of the plain paper A is set to 200° C., whereas the fixing temperature of the plain paper B is set to 210° C. in the case of the front surface of paper and to 205° C. in the case of the rear surface. The fixing temperature of the coated paper A is set to 195° C. for both the front and rear, whereas the fixing temperature of the coated paper B is set to 185° C. for both the front and rear. The fixing temperature of the OHT paper A is set to 190° C. for both the front and rear, whereas the fixing temperature of the OHT paper B is set to 185° C. for both the front and rear.

The transfer current of plain paper A is set to 45 μA for both the front and rear surfaces, while the transfer current of plain paper B is set to 30 μA for the front surface. The fixing temperature on the front surface is set to 210° C. in the case of plain paper B, and the surface facing temperature on the rear surface is set to 205° C.

The fixing temperature of the recycled paper is set to 190° C. for both the front and rear surfaces, whereas the fixing temperature of the recycled paper B is set to 190° C. for the front surface, and to the 185° C. for the rear surface. The transfer current of recycled paper A is set to 45 μA for both the front and rear surfaces, while the transfer current of recycled paper B is set to 35 μA for both the front and rear. The transfer current of coated paper A is set to 50 μA for both the front and rear surfaces, while the transfer current of coated paper B is set to 70 μA for both the front and rear. In the case of the OHT paper A, the transfer current is set to 60 μA for the front and to the 65 μA for the rear. In the case of the OHT paper B, the transfer current is set to 65 μA for the front and rear.

The magnification of plain paper A is set to +0.3% for the front and to −0.5% on the rear, while that of plain paper B is set to +0.3% for the front and to −0.6% on the rear. The magnification of recycled paper A is set to +0.4% for the front and to −0.6% on the rear, while that of recycled paper B is set to +0.4% for the front and to −0.7% on the rear.

The magnification of coated paper A is set to +0.4% for the front and to −0.6% on the rear, while that of coated paper B is set to +0.4% for the front and to −0.9% on the rear. The magnification of OHT paper A is set to +0.3% for the front and to −0.5% on the rear, while that of OHT paper B is set to +0.3% for the front and to −0.5% on the rear. When the type of paper has been set, The CPU 55 shown in FIG. 2 refers to the ROM 53 and controls the image forming units 10Y, 10M, 10C and 10K in such a way that the fixing temperature, transfer current and magnification are changed in response to the type of paper.

Figure 10:
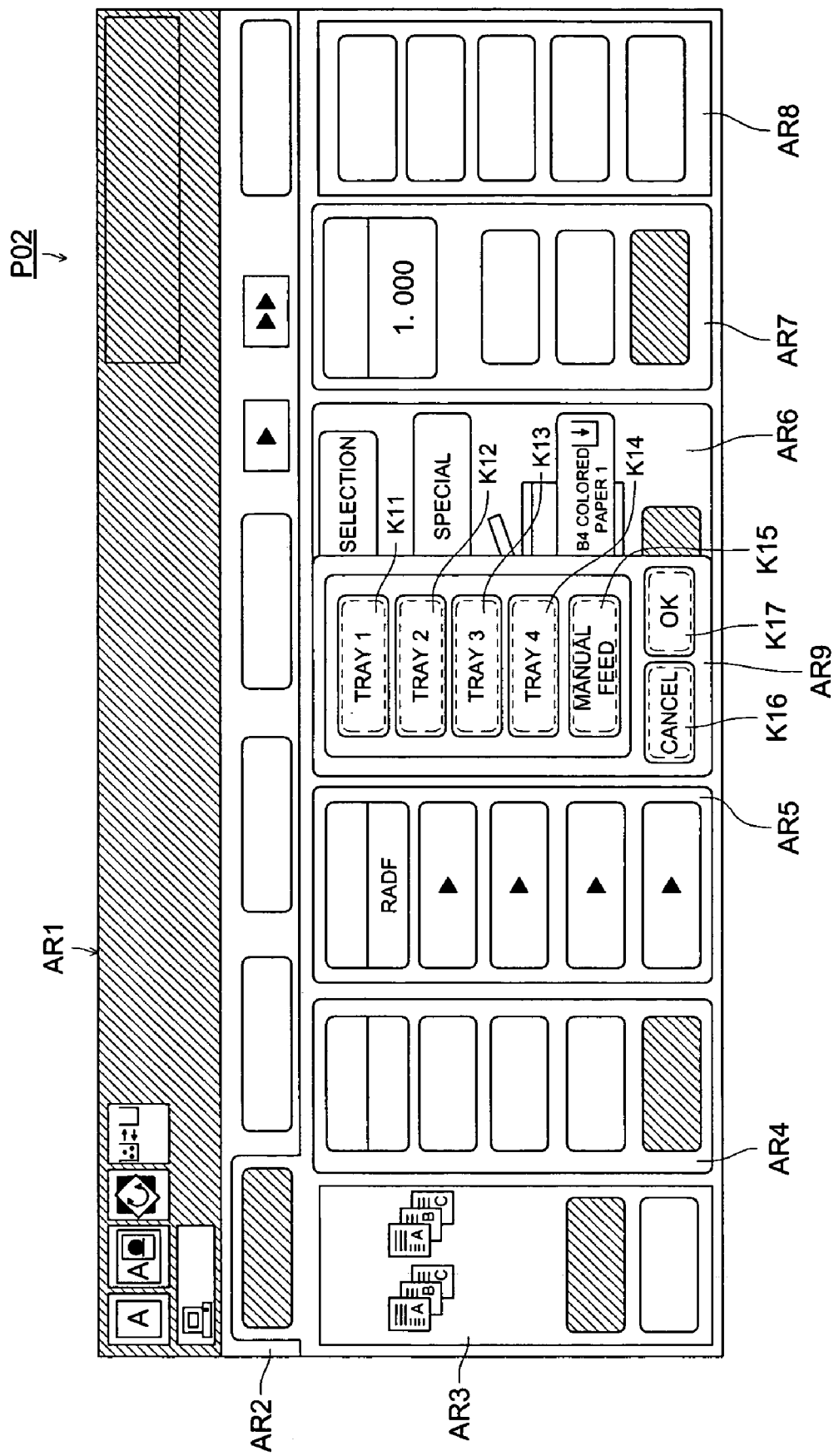
FIG. 10 is a drawing showing an example of popup display on the tray selection screen P02.

FIG. 10 is a drawing showing an example of popup display on the tray selection screen P02. The tray selection screen P02 shown in FIG. 10 corresponds to the paper size select display area AR6 shown in FIG. 9. When the icon key K1 "Paper size selection", for example, has been pressed several times, a popup display appears in the left portion of the paper size select display area AR6. In the example of the popup display, icon keys "Cancel", "OK" and others are displayed in addition to "Tray 1", "Tray 2", "Tray 3", "Tray 4" and "Manual feed".

In this example, when a print job is reserved, paper P1 and paper P2 of different paper types are fed alternately from the "Tray 1" and "Tray 2", and the system is placed in the image formation mode where the image formation output is given to both sides of the paper P1 and paper P2. According to this image formation mode, processing of image formation is applied. In this case, the icon key K11 "Tray 1" is pressed to set the "Number of copies" and "Duplex", or the icon key K12 "Tray 2" is pressed to set the "Number of copies" and "Duplex". Together with the image data Din, the tray switching information programmed in this case is stored in the image memory 13. For example, the tray switching information is described on the page header constituting the print job information, and is sent to the image memory 13 after having been attached to the image data Din.

When the aforementioned image formation mode has been set, the image forming units 10Y, 10M, 10C and 10K allows a color image to be formed on the front of the paper P1 fed from the "Tray 1". It then allows a color image to be formed on the front of the paper P2 fed from the "Tray 2". Then a color image is formed on the rear of the paper P1 on whose rear surface a color image is already formed, and a color image is formed on the rear of the paper P2 on whose rear surface a color image is already formed. According to this procedure, processing of image formation is applied to a specified number of sheets of paper P1 and paper P2.

The following describes the operation of the color copying machine 100 as a first embodiment of the present invention. FIGS. 11(A) through (M) are time charts representing an example of operation in an improved version of image formation start timing method (based on Y-color).

Figure 11:
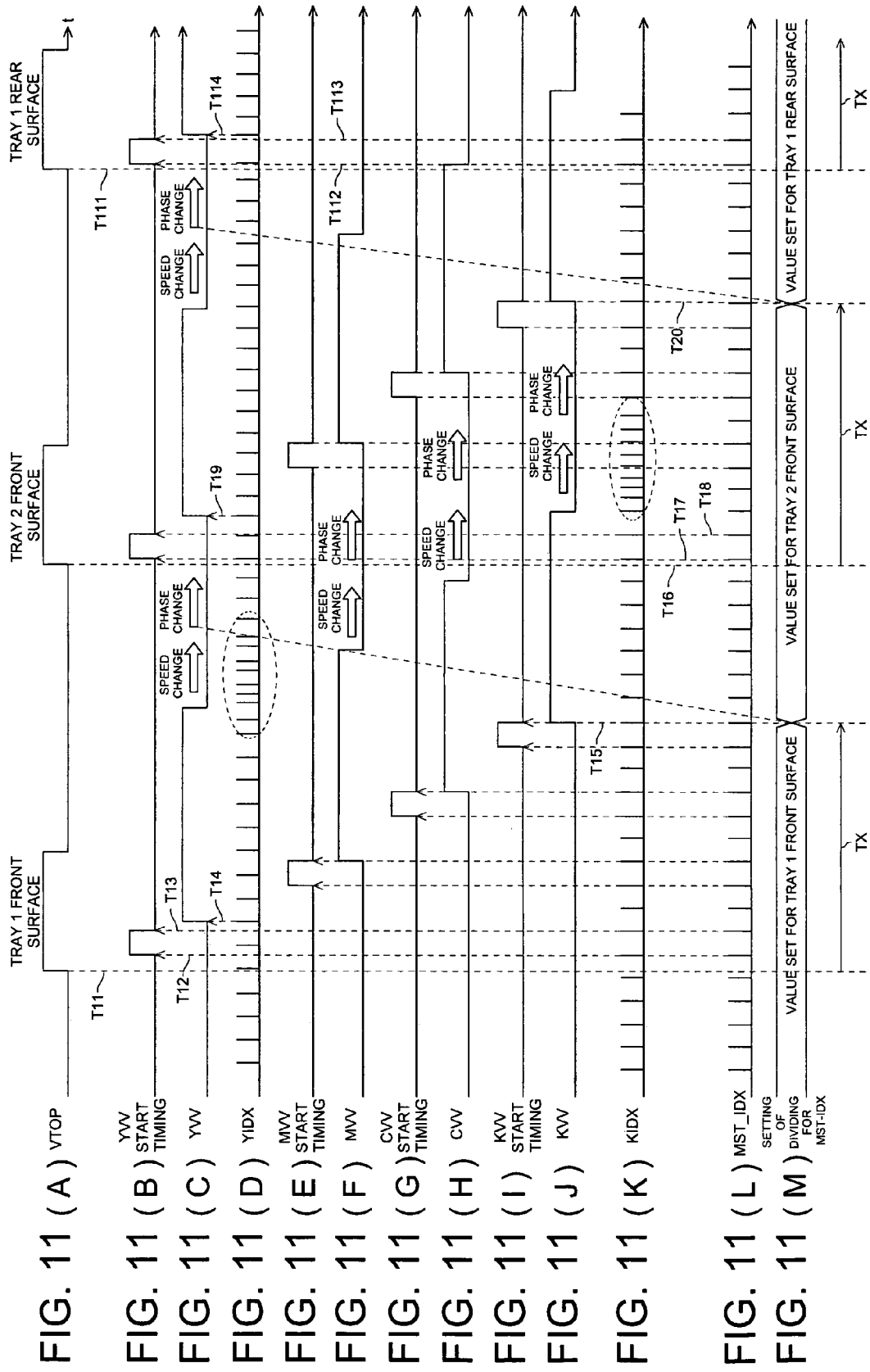
FIGS. 11(A) through (M) are time chart representing an example of operation in an improved version of image formation start timing method (based on BK-color)

In this embodiment, a single MST-IDX signal is output from the pseudo index forming circuit 12. The following describes the case where the surface phase of the Y, M, C and BK-color polygon mirror 42Y and others is controlled based on the MST-IDX signal fixed to a specified cycle (frequency). In this example, the MST-IDX signal shown in FIG. 11(L) is used as a reference index signal for the adjustment of polygon phase.

An example will be chosen from the case where Y, M, C and BK-color YVV, MVV, CVV, KVV start timing is determined by courting the pulses wherein the MST-IDX signal is used as a count source during the time period TX from the rise of the VTOP signal for tray 1 surface image formation to the time of the tray 1 front surface set value being rewritten into the tray 2 front surface set value. As for the MST-IDX signal frequency dividing set value, along with the print start (not illustrated), the tray 1 front surface set value shown in FIG. 11(M) is stored in the RAM 54. After that, the tray 1 front surface set value, tray 2 front surface set value, tray 1 rear surface set value and tray 2 rear surface set value are set in that order.

In this example, the frequency division setting change timing of the MST-IDX signal is determined prior to start of the first image formation (Y) phase change, after the KVV signal of the final color (BK color) has risen. Further, paper feed control is provided in such a way that the paper P2 is fed from the tray 2 to the image formation system in such a way that the VTOP signal for tray 2 front surface image formation can be detected after the control of the phase change of the first image formation (Y) of the paper P1 from the tray 1 has terminated.

[Example of Controlling the Tray 1 Front Surface]

The VTOP signal for tray 1 front surface shown in FIG. 11(A) rises at time T11 when the leading edge of the paper P1 fed out of the tray 1 is detected. Subsequent to rise of the VTOP signal, the pulses of the MST-IDX signal are counted by the MST-IDX counter (not illustrated), and the YVV start timing signal shown in FIG. 11(B) rises at the time T12 synchronized with the first pulse count output of the MST-IDX signal. After that, the YVV signal start timing signal rises at the time T13 synchronized with the second pulse count of the MST-IDX signal.

After the YVV start timing signal has been issued, the pulses of the YIDX signal shown in FIG. 11(D) are counted by an YIDX counter (not illustrated) and the YVV signal for the tray 1 front surface shown in FIG. 11(C) rises at the time T14 synchronized with the first pulse count output of the YIDX signal. The duration when the YVV signal stays on the H level is determined by counting the pulses of the actual YIDX signal. While the YVV signal is on the H level, processing of Y-color image formation is applied to the front surface of the paper P1 fed from the tray 1. Upon termination of the Y-color image formation, the rotary speed of the Y-color polygon mirror 42Y is controlled. During the rotary speed control, the YIDX signal frequency fluctuates. Subsequent to rotary speed control, the CPU 55 controls the surface phase of Y-color polygon mirror 42Y based on the MST-IDX signal.

The pulses of the MST-IDX signal are counted by an MST-IDX counter (not illustrated) even after the YVV signal start timing signal has occurred. In this example, the MVV start timing signal shown in FIG. 11(E) rises at the time synchronized with the fourth pulse count output of the MST-IDX signal, and falls at the time synchronized with the fifth pulse count output of the MST-IDX signal. Subsequent to occurrence of the MVV start timing signal, the pulses of the MIDX signal are counted by an MIDX counter (not illustrated) and the MVV signal for the tray 1 front surface shown in FIG. 11(F) rises at the time synchronized with the first pulse count output of the MIDX signal. The duration when the MVV signal stays on the H level is determined by counting the pulses of the actual MIDX signal. While the MVV signal is on the H level, processing of M-color image formation is applied to the front surface of the paper P1 fed from the tray 1. Upon termination of the M-color image formation, the rotary speed of the M-color polygon mirror 42M is controlled. During the rotary speed control, the MIDX signal frequency fluctuates. Subsequent to rotary speed control, the CPU 55 controls the surface phase of M-color polygon mirror 42M based on the MST-IDX signal.

The pulses of the MST-IDX signal are counted by an MST-IDX counter (not illustrated) even after the YVV signal start timing signal and MVV signal start timing signal have occurred. In this example, the CVV start timing signal shown in FIG. 11(G) rises at the time synchronized with the seventh pulse count output of the MST-IDX signal, and falls at the time synchronized with the eighth pulse count output of the MST-IDX signal. Subsequent to occurrence of the CVV start timing signal, the pulses of the CIDX signal are counted by an CIDX counter (not illustrated) and the CVV signal for the tray 1 front surface shown in FIG. 11(H) rises at the time synchronized with the first pulse count output of the CIDX signal. The duration when the CVV signal stays on the H level is determined by counting the pulses of the actual CIDX signal. While the CVV signal is on the H level, processing of C-color image formation is applied to the front surface of the paper P1 fed from the tray 1. Upon termination of the C-color image formation, the rotary speed of the C-color polygon mirror 42C is controlled. During the rotary speed control, the CIDX signal frequency fluctuates. Subsequent to rotary speed control, the CPU 55 controls the surface phase change of C-color polygon mirror 42C based on the CST-IDX signal.

The pulses of the MST-IDX signal are counted by an MST-IDX counter (not illustrated) even after the YVV signal start timing signal, MVV signal start timing signal and CVV signal start timing signal have occurred. In this example, the CVV start timing signal shown in FIG. 11(I) rises at the time synchronized with the tenth pulse count output of the MST-IDX signal, and falls at the time synchronized with the eleventh pulse count output of the MST-IDX signal. Subsequent to occurrence of the KVV start timing signal, the pulses of the KIDX signal shown in FIG. 11(K) are counted by an KIDX counter (not illustrated) and the KVV signal for the tray 1 front surface shown in FIG. 11(J) rises at the time synchronized with the first pulse count output of the KIDX signal. The duration when the KVV signal stays on the H level is determined by counting the pulses of the actual KIDX signal. While the KVV signal is on the H level, processing of BK-color image formation is applied to the front surface of the paper P1 fed from the tray 1.

In this example, the frequency division setting value for MST-IDX signal shown in FIG. 11(M) is rewritten from the tray 1 front surface setting value to the tray 2 front surface setting value at the time T15 after the KVV signal of the final color (BK color) has risen. Switching of this setting value is carried out at the rising edge of the KVV signal that rises synchronously with the KIDX signal shown in FIG. 11(K) before the rotary speed of the Y-color polygon mirror 42Y is controlled and the phase change is controlled.

[Example of Controlling the Tray 2 Front Surface]

Subsequent to termination of the Y-color image formation on the paper P1 fed from the tray 1 and phase change control of the Y-color polygon mirror 42Y, paper P2 is fed from the tray 2 to the image formation device by the CPU 55. The leading edge of the paper P2 fed from the tray 2 is detected at the time T16 shown in FIG. 11(A), and the VTOP signal for the tray 2 front surface rises.

After the rise of the VTOP signal, the pulses of the MST-IDX signal are counted by the MST-IDX counter (not illustrated), and the YVV signal for the tray 2 front surface shown in FIG. 11(B) rises at the time T17 synchronized with the first pulse count output of the MST-IDX signal. Then the YVV signal start timing signal falls at the time T18 synchronized with the second pulse count output of the MST-IDX signal.

Subsequent to occurrence of the YVV start timing signal, the pulses of the YIDX signal shown in FIG. 11(D) are counted by an YIDX counter (not illustrated) and the MYV signal for the tray 2 front surface shown in FIG. 11(C) rises at the time T19 synchronized with the first pulse count output of the YIDX signal. In this example, subsequent to the rise of the YVV signal for tray 2 front surface, processing of the BK-color image formation terminates, and the rotary speed control of the BK-color polygon mirror 42K is provided. The frequency of the KIDX signal fluctuates during speed and phase change control.

Subsequent to occurrence of the YVV start timing signal, the pulses of the YIDX signal shown in FIG. 11(D) are counted by an YIDX counter (not illustrated) and the MYV signal for the tray 2 front surface shown in FIG. 11(C) rises at the time T19 synchronized with the first pulse count output of the YIDX signal. The duration when the YVV signal stays on the H level is determined by counting the pulses of the actual YIDX signal. While the KVV signal is on the H level, processing of Y-color image formation is applied to the front surface of the paper P2 fed from the tray 2. Subsequent to the termination of Y-color image formation, the rotary speed control of the Y-color polygon mirror 42Y is provided. The frequency of the YIDX signal fluctuates during speed and phase control. After rotary speed control, the CPU 55 controls the surface phase of the Y-color polygon mirror 42Y based on the MST-IDX signal.

Similarly, the pulses of the MST-IDX signal are counted by an MST-IDX counter (not illustrated) even after the YVV signal start timing signal has occurred. In this example, the MVV start timing signal shown in FIG. 1(E) rises at the time synchronized with the fifth pulse count output of the MST-IDX signal, and falls at the time synchronized with the sixth pulse count output of the MST-IDX signal. Subsequent to occurrence of the MVV start timing signal, the pulses of the MIDX signal are counted by an MIDX counter (not illustrated) and the MVV signal for the tray 2 front surface shown in FIG. 11(F) rises at the time synchronized with the first pulse count output of the MIDX signal. The duration when the MVV signal stays on the H level is determined by counting the pulses of the actual MIDX signal. While the MVV signal is on the H level, processing of M-color image formation is applied to the front surface of the paper P2 fed from the tray 2. Upon termination of the M-color image formation, the rotary speed of the M-color polygon mirror 42M is controlled. During the rotary speed control, the MIDX signal frequency fluctuates. Subsequent to rotary speed control, the CPU 55 controls the surface phase of M-color polygon mirror 42M based on the MST-IDX signal.

The pulses of the MST-IDX signal are counted by an MST-IDX counter (not illustrated) even after the YVV signal start timing signal and MVV signal start timing signal have occurred. In this example, the CVV start timing signal shown in FIG. 11(G) rises at the time synchronized with the eighth pulse count output of the MST-IDX signal, and falls at the time synchronized with the ninth pulse count output of the MST-IDX signal. Subsequent to occurrence of the CVV start timing signal, the pulses of the CIDX signal are counted by an CIDX counter (not illustrated) and the CVV signal for the tray 2 front surface shown in FIG. 11(H) rises at the time synchronized with the first pulse count output of the CIDX signal. The duration when the CVV signal stays on the H level is determined by counting the pulses of the actual CIDX signal. While the CVV signal is on the H level, processing of C-color image formation is applied to the front surface of the paper P2 fed from the tray 2. Upon termination of the C-color image formation, the rotary speed of the C-color polygon mirror 42C is controlled. During the rotary speed control, the CIDX signal frequency fluctuates. Subsequent to rotary speed control, the CPU 55 controls the surface phase change of C-color polygon mirror 42C based on the CST-IDX signal.

The pulses of the MST-IDX signal are counted by an MST-IDX counter (not illustrated) even after the YVV signal start timing signal, MVV signal start timing signal and CVV signal start timing signal have occurred. In this example, the CVV start timing signal shown in FIG. 11(I) rises at the time synchronized with the eleventh pulse count output of the MST-IDX signal, and falls at the time synchronized with the twelfth pulse count output of the MST-IDX signal. The KVV signal for the tray 2 front surface shown in FIG. 11(J) rises at the time synchronized with the KIDX signal shown in FIG. 11(K), before the phase change of the Y-color polygon mirror 42Y starts (based on BK color). The duration when the KVV signal stays on the H level is determined by counting the pulses of the actual KIDX signal. While the KVV signal is on the H level, processing of BK-color image formation is applied to the front surface of the paper P2 fed from the tray 2. In this example, the frequency division setting value for MST-IDX signal shown in FIG. 11(M) is rewritten from the tray 2 front surface setting value to the tray 1 front surface setting value at the time 15, at time T20 after the KVV signal of the final color (BK color) of the paper P2 front surface has risen.

[Example of Controlling the Tray 1 Rear Surface]

Subsequent to termination of the Y-color image formation on the paper P2 fed from the tray 2 and phase change control of the Y-color polygon mirror 42Y, paper P1 fed from the tray 1 is reversed and is fed to the image forming device by the reverse/sheet feed control of the CPU 55 so as to be subjected to processing image formation on the rear surface. The leading edge of the paper P1 having passed through a reverse/sheet feed path is detected at the time T111 shown in FIG. 11(A), and the VTOP signal for the tray 1 rear surface rises.

After the rise of the VTOP signal, the pulses of the MST-IDX signal are counted by the MST-IDX counter (not illustrated), and the YVV signal for the tray 1 rear surface shown in FIG. 11(B) rises at the time T112 synchronized with the first pulse count output of the MST-IDX signal. Then the YVV signal start timing signal falls at the time T113 synchronized with the second pulse count output of the MST-IDX signal.

Subsequent to occurrence of the YVV start timing signal, the pulses of the YIDX signal shown in FIG. 11(D) are counted by an YIDX counter (not illustrated) and the YVV signal for the tray 1 rear surface shown in FIG. 11(C) rises at the time T114 synchronized with the first pulse count output of the YIDX signal. In this example, even after the rise of the YVV signal for tray 1 rear surface, processing of the BK-color image formation continues. Subsequent to processing of the BK-color image formation, the rotary speed control of the BK-color polygon mirror 42K is provided. The frequency of the KIDX signal fluctuates during speed and phase change control. The frequency of the KIDX signal fluctuates during speed and phase change control.

The duration when the YVV signal for the tray 1 rear surface stays on the H level is determined by counting the pulses of the actual YIDX signal. While the KVV signal is on the H level, processing of Y-color image formation is applied to the rear surface of the paper P1 fed from the tray 1. Subsequent to the termination of Y-color image formation, the rotary speed control of the Y-color polygon mirror 42Y is provided. The frequency of the YIDX signal fluctuates during speed and phase control. After rotary speed control, the CPU 55 controls the surface phase of the Y-color polygon mirror 42Y based on the MST-IDX signal.

The M, C and BK-color image formation on the rear surface of paper P1 and the M, C and BK-color image formation on the rear surface of paper P2 on the fourth page located on the reverse/conveyance path 27B inside the copying machine are carried out in the same manner as the Y, M, C and BK-color image formation on the front surface of paper P1 and Y, M, C and BK-color image formation on the front surface of paper P2, and will not be described to avoid duplication.

As described above, in the color copying machine 100 as the first embodiment of the present invention, when a color image is formed on a predetermined sheet of paper, the pseudo index forming circuit 12 creates a MST-IDX signal set to a predetermined cycle with respect to the IDX signal whose cycle fluctuates under the control of rotary speed and surface phase of the polygon mirror 42 and others, wherein this signal is a reference signal used the light beam is scanned on the photoconductor drums 1Y through 1K. Based on this arrangement, the CPU 55 controls the color image formation, from the color image formation on the front surface of paper P1 of the tray 1 to color image formation on the front surface of paper P2 of the tray 2; and from the color image formation on the rear surface of paper P1 of the tray 1 to color image formation on the rear surface of paper P2 of the tray 2, according to the MST-IDX signal created by the pseudo index forming circuit 12.

Upon completion of image formation in each color, this arrangement allows the rotary speed change and surface phase change of the polygon mirror 42Y and others to be controlled, based on the MST-IDX signal set to a predetermined cycle. This control procedure further permits control of the changes in the rotary speed and phase of the polygon mirror 42K set for a predetermined color, without having to wait for the stabilization of the rotary speed of the polygon mirror 42K set to a reference color, and without having to wait for the adjustment of timing prior to startup of image formation in all other colors.

This arrangement eliminates the adverse effect of the PLL lock wait time as in the prior art, and permits the next image formation on the next paper P2 to be started, without having to wait for termination of image formation in the final color. It also ensures color image formation without the productivity being reduced. To put it another way, the following advantages are found in the example of image formation at the time of tray switching described above: One of the advantages is that Y-color image formation on the paper P2 from the tray 2 can be started, prior to termination of the image formation on the on the paper P1 from the tray 1, and the other is that the Y-color image formation on the rear surface on the paper P1 fed from the tray 1 can be started. Thus, image formation processing speed can be increased by the amount equivalent to these advantages, over the image formation processing speed according to the prior art.

Embodiment 2

Figure 12:
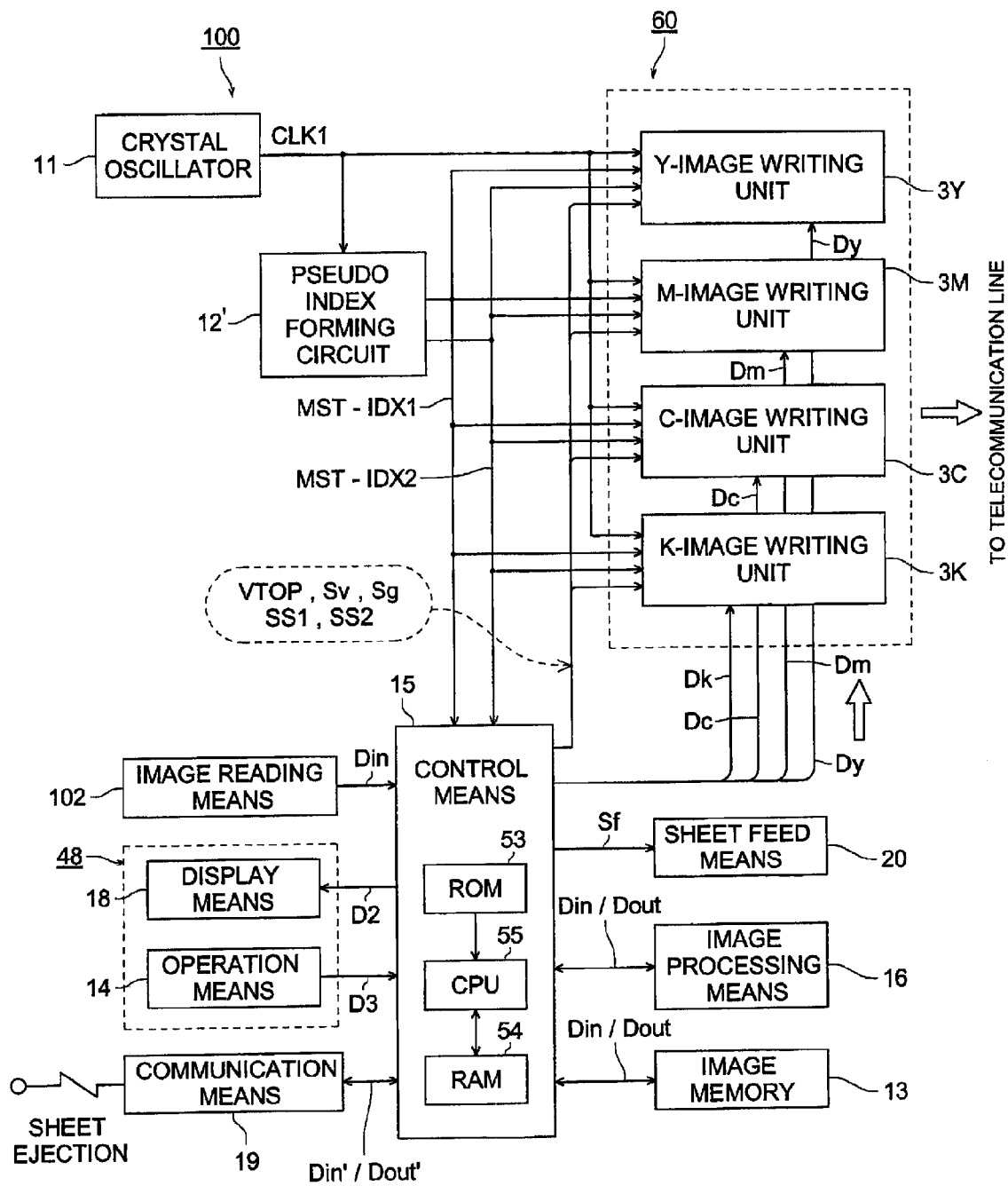
FIG. 12 is a block diagram representing an example of the configuration of the control system of the color copying machine 200 as a second embodiment.

FIG. 12 is a block diagram representing an example of the configuration of the control system of the color copying machine 200 as a second embodiment.

The color copying machine 200 in FIG. 12 controls the image formation on a predetermined side of paper P, based on two or more pseudo main scanning reference signals. The color copying machine 200 comprises a pseudo index forming circuit 12', an image memory 13, a control means 15, an image processing means 16, a communication means 19, a sheet feed means 20, an operation panel 48, an image forming means 60 and an image reading apparatus 102. They are connected to the control means 15.

The pseudo index forming circuit 12' creates the first and second pseudo index signals where a predetermined cycle can be set as desired, with respect to the index signal (a slave index, hereinafter referred to as the INX signal) whose cycle fluctuates during the control of rotary speed change and surface phase of the polygon mirror 42Y and others wherein this signal is a reference signal for color image information. In the following description, the first pseudo index signal (first master index signal) will be called the MST-IDX1 signal and the second one (second master index signal) will be called the MST-IDX2 signal.

In this example, the pseudo index forming circuit 12' creates the first MST-IDX1 signal having the first cycle and the second MST-IDX2 signal having the second cycle shorter than the first one. If an image is formed on the rear of paper using this MST-IDX2 signal, the image sizes on the front surface and rotary speed can be made to agree with each other even if the paper P has shrunken subsequent to image formation on the front surface.

The control means 15 comprises a ROM 53, a RAM 54 and a CPU 55. When the pseudo index forming circuit 12' creates the MST-IDX1 signal and MST-IDX2 signal, the CPU 55 determines the image formation start timing for image formation on the other surface of the paper P1 or one surface of paper P2, based on the MST-IDX1 signal and MST-IDX2 signal. For example, the CPU 55 raises the image formation trigger (VTOP) signal for image formation on the rear surface of the paper P1 and the image formation trigger (VTOP) signal for image formation on the front surface of the paper P2 on the next page, according to MST-IDX1 signal and MST-IDX2 signal and the detection of the leading edge of the paper P.

When forming images on both sides of a predetermined paper P, the CPU 55 selects the MST-IDX1 signal or MST-IDX2 signal alternately, and controls color image formation on a predetermined surface of paper P, based on the MST-IDX1 signal or MST-IDX2 signal and IDX signal. For example, when processing image formation by the image writing means 3Y, 3M, 3C and 3K, the CPU 55 selects the MST-IDX1 signal or MST-IDX2 signal alternately, and detects the leading edge of the paper P according to the MST-IDX1 signal or MST-IDX2 signal and IDX signal, whereby a VTOP signal (image formation trigger) is generated.

In this example, the pseudo index forming circuit 12' is connected with the crystal oscillator 11 to generate a reference clock signal (hereinafter referred to as CLK1 signal). The CLK1 signal is outputted to each of the pseudo index forming circuit 12' and the Y, M, C and K-color image writing means 3Y, 3M, 3C and 3K. The components having the same names and reference numerals as those in the first embodiment have the same functions, and will not be described to avoid duplication.

Figure 13:
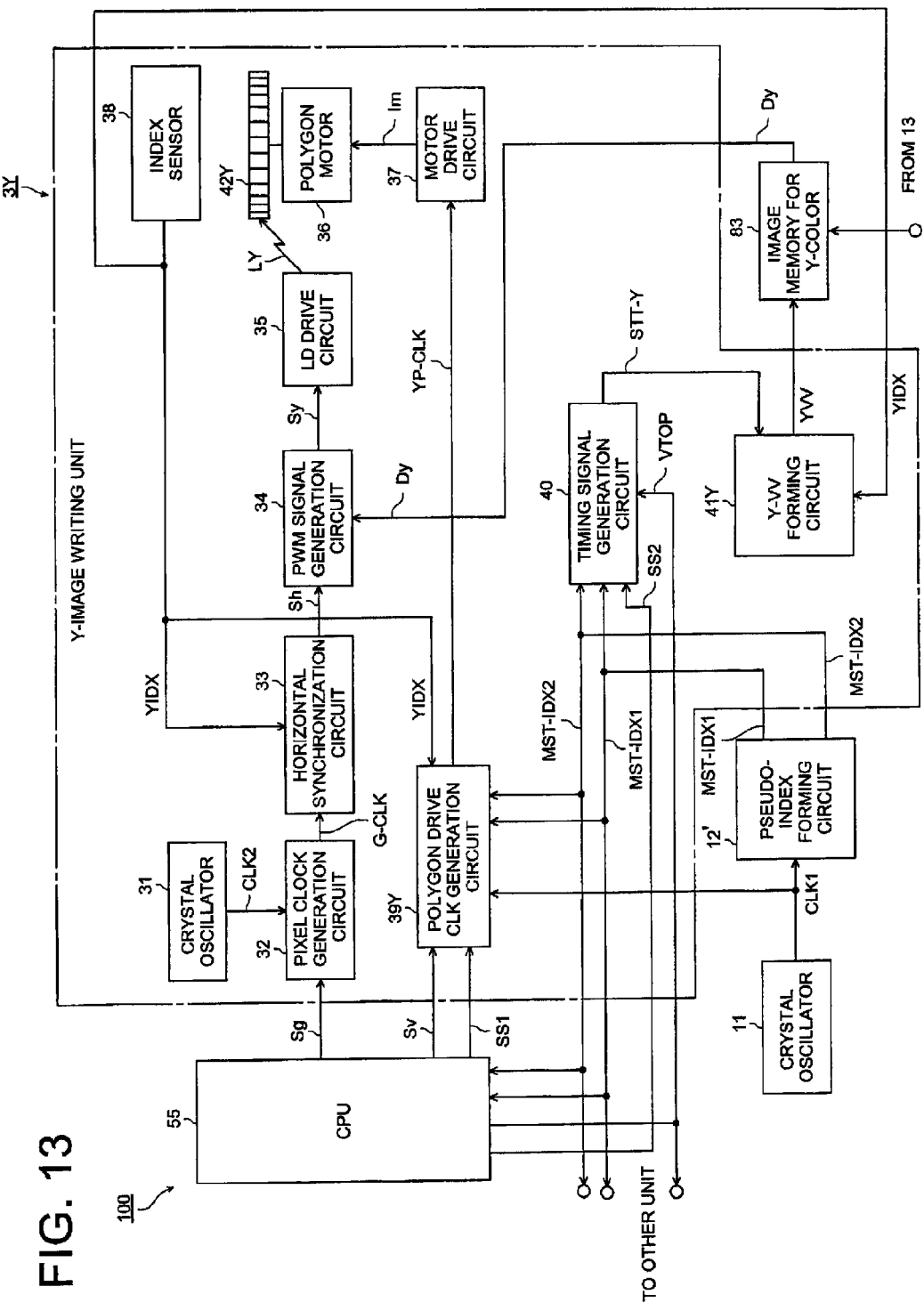
FIG. 13 is a block diagram showing the Y-color image writing unit 3Y and the peripheral circuit thereof extracted from FIG. 12.

FIG. 13 is a block diagram showing the Y-color image writing unit 3Y and the peripheral circuit thereof extracted from FIG. 12. The Y-color image writing means 3Y shown in FIG. 13 is connected to the crystal oscillator 11, pseudo index forming circuit 12' and CPU 55.

Based on the CLK1 signal for creating the Y-color polygon drive CLK generation circuit (hereinafter referred to as YP-CLK signal), the pseudo index forming circuit 12' is generates the MST-IDX1 signal and MST-IDX2 signal. The CLK1 signal is outputted from the crystal oscillator 11 to the pseudo index forming circuit 12' and polygon drive CLK generation circuit 39Y. In this example, the relationship between one cycle of the polygon drive clock signal and one cycle of each of the MST-IDX1 signal and MST-IDX2 signal is set to Tp×n=Ti×m (where n≦m). The pseudo index forming circuit 12' processes the CLK1 signal obtained from the crystal oscillator 11 in such a way as to meet the aforementioned setting condition, whereby an MST-IDX1 signal and an MST-IDX2 signal are generated.

The polygon drive CLK generation circuit 39Y processes the CLK1 signal in such a way as to meet the aforementioned setting condition, whereby a YP-CLK signal is generated. This arrangement allows generation of the MST-IDX1 signal and an MST-IDX2 signal having the cycle completely aligned to that of the actually created YIDX signal, common to the crystal oscillator 11.

Connected with the CPU 55, the pseudo index forming circuit 12' as described above outputs the selection control signal SS1 to the polygon drive CLK generation circuit 39Y, based on a sequence program. The selection control signal SS1 is set before the start of control of the surface phase of the polygon mirror 42 and others. Similarly, the CPU 55 outputs selection control signal SS2 to the Y-VV forming circuit 41Y, according to the sequence program. The selection control signal SS2 is set before the rise of the image top signal (hereinafter referred to as VTOP signal) for specifying the image formation on the rear surface. The VTOP signal is used to ensure alignment between paper P conveyance timing and image formation timing.

The aforementioned selection control signal SS1 and selection control signal SS2 indicate the first selection when they are on the low level (hereinafter referred to as L level), and denote selection of the rear surface when they are on the high level (hereinafter referred to as H level). This arrangement allows the CPU 55 to control the frequency of the YP-CLK signal supplied to the Y-color polygon motor 36 independently for each of the other M, C and BK-color image forming units 10M, 10C and 10K.

The image writing means 3Y comprises a crystal oscillator 31, image clock generation circuit 32, horizontal synchronization circuit 33, PWM signal generation circuit 34, laser (LD) drive circuit 35, polygon motor 36, motor drive circuit 37, index sensor 38, polygon drive CLK generation circuit 39Y, timing signal generation circuit 40 and Y-VV forming circuit 41Y. The components having the same names and reference numerals as those in the first embodiment have the same functions, and will not be described to avoid duplication.

The pseudo index forming circuit 12' is connected with the timing signal generation circuit 40 to determine Y-color image formation start timing. The timing signal generation circuit 40 is further connected with the CPU 55. It selects the MST-IDX1 signal outputted from the pseudo index forming circuit 12' according to the VTOP signal and selection control signal SS2 outputted from the CPU 55 in the front surface image formation mode. At the same time, it counts the pulses of the MST-IDX1 signal and determines the Y-color image formation start timing for image formation on the front surface of paper, based on the pulse count. Upon determination of the Y-color image formation start timing, the image formation start signal (hereinafter referred to as the STT signal) is outputted to the Y-VV forming circuit 41Y.

According to the STT-M signal outputted from the timing signal generation circuit 40, the Y-VV forming circuit 41Y counts the pulses of the YIDX signal and generates the Y-color sub-scanning valid area signal (hereinafter referred to as YVV signal) for the front surface or rear surface of the paper, based on the pulse count. The YVV signal is outputted to the Y-color image memory 83.

According to the VTOP signal and the selection control signal SS2 outputted from the CPU 55, the timing signal generation circuit 40 selects the MST-IDX2 signal outputted from the pseudo index forming circuit 12' immediately before start of image formation on the rear surface. At the same time, it counts the pulses of the MST-IDX2 signal and determines the Y-color image formation start timing for the rear surface of paper based on the pulse count. Upon determination of the Y-color image formation start timing, the STT signal (image formation start signal) is outputted to the Y-VV forming circuit 41Y.

The crystal oscillator 11, pseudo index forming circuit 12' and CPU 55 are connected to the polygon drive CLK generation circuit 39Y, and operate in such a way as to produce an Y-color polygon drive clock signal (YP-CLK signal) according to the YIDX signal, CLK1 signal, MST-IDX1 signal, MST-IDX2 signal, speed setting signal Sv and selection control signal SS1.

In the front/rear surface image formation mode, the speed setting signal Sv and selection control signal SS1 are outputted from the CPU 55 to the polygon drive CLK generation circuit 39Y. The YIDX signal is outputted from the index sensor 38 to the polygon drive CLK generation circuit 39Y. The CLK1 signal is outputted from the crystal oscillator 11 to the polygon drive CLK generation circuit 39Y. The MST-IDX1 signal and MST-IDX2 signal are outputted from the pseudo index forming circuit 12' to the polygon drive CLK generation circuit 39Y. The example of the internal configuration of the polygon drive CLK generation circuit 39Y will be described with reference to FIG. 14.

The image writing means 3M, 3C and 3K for other colors have the same configuration and functions, and will not be described to avoid duplication. In this example, the crystal oscillator 31, image clock generation circuit 32, horizontal synchronization circuit 33, PWM signal generation circuit 34, polygon drive CLK generation circuit 39Y, timing signal generation circuit 40 and Y-VV forming circuit 41Y were included in the image writing means 3Y in the aforementioned explanation, but the present invention is not restricted thereto. These circuit devices' can be included in the image processing means 16 or control means 15.

In this case, it is also possible to make such arrangements that the functions of the timing signal generation circuit 40 is assigned to the CPU 55. In the front surface image formation mode, the image top signal VTOP is raised based on the MST-IDX1 signal and the pulses of the MST-IDX1 signal are counted according to this VTOP signal; then the first Y-color image formation start timing for front surface is determined by this pulse count. According to the STT signal (image formation start signal) determined here, the pulses of the YIDX signal MST-IDX1 signal are counted and the Y-color YVV signal for front surface is generated based on the pulse count, under the control of the image writing means 3Y.

In the rear surface image formation mode, the CPU 55 causes the image top signal VTOP to rise according to the MST-IDX2 signal. The pulses of the MST-IDX2 signal are counted based on this VTOP signal, and the first Y-color image formation start timing for rear surface is determined by this pulse count.

The CPU 55 can control the input/output of the pseudo index forming circuit 12' and image memory 13 in such a way that the pulses of the YIDX signal for each color are counted according to the determined image formation start timing, and the Y-color YVV signal for the rear surface of paper is created according to this pulse count.

In this example, when controlling the surface phase of the polygon mirror 42 and others aside from controlling the generation of the YVV signal, after selecting one of the MST-IDX1 signal and MST-IDX2 signal for each color, the CPU 55 can control the surface phase of the polygon mirror 42 and others according to the MST-IDX1 signal or MST-IDX2 signal.

In this example, the CPU 55 controls the frequency of the YP-CLK signal for each color in the order of completing the image formation in each color on the front surface, converts the rotary speed of the polygon mirror 42Y and others into that for the rear surface and controls the phase of the MST-IDX2 signal. This control procedure allows the change in the rotary speed and surface phase of the polygon mirror 42Y and others, to be controlled, upon termination of image formation in each color based on the MST-IDX1 signal and MST-IDX2 signal set to a predetermined cycle. This arrangement allows the CPU 55 to control the change in the rotary speed and phase of the polygon mirror of the relevant color, without having to wait for the stabilization of the rotary speed of the polygon mirror 42K set to a reference color, and without having to wait for the adjustment of timing prior to startup of image formation in all other colors.

Figure 14:
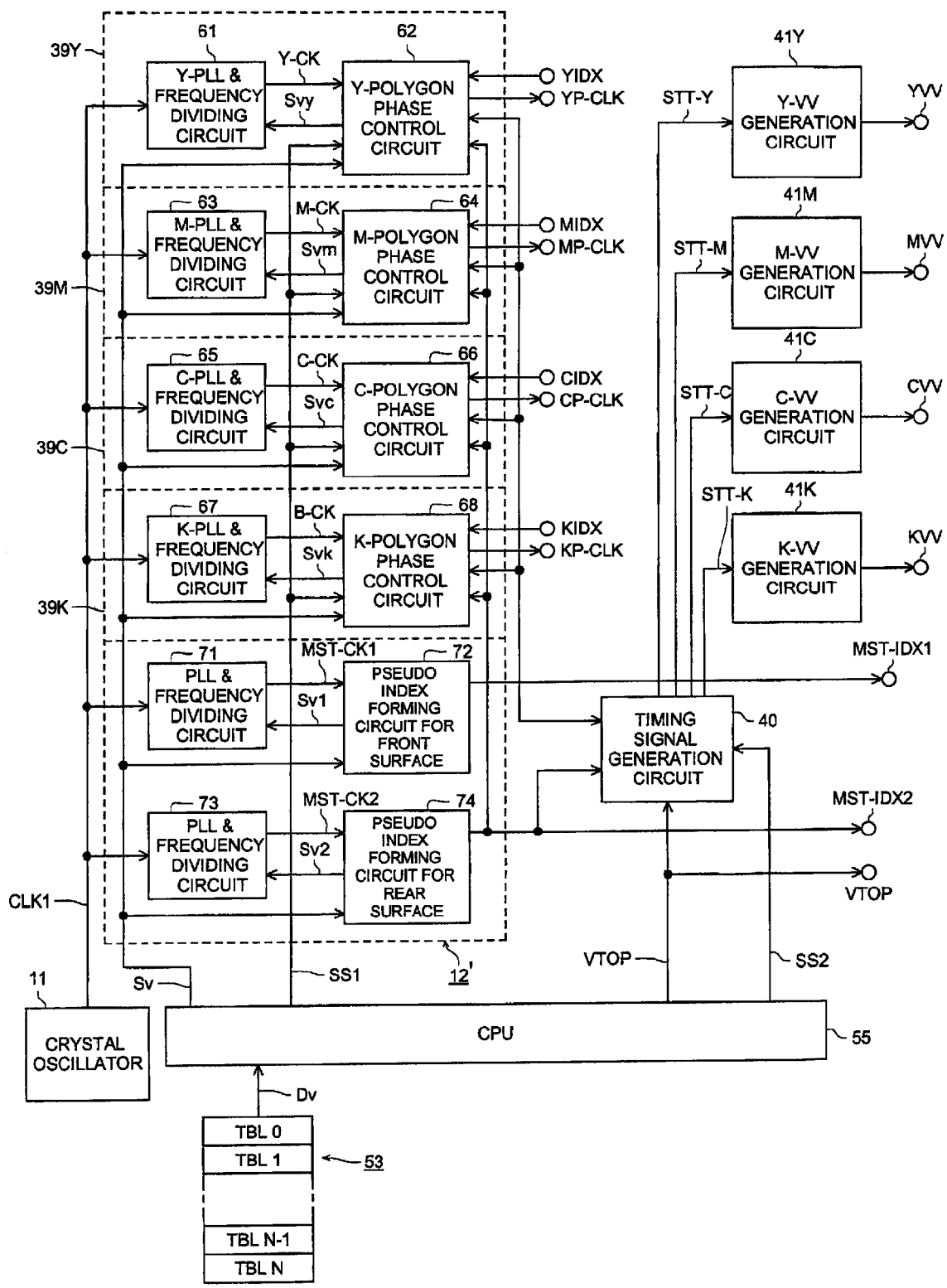
FIG. 14 is a block diagram showing an example (No. 2) of the extracted configuration of a polygon drive CLK generation circuit and the peripheral circuit thereof in the various-color image writing unit.

FIG. 14 is a block diagram showing an example of the extracted configuration of polygon drive CLK generation circuits 39Y, 39M, 39C and 39K and the peripheral circuits thereof in the various-color image writing unit.

The pseudo index forming circuit 12' and polygon drive CLK generation circuits 39Y, 39M, 39C and 39K shown in FIG. 14 are connected to the CPU 55 and crystal oscillator 11 at the same time. This CPU 55 is connected with the Y-VV forming circuits 41Y, 41M, 41C and 41K.

The pseudo index forming circuit 12' comprises a PLL & frequency dividing circuit 71, a first pseudo index forming circuit 72, a PLL & frequency dividing circuit 73 and a second pseudo index forming circuit 74.

Connected to the crystal oscillator 11, the PLL & frequency dividing circuit 71 divides the frequency of the CLK1 signal outputted from the crystal oscillator 11, based on the speed setting signal Sv1, and outputs the master dividing clock signal (hereinafter referred to as an MST-CK1 signal) to the pseudo index forming circuit 72. Connected to the PLL & frequency dividing circuit 71 and CPU 55, the pseudo index forming circuit 72 outputs the speed setting signal Sv1 for MST-CK1 signal generation, to the PLL & frequency dividing circuit 71, based on the speed setting signal Sv outputted from the CPU 55, and controls the oscillation. This oscillation control allows the pseudo index forming circuit 72 to generate the first cycle MST-IDX1 signal, based on the MST-CK1 signal.

Connected to the crystal oscillator 11, PLL & frequency dividing circuit 73 divides the frequency of the CLK1 signal outputted from the crystal oscillator 11 based on the speed setting signal Sv2, and outputs the master dividing clock signal (hereinafter referred to as an MST-CK2 signal) to the second pseudo index forming circuit 74. Connected to the PLL & frequency dividing circuit 73 and CPU 55, the second pseudo index forming circuit 74 outputs the speed setting signal Sv2 for MST-CK2 signal based on the speed setting signal Sv outputted from the CPU 55, to the PLL & frequency dividing circuit 73, thereby controlling the oscillation. The pseudo index forming circuit 74 causes the second cycle MST-IDX2 signal to be generated according to the MST-CK2 signal.

The polygon drive CLK generation circuit 39Y comprises an Y-PLL & frequency dividing circuit 61 and an Y-polygon phase control circuit 62. The Y-PLL & frequency dividing circuit 61 divides the frequency of the CLK1 signal outputted from the crystal oscillator 11, based on the speed setting signal Svy outputted from the Y-polygon phase control circuit 62, and causes the dividing clock signal (hereinafter referred to as Y-CK signal) to be outputted to the Y-polygon phase control circuit 62.

Connected to the CPU 55 and Y-PLL & frequency dividing circuit 61, the Y-polygon phase control circuit 62 outputs the speed setting signal Sv outputted from the CPU 55 and the speed setting signal Svy for Y-CK signal generation based on the selection control signal SS1, to the Y-PLL & frequency dividing circuit 61, thereby controlling the oscillation. For example, when the image formation mode shifts from the front surface image formation to the rear surface image formation, the CPU 55 refers to the speed shifting data of N frequency dividing data tables on the ROM 53 and supplies the speed setting signal Sv to the Y-polygon phase control circuit 62.

When the CPU 55 has determined that the processing of front surface image formation is finished by the image: writing means 3Y, L/L' multiplied by the polygon drive CLK frequency of the YP-CLK signal for front surface image formation is set as the polygon drive CLK frequency of the YP-CLK signal for rear surface image formation. Then the speed setting signal (frequency control signal) Sv is outputted to the polygon drive CLK generation circuit 39Y.

The Y-polygon phase control circuit 62 detects the phase difference is detected according to the rising edge of the YIDX signal detected by the index sensor 38 and the rising edge of either MST-IDX1 signal or MST-IDX2 signal selected by the selection control signal SS1, and controls the phase of the YP-CLK signal based on this phase difference.

This procedure allows the polygon drive CLK generation circuit 39Y to generate the YP-CLK signal for rear surface image formation, for example, according to the speed setting signal Sv outputted from the CPU 55. Then the YP-CLK signal with the frequency and phase adjusted is outputted to the polygon motor 36 inside the image writing means 3Y.

Similarly, the polygon drive CLK generation circuit 39M comprises an M-PPL & frequency dividing circuit 63 and M-polygon phase control circuit 64. Based on the speed setting signal Svm outputted from the Y-polygon phase control circuit 62, the M-PPL & frequency dividing circuit 63 divides the frequency of the CLK1 signal outputted from the crystal oscillator 11, and outputs the frequency dividing clock signal (hereinafter referred to as M-CK signal) to the M-polygon phase control circuit 64.

Connected to the CPU 55 and M-PPL & frequency dividing circuit 63, the M-polygon phase control circuit 64 outputs to the M-PPL & frequency dividing circuit 63 the speed setting signal Sv outputted from the CPU 55 and the speed setting signal Svm for M-CK signal generation based on the selection control signal SS1, whereby the oscillation is controlled. For example, when the image formation mode shifts from the front surface image formation to the rear surface image formation, the CPU 55 refers to the frequency dividing data table and supplies the speed setting signal Sv to the M-polygon phase control circuit 64.

The M-polygon phase control circuit 64 is connected with the M-VV forming circuit 41M. Based on the VTOP signal outputted from the CPU 55 and selection control signal SS2. In the front surface image formation mode, the MST-IDX1 signal outputted from the pseudo index forming circuit 12' is selected, and the pulses of the MST-IDX1 signal are counted based on the VTOP signal, whereby M-color front surface image formation start signal STT-M is generated.

Further, the pulses of the MIDX signal are counted based on the SST-M signal, and the M-color MVV signal for front surface image formation (M-color sub-scanning valid area signal) is generated according to this pulse count. The MVV signal is outputted to the LD drive circuit (not illustrated), motor drive circuit, M-color image memory and others by the image writing means 3M shown in FIG. 12. For example, the MVV signal is used as a readout control signal for reading the first image data Dm from the M-color image memory.

Further, immediately before termination of the image formation on the front surface of paper, the M-VV forming circuit 41M selects the MST-IDX2 signal outputted from the pseudo index forming circuit 12' based on the selection control signal SS2 outputted from the CPU 55. At the same time, it counts the pulses of the MST-IDX2 signal according to the VTOP signal to generate the M-color image formation start signal STT-M.

The pulses of the MIDX signal are counted according to the SST-M signal, and the M-color MVV signal for the rear surface of paper is generated according to this pulse count. The MVV signal is outputted to the LD drive circuit (not illustrated), motor drive circuit, M-color image memory and others by the image writing means 3M. For example, the MVV signal is used as a readout control signal for reading the second image data Dm from the M-color image memory.

The polygon drive CLK generation circuit 39C comprises a C-PLL & frequency dividing circuit 65 and polygon phase control circuit 66. According to the speed setting signal Svc outputted from the Y-polygon phase control circuit 62, the C-PLL & frequency dividing circuit 65 divides the frequency of the CLK1 signal outputted from the crystal oscillator 11 and outputs the frequency dividing clock signal (hereinafter referred to as C-CK signal) to the C-polygon phase control circuit 66.

Connected to the CPU 55 and C-PLL & frequency dividing circuit 65, the polygon phase control circuit 66 outputs to the C-PLL & frequency dividing circuit 65 the speed setting signal Sv outputted from the CPU 55 and speed setting signal Svc for C-CK signal generation based on selection control signal SS1, whereby-oscillation is controlled. For example, when the image formation mode shifts from the front surface image formation to the rear surface image formation, the CPU 55 supplies the speed setting signal Sv to the C-PLL & frequency dividing circuit 65 by referring to the frequency division data table.

The C-polygon phase control circuit 66 is connected with the C-VV forming circuit 41C. Based on the VTOP signal outputted from the CPU 55 and selection control signal SS2. In the front surface image formation mode, the MST-IDX1 signal outputted from the pseudo index forming circuit 12' is selected, and the pulses of the MST-IDX1 signal are counted based on the VTOP signal, whereby C-color front surface image formation start signal STT-C is generated.

Further, the pulses of the CIDX signal are counted based on the SST-C signal, and the C-color Cw signal for front surface image formation (C-color sub-scanning valid area signal) is generated according to this pulse count. The CVV signal is outputted to the LD drive circuit (not illustrated), motor drive circuit, C-color image memory and others by the image writing means 3C shown in FIG. 12. For example, the CVV signal is used as a readout control signal for reading the first image data Dc from the C-color image memory.

Further, immediately before termination of the image formation on the front surface of paper, the C-VV forming circuit 41C selects the MST-IDX2 signal outputted from the pseudo index forming circuit 12' based on the selection control signal SS2 outputted from the CPU 55. At the same time, it counts the pulses of the MST-IDX2 signal according to the VTOP signal to generate the C-color image formation start signal STT-C.

The pulses of the CIDX signal are counted according to the SST-C signal, and the C-color CVV signal for the rear surface of paper is generated according to this pulse count. The CVV signal is outputted to the LD drive circuit (not illustrated), motor drive circuit, C-color image memory (not illustrated) and others by the image writing means 3C. For example, the CVV signal is used as a readout control signal for reading the second image data Dc from the C-color image memory.

The polygon drive KLK generation circuit 39K comprises a K-PLL & frequency dividing circuit 67 and a K-color polygon phase control circuit 68. According to the speed setting signal Svk outputted from the K-color polygon phase control circuit 68, the K-PLL & frequency dividing circuit 67 divides the frequency of the CLK1 signal outputted from the crystal oscillator 11 and outputs the frequency dividing clock signal (hereinafter referred to as K-CK signal) to the polygon phase control circuit 68.

Connected to the CPU 55 and C-PLL & frequency dividing circuit 67, the K-color polygon phase control circuit 68 outputs to the C-PLL & frequency dividing circuit 67 the speed setting signal Sv outputted from the CPU 55 and speed setting signal Svc for K-CK signal generation based on selection control signal SS1, whereby oscillation is controlled. For example, when the image formation mode shifts from the front surface image formation to the rear surface image formation, the CPU 55 supplies the speed setting signal Sv to the K-color polygon phase control circuit 68, by referring to the frequency division data table.

The K-color polygon phase control circuit 66 is connected with the K-VV forming circuit 41K. Based on the VTOP signal outputted from the CPU 55 and selection control signal SS2. In the front surface image formation mode, the MST-IDX1 signal outputted from the pseudo index forming circuit 12' is selected, and the pulses of the MST-IDX1 signal are counted based on the VTOP signal, whereby BK-color front surface image formation start signal STT-M is generated.

Further, the pulses of the KIDX signal are counted based on the SST-K signal, and the K-color KVV signal for front surface image formation (BK-color sub-scanning valid area signal) is generated according to this pulse count. The KVV signal is outputted to the LD drive circuit (not illustrated), motor drive circuit, K-color image memory and others by the image writing means 3K shown in FIG. 12.

Further, the K-VV forming circuit 41K, immediately before termination of the image formation on the front surface of paper, selects the MST-IDX2 signal outputted from the pseudo index forming circuit 12' based on the selection control signal SS2 outputted from the CPU 55. At the same time, it counts the pulses of the MST-IDX2 signal according to the VTOP signal to generate the BK-color image formation start signal STT-K.

The pulses of the KIDX signal are counted according to the SST-K signal, and the BK-color KVV signal for the rear surface of paper is generated according to this pulse count. The KVV signal is outputted to the LD drive circuit (not illustrated), motor drive circuit, BK-color image memory (not illustrated) and others by the image writing means 3K.

Figure 15:
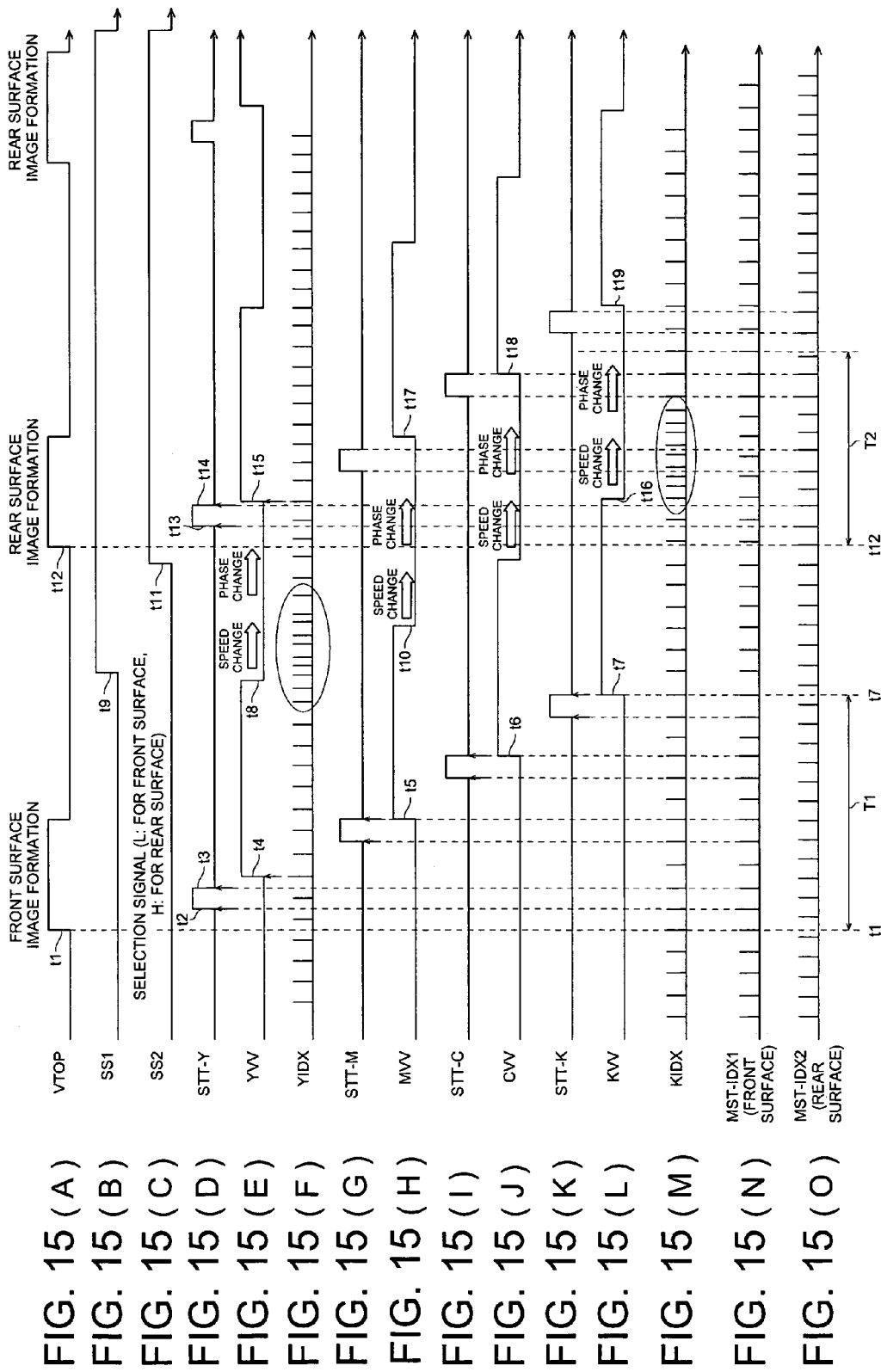
FIGS. 15(A) through (O) are time charts representing an example of switching the front/rear image formation mode in the color copying machine 200.

The following describes an example of the operation of the color copying machine 200:

FIGS. 15(A) through (O) are time charts representing an example of switching the front/rear image formation mode in the color copying machine 200.

In this embodiment, at the time of switching of the front/rear image formation mode, the image formation start timing for the rear surface of paper P is determined according to the MST-IDX1 signal and MST-IDX2 signal, independently of the control of rotary speed and surface phase of the polygon mirror 42Y of various colors and others, involving changes in cycles of the YIDX signal, MIDX signal, CIDX signal, KIDX signal (slave index signal) and others. At the same time, image formation on the next page is started during the final BK-color image formation for the front surface of paper, and the first Y-color image formation start timing for the rear surface of paper is set.

This control procedure allows the changes in rotary speed and surface phase of the polygon mirror 42Y to be controlled, upon termination of image formation in each color, based on the MST-IDX1 signal or MST-IDX2 signal set to a predetermined cycle. This arrangement allows the change in the rotary speed and phase of the polygon mirror of the relevant color to be controlled, without having to wait for the stabilization of the rotary speed of the polygon mirror 42K set to a reference color, and without having to wait for the adjustment of timing prior to startup of image formation in all other colors.

In FIG. 15(O), the T1 denotes the time period for determining the start timing for the YVV signal, MVV signal and CVV signal in the front surface image formation mode wherein the MST-IDX1 signal is used as a count source. The sub-scanning valid area (W width) of each of the YVV signal, MVV signal and CVV signal in the front surface image formation mode is determined by using the YIDX signal, MIDX signal and CIDX signal obtained from the index sensor 38.

For the reference IDX signal in the surface phase control of the polygon mirror 42Y and others, the MST-IDX1 signal or MST-IDX2 signal is utilized alternately, by way of an example.

In FIG. 15(O), the T2 denotes the time period for determining the YVV signal, MVV signal and CVV signal start timing in the rear surface image formation mode wherein the MST-IDX2 signal selected by the CPU 55 is used as a count source. The sub-scanning valid area (VV width) of each of the YVV signal, MVV signal and CVV signal in the rear surface image formation mode is determined by using the YIDX signal, MIDX signal and CIDX signal obtained from the index sensor 38. For the reference IDX signal in the surface phase control of the polygon mirror 42Y and others, the MST-IDX1 signal or MST-IDX2 signal is utilized alternately.

In this example, the color toner images formed on the intermediate transfer belt 6 are conveyed in the sub-scanning direction in the order of BK, C, M, and Y colors. Thus, the image forming units 10Y, 10M, 10C and 10K form the images in the order of Y, M, C and BK colors. The image writing means 3Y, 3M, 3C and 3K provide phase control with reference to the pseudo-MST-IDX1 signal and MST-IDX2 signal.

The Y-color STT signal (image formation start signal) enters the signals latched by the MST-IDX1 signal, into the Y-VV forming circuit 41Y of the image writing means 3Y, and count them, thereby determining the YVV signal start timing. With reference to this Y-color STT signal (image formation start signal), the YIDX signals of the image writing means 3Y are counted to generate the YVV signal. The following description refers to three modes; front surface image formation mode, front/rear surface switching mode and rear surface image formation mode.

[Front Surface Image Formation Mode]

Under these operation conditions, the VTOP signal (image top signal) rises synchronously with the MST-IDX1 signal at time t1 shown in FIG. 15(N), wherein the front surface image formation is shown in FIG. 15(A). The VTOP signal is outputted from the CPU 55 to the timing signal generation circuit 40 for each color, Y-VV forming circuit 41Y, M-W forming circuit 41M, C-VV forming circuit 41C and K-VV forming circuit 41K.

After that, in the timing signal generation circuit 40, the pulses of the MST-IDX1 signal shown in FIG. 15(N) are counted, and the Y-color STT signal (hereinafter referred to as SST-Y signal) shown in FIG. 15(d) rises at time t2. This STT-Y signal is an image formation start signal for designating the start of front surface image formation of the image forming unit 10Y for Y-color. This STT-Y signal rises at time t3. Further, in the M-VV forming circuit 41M, the pulses of the MST-IDX1 signal are counted based on the STT-Y signal, and the Y-VV forming circuit 41Y causes the YVV signal to rise at time t4.

For example, in the Y-VV forming circuit 41Y, the MST-IDX1 signal outputted from the pseudo index forming circuit 12' is selected based on the VTOP signal outputted from the CPU 55 and the selection control signal SS2 on the L level. At the same time, the pulses of YIDX signal are counted according to the VTOP signal, and the Y-color YVV signal (Y-color sub-scanning valid area signal) is generated according to this pulse count.

The YVV signal shown in FIG. 15(E) is outputted to the Y-color image memory 83 and others. The horizontal synchronization circuit 33 shown in FIG. 13 detects the horizontal synchronization signal Sh based on the YIDX signal, and outputs it to the PWM signal generation circuit 34. In addition to being outputted from the index sensor 38 to the horizontal synchronization circuit 33, the YIDX signal shown in FIG. 15(F) is outputted to the polygon drive CLK generation circuit 39Y.

The PWM signal generation circuit 34 inputs the horizontal synchronization signal Sh and image data Dy, and modulates the pulse width of the image data Dy so that the Y-color laser drive signal Sy is outputted into the LD drive circuit 35. The LD drive circuit 35 drives the laser diode based on the Y-color laser drive signal Sy, and allows Y-color laser beam LY of specified intensity to be radiated to the polygon mirror 42Y.

Further, based on the YIDX signal, CLK1 signal, MST-IDX1 signal, MST-IDX2 signal, speed setting signal Sv and selection control signal SS1 on the L level, the polygon drive CLK generation circuit 39Y generates the YP-CLK signal. For example, in the polygon drive CLK generation circuit 39Y shown in FIG. 14, the Y-polygon phase control circuit 62 inputs the speed setting signal Sv outputted from the CPU 55 and the selection control signal SS1 on the L level. Oscillation of the Y-PLL & frequency dividing circuit 61 is controlled according to the speed setting signal Sv and selection control signal SS1. The Y-PLL & frequency dividing circuit 61 divides the frequency of the CLK1 signal outputted from the crystal oscillator 11, based on the speed setting signal Svy outputted from the Y-polygon phase control circuit 62, and outputs the Y-CK signal to the Y-polygon phase control circuit 62.

Based on the leading edge of the YIDX signal detected by the index sensor 38, and the leading edge of either the MST-IDX1 signal or MST-IDX2 signal (pseudo index signal) selected by the selection control signal SS1, the Y-polygon phase control circuit 62 detects the phase difference thereof, and controls the phase of the YP-CLK signal according to this phase difference. The YP-CLK signal is a signal obtained through the control of the Y-CK signal phase.

The motor drive circuit 37 drives the polygon motor 36 according to the YP-CLK signal. The polygon motor 36 drives the polygon mirror 42Y to rotate. The laser diode connected to the motor drive circuit 37 causes the laser beam LY to be radiated, and the laser beam LY is subjected to main scanning by the rotation of the polygon mirror 42Y, with respect to the photoconductor drum 1Y rotating in the sub-scanning direction. This main scanning operation causes the electrostatic latent image to be written on the photoconductor drum 1Y. The electrostatic latent image written on the photoconductor drum 1Y is developed by the Y-color toner member. The Y-color toner image on the photoconductor drum 1Y is transferred onto the intermediate transfer belt 6 rotating in the sub-scanning direction (primary transfer).

During Y-color image formation, the pulses of the MST-IDX1 signal are further counted. After the M-color image formation start signal (STT-M signal) shown in FIG. 15(G) has risen according to the MST-IDX1 signal, the MVV signal shown in FIG. 15(H) rises at time t5. After the C-color image formation start signal (STT-C signal) has risen in FIG. 15(I) according to the MST-IDX1 signal, the CVV signal of FIG. 15(J) rises at time t6. After BK-color image formation start signal (STT-K signal) has risen in FIG. 15(K), based on the MST-IDX1 signal, the KVV signal shown in FIG. 15(L) rises at time t7. In the M, C and BK-color image writing means 3M, 3C and 3K, the above-stated processing is also applied.

[Rear Surface Image Formation Mode]

In this example, the CPU 55 outputs the selection control signal SS1 based on the sequence program. For example, the KVV signal rises at time t7, and the fall of the YVV signal is detected at time t8. The selection control signal SS1 rises to H level at time t9 shown in FIG. 15(B). The selection control signal SS1 on the H level, together with the frequency control signal Sg, is outputted from the CPU 55 to the polygon drive CLK generation circuits 39Y, 39M, 39C and 39K for various colors.

Upon completion of Y-color image formation at time t8 and rise of the YVV signal of FIG. 15(E), the image writing means 3Y controls changes in the rotary speed and phase for Y-color image formation on the rear surface of paper, based on the YIDX signal shown in FIG. 15(F). The image clock generation circuit 32 of the polygon drive CLK generation circuit 39Y, wherein the selection control signal SS1 and frequency control signal Sg are inputted, generates the G-CLK signal (Y-color pixel clock signal) based on the frequency control signal Sg, and outputs it to the horizontal synchronization circuit 33. For example, the frequency f0 of the G-CLK signal in the front surface image formation mode multiplied by (L'/L)·(W/W') is set as an Y-color pixel clock frequency f in the rear surface image formation mode.

Further, the CPU 55 refers to the speed change data of the N frequency dividing data table on the ROM 53 and supplies the speed setting signal Sv to the Y-PLL & frequency dividing circuit 61. For example, when the CPU 55 has determined that the processing of front surface image formation is finished by the image writing means 3Y, L/L' multiplied by the polygon drive CLK frequency of the YP-CLK signal for front surface image formation is set as the polygon drive CLK frequency of the YP-CLK signal for rear surface image formation. Then the speed setting signal (frequency control signal) Sv is outputted to the polygon drive CLK generation circuit 39Y.

The polygon drive CLK generation circuit 39Y generates the YP-CLK signal for rear surface image formation, for example, according to the speed setting signal Sv outputted from the CPU 55. Then the YP-CLK signal with the frequency and phase adjusted is outputted to the polygon motor 36 inside the image writing means 3Y.

Upon completion of M-color image formation at time t10 and fall of the MVV signal, the image writing means 3M controls the changes in rotary speed and phase. Based on the sequence program, the CPU 55 raises the L-level selection control signal SS2 shown in FIG. 15(C) to the H level. This H-level selection control signal SS2 is outputted from the CPU 55 to the timing signal generation circuit 40 for each color, Y-VV forming circuit 41Y, M-VV forming circuit 41M, C-VV forming circuit 41C and K-VV forming circuit 41K.

[Rear Surface Image Formation Mode]

In this example, in the paper rear surface image formation mode, the CPU 55 raises the rear surface image formation signal (VTOP signal) based on the MST-IDX2 signal, and counts the pulses of the MST-IDX2 signal based on this VTOP signal. The CPU 55 then determines the rear surface image formation start timing according to the pulse count.

For example, the CPU 55 raises the VTOP signal at t12 shown in FIG. 15(O) synchronously with the MST-IDX2 signal, wherein rear surface image formation is shown in FIG. 15(A). Then the VTOP signal is outputted from the CPU 55 to the timing signal generation circuit 40 for each color, Y-VV forming circuit 41Y, M-VV forming circuit 41M, C-VV forming circuit 41C and K-VV forming circuit 41K.

In the image writing means 3Y, immediately before image formation on the rear surface, the timing signal generation circuit 40 selects the MST-IDX2 signal outputted from the pseudo index forming circuit 12' according to the VTOP signal outputted from the CPU 55 and the H-level selection control signal SS2. At the same time, the pulses of the MST-IDX2 signal are counted by the CPU 55, and image formation start timing for the rear surface of paper is determined based on the pulse count. Upon determination of the image formation start timing, the Y-color STT-Y signal shown in FIG. 15(D) rises at time t13. This STT-Y signal is an image formation start signal showing the image formation start timing for the rear surface in the Y-color image forming unit 10Y. The STT-Y signal is outputted to the Y-VV forming circuit 41Y by the image writing means 3Y.

The STT-Y signal falls at time t14 and the pulses of the MST-IDX2 signal are counted. Then the YVV signal shown in FIG. 15(E) rises at time t15 synchronized with MST-IDX2 signal. After that, the pulses of the MST-IDX2 signal are counted, and the M-color STT-M signal shown in FIG. 15(G) rises synchronously with the MST-IDX2 signal, and then the MVV signal rises at time t17. Further, the pulses of the MST-IDX2 signal are counted and the STT-C signal shown in FIG. 15(I) rises synchronously with the MST-IDX2 signal. Then the CVV signal shown in FIG. 15(J) rises at time t18. The pulses of the MST-IDX2 signal are counted and the STT-BK signal shown in FIG. 15(K) rises synchronously with the MST-IDX2 signal. Then the KVV signal shown in FIG. 15(L) rises at t19. When the KVV signal shown in FIG. 15(L) has fallen at time 16, the BK-color image writing means 3K controls the rotary speed according to the KIDX signal shown in FIG. 15(M).

As described above, in the color copying machine 200 as the second embodiment, when a color image is formed on a predetermined sheet of paper, the pseudo index forming circuit 12' creates the MST-IDX1 signal and MST-IDX2 signal set to a predetermined cycle, with respect to the IDX signal whose cycle fluctuates under the control of the rotary speed and surface phase of the polygon mirror 42Y, wherein this signal is a reference signal used for the light beam scanning on the photoconductor drums 1Y through 1K. Based on this arrangement, the CPU 55 controls the color image formation, from the color image formation on the front surface of paper P1 to color image formation on the rear surface, and from the color image formation on the rear surface of paper P1 to color image formation on a predetermined surface of paper P2, according to the IDX signal, and the MST-IDX1 signal and MST-IDX2 signal created by the pseudo index forming circuit 12.

This example shows the case where the pseudo index forming circuit 12' creates the MST-IDX1 signal and MST-IDX2 signal. The CPU 55 selects the MST-IDX1 signal and MST-IDX2 signal alternately. Based on the Y-color IDX signal or BK-color KIDX signal as a reference signal and the selected MST-IDX1 signal and MST-IDX2 signal, the CPU 55 controls color image formation on a predetermined surface of the P1 and P2.

Thus, upon completion of image formation in each color, this arrangement allows the changes in the rotary speed or surface phase of the polygon mirror 42Y and others to be controlled, based on the MST-IDX1 signal and MST-IDX2 signal set to a predetermined cycle. This control procedure further permits control of the change in the rotary speed and phase of the polygon mirror 42K set for a predetermined color, without having to wait for the stabilization of the rotary speed of the polygon mirror 42K set to a reference color, and without having to wait for the adjustment of timing prior to startup of image formation in all other colors.

This arrangement eliminates the adverse effect of the PLL lock wait time as in the prior art, and permits the next image formation on the next paper P2 to be started, without having to wait for termination of image formation in the final color. It also ensures color image formation without the productivity being reduced.

At the time of switching of the front/rear image formation mode, the image formation start timing for the rear surface of paper P can be determined, independently of the control of rotary speed and surface phase of the polygon mirror 42Y of various colors and others, involving changes in cycles of the YIDX signal, MIDX signal, CIDX signal, KIDX signal (slave index signal) and others. Moreover, the first Y-color image formation start timing for the rear surface of paper can be set in an improved manner during the final BK-color image formation for the front surface of paper.

This controls procedure of the rotary speed and surface phase of the polygon mirror 42Y to be changed, upon termination of image formation in each color. This arrangement eliminates the PLL lock wait time of the polygon motor required in the prior art, and ensures high speed image processing of a color copying machine. It also provides the high-precision front/rear surface image registration function for ensuring the image sizes to be aligned on the front and rear surfaces of the paper P, without reducing the productivity.

Embodiment 3

FIGS. 16(A) through (K) are time charts representing an example of operations (pseudo index reference) in the color copying machine 200 as a third embodiment.

In this embodiment, at the time of controlling the sheet switching and sheet feed, the image formation start timing from the color image formation on the front surface of paper P1 of the tray 1 to color image formation on the front surface of paper P2 of the tray 2 can be determined, based on the MST-IDX1 signal and MST-IDX2 signal, independently of the control of rotary speed and surface phase of the polygon mirror 42Y of various colors and others, involving changes in cycles of the YIDX signal, MIDX signal, CIDX signal, KIDX signal (slave index signal) and others. Moreover, image formation on the next page is started during the final BK-color image formation for the front surface of paper P1, and the first Y-color image formation start timing for the front surface of paper P2 is set. Further, the image formation start timing from the image formation on the front surface image formation of paper P1 of the tray 2 to the image formation on the rear surface of the paper P1 of the tray 1 is determined. At the same time, image formation on the next page is started during the final BK-color image formation for the front surface of paper 2, and the first Y-color image formation start timing for the rear surface of paper P1 is set.

Upon completion of image formation in each color, this arrangement allows the rotary speed change and surface phase change of the polygon mirror 42Y and others to be controlled, based on the MST-IDX1 signal or MST-IDX2 signal set to a predetermined cycle. This control procedure further permits control of the changes in the rotary speed and phase of the polygon mirror 42K set for a predetermined color, without having to wait for the stabilization of the rotary speed of the polygon mirror 42K set to a reference color, and without having to wait for the adjustment of timing prior to startup of image formation in all other colors.

[First Page from Tray 1 (Front)]

Figure 16:
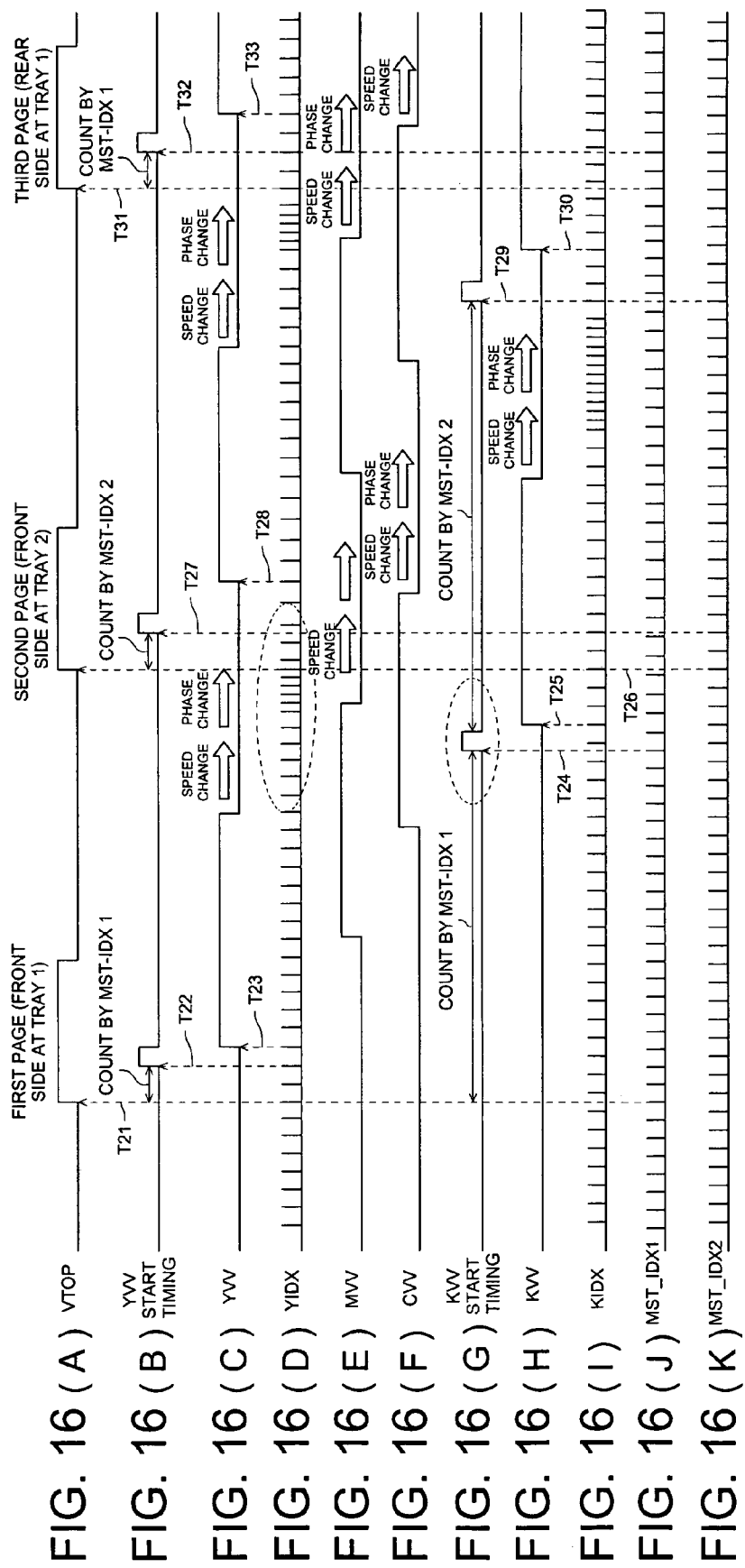
FIGS. 16(A) through (K) are time charts representing an example of operations (pseudo index reference) in the color copying machine 200 as a third embodiment.

The leading edge of the front surface of paper P1 as the first page fed from the tray 1 is detected, and the first VTOP signal shown in FIG. 16(A) rises at time T21 synchronized with the MST-IDX1 signal shown in FIG. 16(J). The MST-IDX1 signal counter (not illustrated) is activated and the pulses of the MST-IDX1 signal are counted. Then the YVV signal start timing shown in FIG. 16(B) rises at time T22 synchronized with the MST-IDX1 signal. The YVV signal shown in FIG. 16(C) rises at time T23 synchronized with the YIDX signal shown in FIG. 16(D). While the YVV signal is on the H level, Y-color image formation is applied to the paper P1 from the tray 1.

The rotary speed of the Y-color polygon mirror is controlled after completion of Y-color image formation. This is because image formation at the time of tray switching is based on the MST-IDX1 signal or MST-IDX2 signal. The YIDX signal frequency fluctuates during speed change control. The Y-color polygon mirror surface phase control starts after completion of rotary speed control.

M-color image formation on the front surface of the paper P1 from the tray 1 is carried out while the MVV signal shown in FIG. 16(E) is on the H level. Upon completion of image formation, the rotary speed and surface phase of the M-color polygon mirror are controlled. C-color image formation on the front surface of the paper P1 from the tray 1 is carried out while the CVV signal shown in FIG. 16(F) is on the H level. After completion thereof, the rotary speed or surface phase of the C-color polygon mirror are controlled.

The KIDX counter (not illustrated) is activated at the aforementioned time T21, and the pulses of the MST-IDX1 signal are counted. Then the KVV signal start timing shown in FIG. 16(G) rises at time T24 synchronized with the MST-IDX1 signal. The KVV signal shown in FIG. 16(H) rises at time T25 synchronized with the KIDX signal shown in FIG. 16(I). While the KVV signal is on the H level, BK-color image is formed on the paper P1 from the tray 1. Upon completion of this image formation, the rotary speed or surface phase of the polygon mirror is controlled. The KIDX signal fluctuates under the control of the rotary speed and surface phase.

The example of image formation at the time of tray switching has such an advantage that Y-color image formation on the paper P2 fed from the tray 2 can be started before completion of image formation on the paper P1 from the tray 1. In the present embodiment, the MST-IDX1 signal and MST-IDX2 signal are used as references, and rotary speed control of the Y-color polygon mirror can be started before the BK-color KVV signal start timing is established and before the KVV signal rises. After that, surface phase can be controlled based on the MST-IDX1 signal, and the VTOP signal of the next page can be determined based on the MST-IDX2 signal. As a result, the time lag TL shown in FIG. 26(C) does not occur, and hence productivity of the color copying machine 200 is not reduced.

[Second Page from Tray 2 (Front)]

The leading edge of the front surface of paper P2 as the second page fed from the tray 2 is detected, and the second VTOP signal shown in FIG. 16(A) rises at time T26 synchronized with the MST-IDX2 signal shown in FIG. 16(K). The MST-IDX2 signal counter (not illustrated) is activated and the pulses of the MST-IDX2 signal are counted. Then the YVV signal start timing shown in FIG. 16(B) rises at time T27 synchronized with the MST-IDX2 signal. The YVV signal shown in FIG. 16(C) rises at time T28 synchronized with the YIDX signal shown in FIG. 16(D). While the YVV signal is on the H level, Y-color image formation is applied to front surface of the paper P2 from the tray 2.

The rotary speed control of the Y-color polygon mirror is provided after completion of Y-color image formation. The YIDX signal frequency fluctuates under the speed change control. The surface phase control of the Y-color polygon mirror is provided after completion of rotary speed control. The M-color image formation on the front surface of the paper P2 from the tray 2 is performed while the MVV signal shown in FIG. 16(E) is on the H level. After completion of this image formation, changes in the rotary speed or surface phase of the M-color polygon mirror are controlled. C-color image formation on the front surface of the paper P2 from the tray 2 is performed while the CVV signal shown in FIG. 16(F) is on the H level. After completion of this image formation, changes in the rotary speed or surface phase of the C-color polygon mirror are controlled.

The BK-color MST-IDX2 signal counter (not illustrated) is activated at the aforementioned time T26, and the pulses of the MST-IDX2 signal are counted. Then the KVV signal start timing shown in FIG. 16(G) rises at time T29 synchronized with the MST-IDX2 signal. The KVV signal shown in FIG. 16(H) rises at time T30 synchronized with the KIDX signal shown in FIG. 16(I). While the KVV signal is on the H level, BK-color image is formed on the front surface of the paper P2 from the tray 2. Upon completion of this image formation, the rotary speed or surface phase of the BK-color polygon mirror are controlled. The KIDX signal fluctuates under the control of the rotary speed and surface phase.

[Third Page from Tray 1 (Rear)]

The leading edge of the rear surface of paper P1 as the first page located in the reverse/conveyance path 27B in this copying machine is detected, and then the third VTOP signal shown in FIG. 16(A) rises at time T31 synchronized with the MST-IDX1 signal shown in FIG. 16(J). The MST-IDX1 counter (not illustrated) is activated and the pulses of the MST-IDX1 signal are counted. Then the YVV start timing signal shown in FIG. 16(B) rises at time T32 synchronized with the MST-IDX1 signal. The YVV signal shown in FIG. 16(C) rises at time T33 synchronized with the YIDX signal shown in FIG. 16(D). While the YVV signal is on the H level, Y-color image formation is applied to the rear surface of the paper P1 from the reverse/conveyance path 27B.

The subsequent processing of M, C and BK-color image formation on the rear surface of paper P1 and Y, M, C and BK-color image formation on the rear surface of paper P2 as the fourth page located in the reverse/conveyance path 27B in this copying machine is the same as the processing of Y, M, C and BK-color image formation on the front surface of paper P1 and Y, M, C and BK-color image formation on the front surface of paper P2, and will not be described to avoid duplication.

As described above, in the color copying machine 200 as the third embodiment, at the time of switching of the front/rear image formation mode, the image formation start timing from the front surface of the paper P1 of the tray 1 to the front surface of the paper 2 of the tray 2 is determined, independently of the control of rotary speed and surface phase of the polygon mirror 42Y of various colors and others, based on the MST-IDX1 signal and MST-IDX2 signal. At the same time, image formation on the next page is started during the final BK-color image formation of the front surface of paper P1, and the first Y-color image formation start timing for the front surface of paper P2 is set. Further, the image formation start timing from the front surface of the paper P1 of the tray 2 to the rear surface of the paper 1 of the tray 1 is determined. At the same time, image formation on the next page is started during the final BK-color image formation of the front surface of paper P2, and the first Y-color image formation start timing for the rear surface of paper P1 is set.

This control procedure allows the change in the rotary speed and surface phase of the polygon mirror 42Y and others, to be controlled, upon termination of image formation in each color based on the MST-IDX1 signal and MST-IDX2 signal set to a predetermined cycle. This arrangement allows the change in the rotary speed and phase of the polygon mirror of the relevant color to be controlled, without having to wait for the stabilization of the rotary speed of the polygon mirror 42K set to a reference color, and without having to wait for the adjustment of timing prior to startup of image formation in all other colors.

Embodiment 4

FIGS. 17 through 21 are flowcharts representing the examples (Nos. 1 through 5) of forming an image in the color copying machine 200.

In this embodiment, a sheet feed tray switching request signal is monitored by the CPU 55. Upon detection of the sheet feed tray switching request signal, the CPU 55 changes the magnification by referring to a paper kind-based control table shown in FIG. 9. The magnification is changed by the control of the rotary speed or surface phase of the polygon motor. In this example, the print reservation job will be described with reference to the case where paper P1 (plain paper A) and paper P2 (recycled paper A) of different kinds are fed alternately from the trays 1 and 2, and an image formation mode is selected in advance for forming and outputting an image on both surfaces of paper P1 and paper P2, so that processing of image formation is carried out based on this image formation mode.

Figure 17:
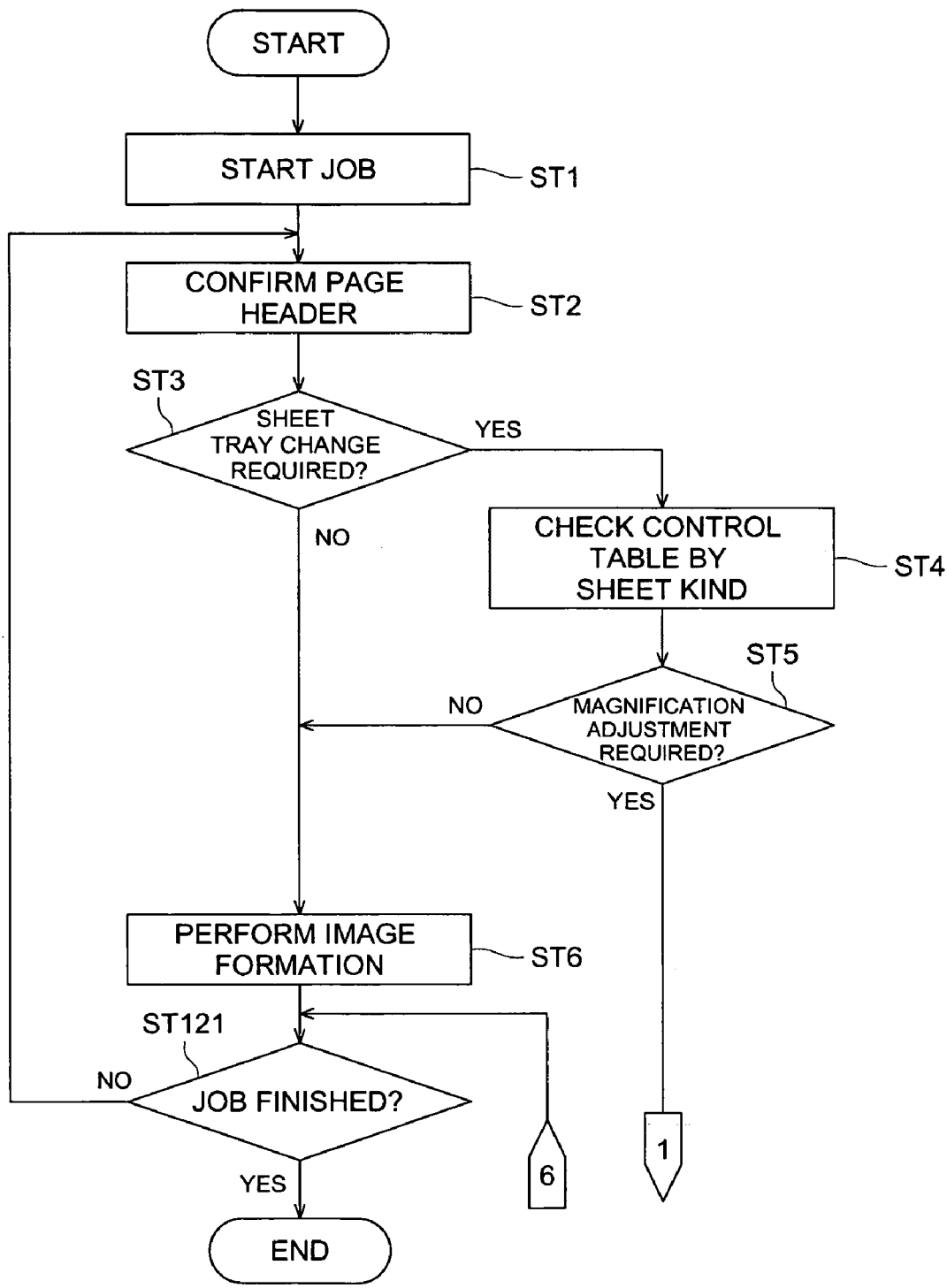
FIG. 17 is a flowchart representing the example (No. 1) of forming an image in the color copying machine 200 as a fourth embodiment.

Under the aforementioned image formation conditions, the CPU 55 starts print reservation job in Step ST1 of the flowchart shown in FIG. 17. The CPU 55 reads out the print jobs of a specified order from the image memory 13. The print job information comprises the page header and image data Din. The page header contains previously reserved tray switching information or the like.

Then the CPU 55 separates the page header from the print job information in Step ST2 and makes sure of the tray switching information from the page header. The CPU 55 decodes the page header and acquires the tray switching information or the like. In this example, paper P1 (plain paper A) is fed from the tray 1 and then paper P2 (recycled paper B) is fed from the tray 2. This paper feed operation is performed alternately, so that images are formed on a plurality of sheets. Accordingly, this image formation mode includes the operation of switching between the trays 1 and 2.

Going to the Step ST3, the CPU 55 checks if the sheet feed tray should be changed or not. The criterion for this check is the presence or absence of tray switching information having been detected. If the tray switching information has been detected and a decision has been made that the sheet feed tray should be changed, then the CPU 55 proceeds to the Step ST4. In Step ST4, the CPU 55 checks whether or not an image formation condition setting item is contained in the paper kind-based control table. In this example, the paper kind-based control table contains the fixing temperature, transfer current and magnification as setting items in conformity to the kind of paper. Accordingly, the CPU 55 proceeds to Step ST5.

In Step ST5, the CPU 55 checks if magnification should be adjusted or not. The criterion for this check is the presence or absence of magnification setting item having been detected. If the magnification setting item has been detected and a decision has been made that magnification adjustment should not be required, then the CPU 55 proceeds to the Step ST6. The CPU 55 applies the normal processing of image formation without involving magnification adjustment.

Figure 18:
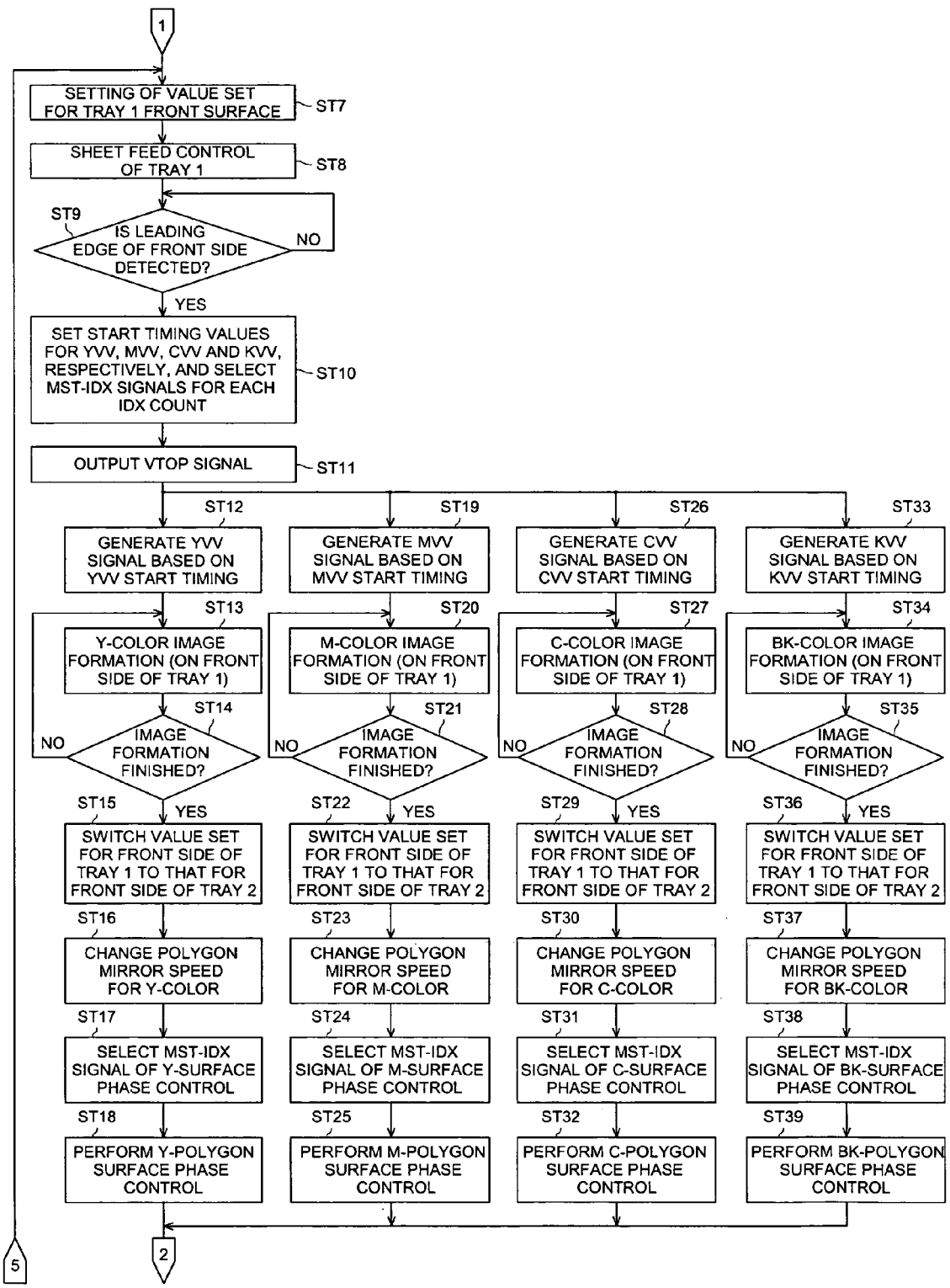
FIG. 18 is a flowchart representing the example (No. 2) of forming an image in the color copying machine 200 as a fourth embodiment.

If a decision has been made in Step ST5 that the magnification adjustment should be required, the system goes to the Step ST7 shown in FIG. 18, and the CPU 55 scans a tray-1 front surface setting value from the RAM 54 and others, and sets it on the image writing system and others. In this example, paper P1 is plain paper A, and magnification=+0.3% is set in the front surface image formation mode. In this case, when the rotary speed of the polygon mirror 42Y is assumed as V1 in the image formation on the front surface of paper P1, correction is made in such a way that the rotary speed of the polygon mirror at the time of tray-1 selection will be lower than the rotary speed VR at the reference time (V1<VR), based on magnification=+0.3%.

In the Step ST8, the tray sheet feed system (not illustrated) controls sheet feed from the tray 1. This sheet feed control allows paper P1 to be fed out of the tray 1 and the paper P1 is conveyed to the resist roller 28. After that, proceeding to Step ST9, the CPU 55 checks if the leading edge of the front surface of paper P1 has been detected or not. In this case, the leading edge of the front surface of the paper P1 as the first page is detected by a leading edge sensor (not illustrated). The sensor output is maintained for a register the like. Paper P1 waits on the resist roller 28.

In the Step ST10, the timing signal generation circuit 40 sets the YVV start timing value in the Y-VV forming circuit 41Y, the MVV start timing value in the M-VV forming circuit 41M, the CVV start timing value in the C-VV forming circuit 41C, and the KVV start timing value in the K-VV forming circuit 41K. At the same time, the timing signal generation circuit 40 selects the IDX count MST-IDX1 signal or MST-IDX2 signal for Y, M, C and BK colors.

After that, in the Step ST11, the CPU 55 outputs the VTOP signal to the timing signal generation circuit 40. In this case, the first VTOP signal shown in FIG. 16(A) rises at time T21 synchronized with the MST-IDX1 signal shown in FIG. 16(J). This VTOP signal is obtained by ANDing the following two signals a leading edge detection signal for the paper P1 stored in advance in the register of the CPU 55 and the image leading edge signal of an image system (software), for example. At time T21, the MST-IDX1 counter (not illustrated) is activated to start counting of the pulses of the MST-IDX1 signal.

[Y-color Image Formation on Front Surface from Tray 1]

The Y-VV forming circuit 41Y allows the YVV start timing signal to rise at time T22 synchronized with the MST-IDX1 signal shown in FIG. 16(B). The Y-VV forming circuit 41Y allows the YVV signal to be generated based on this YVV start timing (STT-Y). In this example, the YVV signal shown in FIG. 16(C) rises at time T23 synchronized with the YIDX signal shown in FIG. 16(D). This YVV signal is outputted to the Y-color image memory 83.

After that, in Step ST13, processing of Y-color image formation is applied to the front surface of the paper P1 from the tray 1. In this case, while the YVV signal shown in FIG. 16(C) is on the H level, a Y-color image is formed on the paper P1 from the tray 1. After that, the YVV signal changes from the H level to L level in Step ST14, whereby completion of the Y-color image formation is detected.

Upon completion of Y-color image formation, the CPU 55 proceeds to the Step ST15 and switches the tray-1 front surface setting value over to the tray-2 front surface setting value. In this example, paper P2 is recycled paper A, and magnification=+0.4% is set in the rear surface image formation mode. In this case, when the rotary speed of the polygon mirror 42Y is assumed as V1 in the image formation on the front surface of paper P1, correction is made in such a way that the rotary speed of the polygon mirror at the time of tray-2 selection will be lower than the rotary speed VR at the reference time (V1<VR), based on magnification=+0.4%.

After that, the CPU 55 proceeds to the Step ST16 and controls the rotary speed of the Y-color polygon mirror 42Y based on the tray-2 front surface setting value. Under this rotary speed control, the YIDX signal frequency fluctuates. Subsequent to the aforementioned rotary speed control, the CPU 55 goes to Step ST17 and selects the MST-IDX2 signal for Y-color surface phase control. After that, the CPU 55 goes to Step ST18 and controls the surface phase of the Y-color polygon mirror 42Y based on the MST-IDX2 signal.

[M-color Image Formation on Front Surface from Tray 1]

Parallel to the Y-color image formation from the aforementioned Step ST13 through Step ST18 so as to follow processing in each step, the M-VV forming circuit 41M allows the MST-IDX1 counter (not illustrated) to be activated in Step ST19, and the pulses of the MST-IDX1 signal are counted. The MVV start timing signal rises synchronously with the MST-IDX1 signal. The M-VV forming circuit 41M causes the MVV signal to be generated based on this MVV start timing (STT-M). In this example, the MVV signal rises synchronously with the MIDX signal. The MVV signal is outputted to the M-color image memory.

After that, in Step ST20, processing of M-color image formation is applied to the front surface of the paper from the tray 1. In this case, while the MVV signal shown in FIG. 16(E) is on the H level, an M-color image is formed on the paper P1. After that, the MVV signal changes from the H level to L level in Step ST21, whereby completion of the M-color image formation is detected.

Upon completion of M-color image formation, the CPU 55 proceeds to the Step ST22 and switches the tray-1 front surface setting value over to the tray-2 front surface setting value. In this example, paper P2 is recycled paper A, and magnification=+0.4% is set in the front surface image formation mode. In this case, correction is made in such a way that the rotary speed in the front surface image formation mode will be lower than the rotary speed VR at the reference time (V2<VR), based on magnification=+0.4%.

After that, the CPU 55 proceeds to the Step ST23 and controls the rotary speed of the M-color polygon mirror 42M based on the tray-2 front surface setting value. Under this rotary speed control, the MIDX signal frequency fluctuates. Subsequent to the aforementioned rotary speed control, the CPU 55 goes to Step ST25 and selects the MST-IDX2 signal for M-color surface phase control. After that, the CPU 55 goes to Step ST26 and controls the surface phase of the M-color polygon mirror 42M based on the MST-IDX2 signal.

[C-color Image Formation on Front Surface from Tray 1]

Parallel to the M-color image formation from the aforementioned Step ST19 through Step ST25 so as to follow processing in each step, the C-VV forming circuit 41C allows the MST-IDX1 counter (not illustrated) to be activated in Step ST26, and the pulses of the MST-IDX1 signal are counted. The CVV start timing signal rises synchronously with the MST-IDX1 signal. The C-VV forming circuit 41C causes the CVV signal to be generated based on this CVV start timing (STT-C). In this example, the CVV signal rises synchronously with the CIDX signal. The CVV signal is outputted to the C-color image memory.

After that, in Step ST27, processing of C-color image formation is applied to the front surface of the paper P1 from the tray 1. In this case, while the CVV signal shown in FIG. 16(F) is on the H level, a C-color image is formed on the paper P1. After that, the CVV signal changes from the H level to L level in Step ST28, whereby completion of the C-color image formation is detected.

Upon completion of C-color image formation, the CPU 55 proceeds to the Step ST29 and switches the tray-1 front surface setting value over to the tray-2 front surface setting value. In this example, paper P2 is recycled paper A, and magnification=+0.4% is set in the front surface image formation mode. In this case, correction is made in such a way that the rotary speed in the front surface image formation mode will be lower than the rotary speed VR at the reference time (V2<VR), based on magnification=+0.4%.

After that, the CPU 55 proceeds to the Step ST30 and controls the rotary speed of the C-color polygon mirror 42C based on the tray-2 front surface setting value. Under this rotary speed control, the CIDX signal frequency fluctuates. Subsequent to the aforementioned rotary speed control, the CPU 55 goes to Step ST31 and selects the MST-IDX2 signal for C-color surface phase control. After that, the CPU 55 goes to Step ST32 and controls the surface phase of the C-color polygon mirror 42C based on the MST-IDX2 signal.

[BK-color Image Formation on Front Surface from Tray 1]

Parallel to the C-color image formation from the aforementioned Step ST26 through Step ST32 so as to follow processing in each step, the K-VV forming circuit 41K allows the MST-IDX1 counter (not illustrated) to be activated at the aforementioned time T21 in Step ST33, and the pulses of the MST-IDX1 signal are counted. The KVV start timing signal shown in FIG. 16(G) rises at time T24 synchronized with the MST-IDX1 signal. The K-VV forming circuit 41K causes the KVV signal to be generated based on this KVV start timing (STT-K). In this example, the KVV signal shown in FIG. 16(H) rises at time T25 synchronized with the KIDX signal shown in FIG. 16(K). The KVV signal is outputted to the BK-color image memory.

After that, in Step ST34, processing of BK-color image formation is applied to the front surface of the paper P1 from the tray 1. In this case, while the KVV signal shown in FIG. 16(H) is on the H level, a BK-color image is formed on the paper P1 from the tray 1. After that, the KVV signal changes from the H level to L level in Step ST35, whereby completion of the BK-color image formation is detected.

Upon completion of BK-color image formation, the CPU 55 proceeds to the Step ST36 and switches the tray-1 front surface setting value over to the tray-2 front surface setting value. In this example, paper P2 is recycled paper A, and magnification=+0.4% is set in the front surface image formation mode. In this case, correction is made in such a way that the rotary speed in the front surface image formation mode will be lower than the rotary speed VR at the reference time (V2<VR), based on magnification=+0.4%.

After that, the CPU 55 proceeds to the Step ST37 and controls the rotary speed of the K-color polygon mirror 42K based on the tray-2 front surface setting value. Under this rotary speed control, the KIDX signal frequency fluctuates. Subsequent to the aforementioned rotary speed control, the CPU 55 goes to Step ST38 and selects the MST-IDX2 signal for BK-color surface phase control. After that, the CPU 55 goes to Step ST39 and controls the surface phase of the BK-color polygon mirror 42K based on the MST-IDX2 signal. After that, the CPU 55 goes to the Step ST40 of the flowchart shown in FIG. 19.

[Y-color Image Formation on Front Surface from Tray 2]

Figure 19:
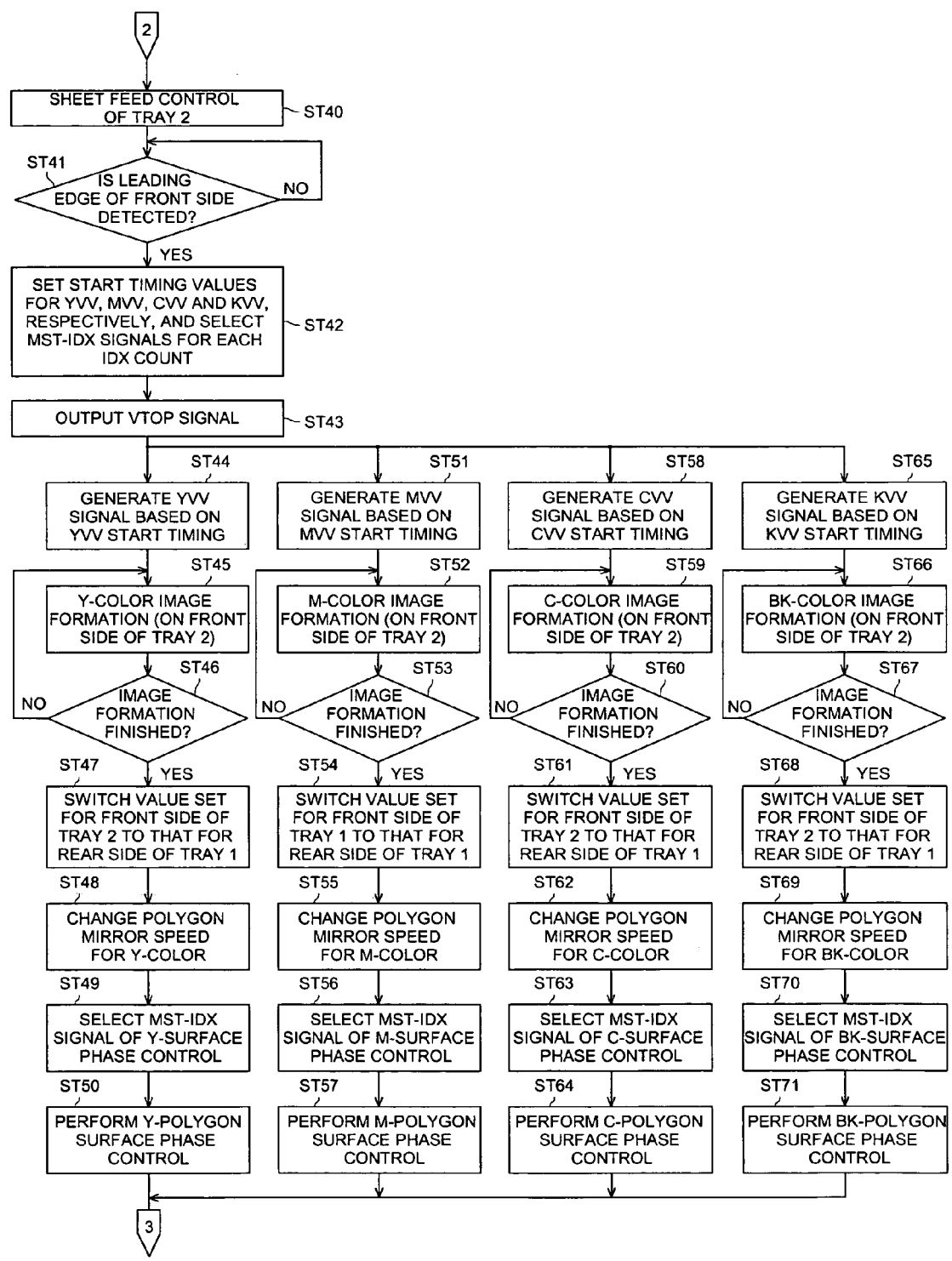
FIG. 19 is a flowchart representing the example (No. 3) of forming an image in the color copying machine 200 as a fourth embodiment.
Figure 20:
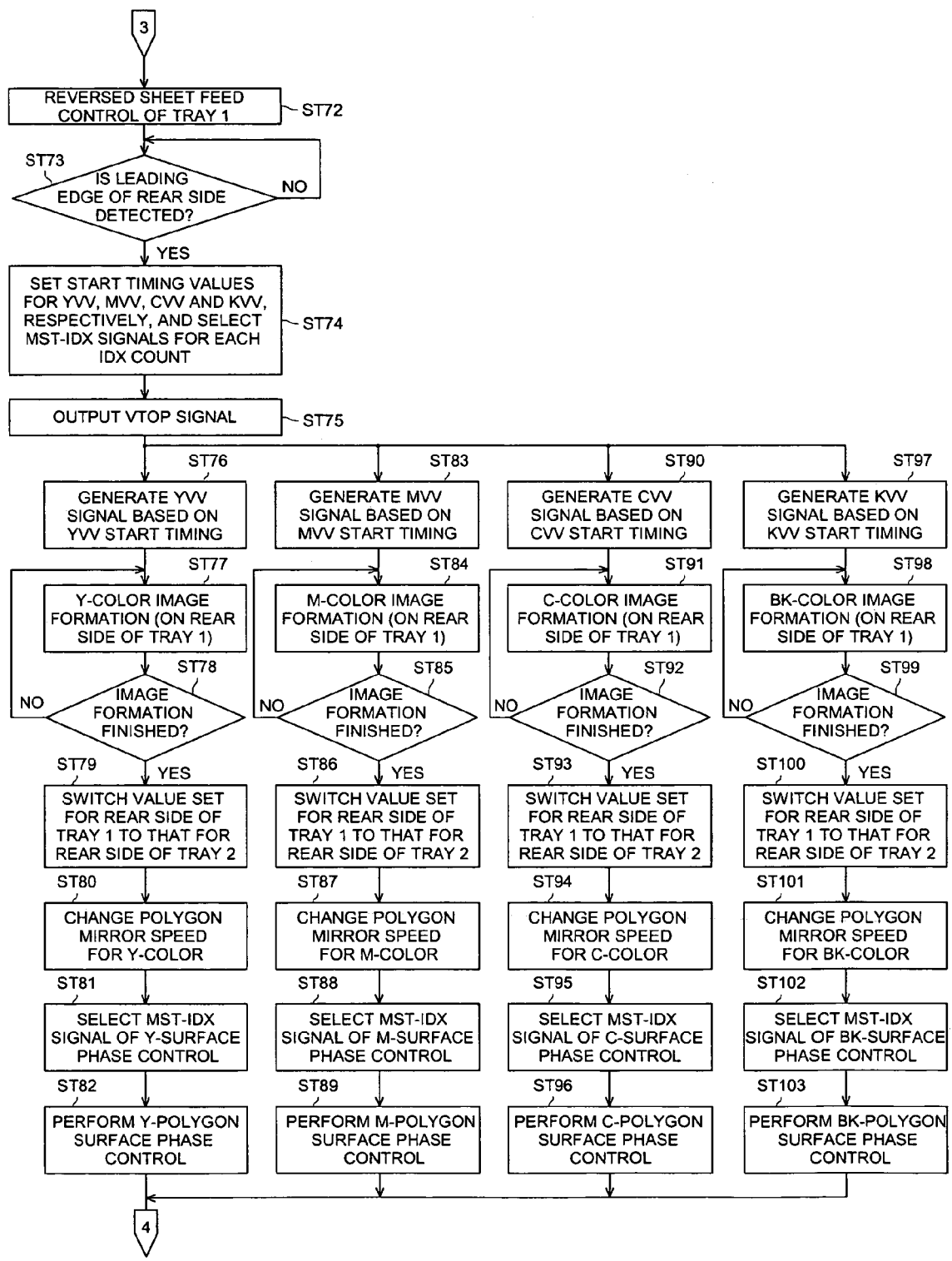
FIG. 20 is a flowchart representing the example (No. 4) of forming an image in the color copying machine 200 as a fourth embodiment.
Figure 21:
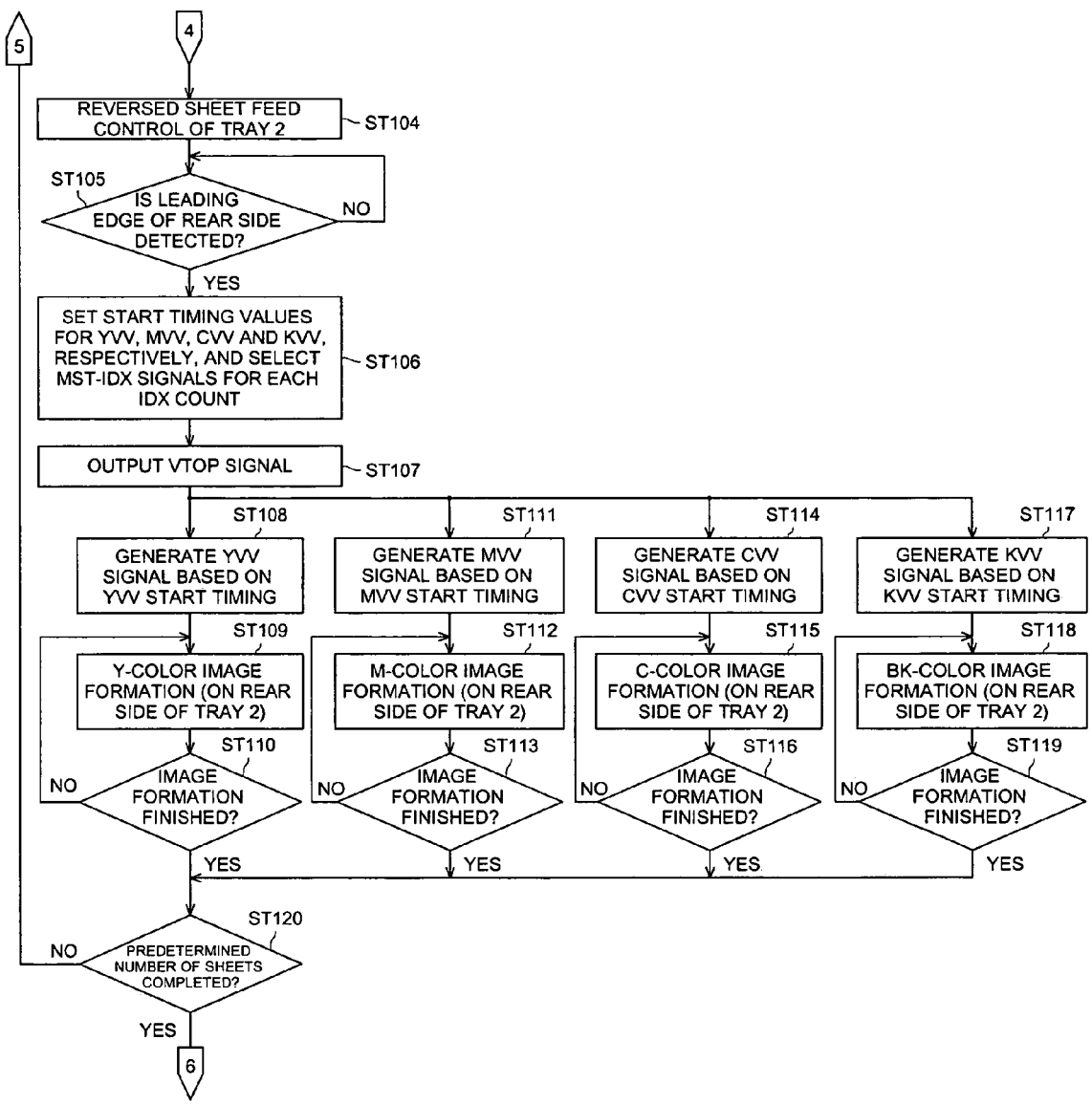
FIG. 21 is a flowchart representing the example (No. 5) of forming an image in the color copying machine 200 as a fourth embodiment.

For Y-color image formation on the front surface of paper 2 from the tray 2, the tray sheet feed system (not illustrated) controls sheet feed from the tray 2 in the Step ST40 of the flowchart shown in FIG. 19. This sheet feed control allows paper P2 to be fed out of the tray 2, and the paper P2 is conveyed to the resist roller 28. After that, proceeding to Step ST9, the CPU 55 checks if the leading edge of the front surface of paper P2 has been detected or not. In this case, the leading edge of the front surface of the paper P2 is detected by a leading edge sensor (not illustrated). The sensor output is maintained for a register or the like. Paper P2 waits on the resist roller 28.

In the Step ST42, the timing signal generation circuit 40 sets the YVV start timing value in the Y-VV forming circuit 41Y, the MVV start timing value in the M-VV forming circuit 41M, the CVV start timing value in the C-VV forming circuit 41C, and the KVV start timing value in the K-VV forming circuit 41K. At the same time, the timing signal generation circuit 40 selects the IDX count MST-IDX1 signal or MST-IDX2 signal for Y, M, C and BK colors.

After that, in the Step ST43, the CPU 55 outputs the VTOP signal to the timing signal generation circuit 40. In this case, the second VTOP signal shown in FIG. 16(A) rises at time T26 synchronized with the MST-IDX2 signal shown in FIG. 16(K). This VTOP signal is obtained by ANDing the following two signals—a leading edge detection signal for the paper P2 stored in advance in the register of the CPU 55 and the image leading edge signal of an image system (software), for example.

Then the Y-VV forming circuit 41Y allows the MST-IDX2 counter (not illustrated) to be activated in Step ST44, and the pulses of the MST-IDX2 signal are counted. The YVV start timing signal shown in FIG. 16(B) rises at time T27 synchronized with the MST-IDX2 signal. The Y-VV forming circuit 41Y causes the YVV signal to be generated based on this YVV start timing (STT-Y). In this example, the YVV signal shown in FIG. 16(C) rises at time T28 synchronized with the YIDX signal shown in FIG. 16(D). The YVV signal is outputted to the Y-color image memory 83.

After that, in Step ST45, processing of Y-color image formation is applied to the front surface of the paper P2 from the tray 2. In this case, while the YVV signal shown in FIG. 16(C) is on the H level, a Y-color image is formed on the paper P2 from the tray 2. After that, the YVV signal changes from the H level to L level in Step ST46, whereby completion of the Y-color image formation is detected.

Upon completion of Y-color image formation, the CPU 55 proceeds to the Step ST47 and switches the tray-2 front surface setting value over to the tray-1 rear surface setting value. In this example, paper P1 is recycled paper A, and magnification=−0.5% is set in the rear surface image formation mode. In this case, when the rotary speed of the polygon mirror 42Y is assumed as V2 in the image formation on the rear surface of paper P1, correction is made in such a way that the rotary speed of the polygon mirror at the time of tray-1 selection will be higher than the rotary speed VR at the reference time (V2>VR), based on magnification=−0.5%.

After that, the CPU 55 proceeds to the Step ST48 and controls the rotary speed of the Y-color polygon mirror 42Y based on the tray-1 rear surface setting value. Under this rotary speed control, the YIDX signal frequency fluctuates. Subsequent to the aforementioned rotary speed control, the CPU 55 goes to Step ST49 and selects the MST-IDX1 signal for Y-color surface phase control. After that, the CPU 55 goes to Step ST50 and controls the surface phase of the Y-color polygon mirror 42Y based on the MST-IDX1 signal.

[M-color Image Formation on Front Surface from Tray 2]

Parallel to the Y-color image formation from the aforementioned Step ST44 through Step ST50 so as to follow processing in each step, the M-VV forming circuit 41M allows the MST-IDX1 counter (not illustrated) to be activated in Step ST51, and the pulses of the MST-IDX2 signal are counted.

The MVV start timing signal rises synchronously with the MST-IDX2 signal. The M-VV forming circuit 41M causes the MVV signal to be generated based on this MVV start timing (STT-M). In this example, the MVV signal rises synchronously with the MIDX signal. The MVV signal is outputted to the M-color image memory.

After that, in Step ST52, processing of M-color image formation is applied to the front surface of the paper from the tray 2. In this case, while the MVV signal shown in FIG. 16(E) is on the H level, an M-color image is formed on the paper P2. After that, the MVV signal changes from the H level to L level in Step ST53, whereby completion of the M-color image formation is detected.

Upon completion of M-color image formation, the CPU 55 proceeds to the Step ST54 and switches the tray-2 front surface setting value over to the tray-1 rear surface setting value. In this example, paper P1 is recycled paper A, and magnification=−0.5% is set in the rear surface image formation mode. In this case, correction is made in such a way that the rotary speed in the rear surface image formation mode will be higher than the rotary speed VR at the reference time (V2>VR), based on magnification=−0.5%.

After that, the CPU 55 proceeds to the Step ST55 and controls the rotary speed of the M-color polygon mirror 42M based on the tray-1 rear surface setting value. Under this rotary speed control, the MIDX signal frequency fluctuates. Subsequent to the aforementioned rotary speed control, the CPU 55 goes to Step ST56 and selects the MST-IDX1 signal for M-color surface phase control. After that, the CPU 55 goes to Step ST57 and controls the surface phase of the M-color polygon mirror 42M based on the MST-IDX1 signal.

[C-color Image Formation on Front Surface from Tray 2]

Parallel to the M-color image formation from the aforementioned Step ST51 through Step ST57 so as to follow processing in each step, the C-VV forming circuit 41C allows the MST-IDX2 counter (not illustrated) to be activated in Step ST58, and the pulses of the MST-IDX2 signal are counted. The CVV start timing signal rises synchronously with the MST-IDX2 signal. The C-VV forming circuit 41C causes the CVV signal to be generated based on this CVV start timing (STT-C). In this example, the CVV signal rises synchronously with the CIDX signal. The CVV signal is outputted to the C-color image memory.

After that, in Step ST59, processing of C-color image formation is applied to the front surface of the paper P2 from the tray 1. In this case, while the CVV signal shown in FIG. 16(F) is on the H level, a C-color image is formed on the paper P1. After that, the CVV signal changes from the H level to L level in Step ST60, whereby completion of the C-color image formation is detected.

Upon completion of C-color image formation, the CPU 55 proceeds to the Step ST61 and switches the tray-2 front surface setting value over to the tray-1 rear surface setting value. In this example, paper P1 is recycled paper A, and magnification=−0.5% is set in the rear surface image formation mode. In this case, correction is made in such a way that the rotary speed in the front surface image formation mode will be higher than the rotary speed VR at the reference time (V2>VR), based on magnification=−0.5%.

After that, the CPU 55 proceeds to the Step ST62 and controls the rotary speed of the C-color polygon mirror 42C based on the tray-2 front surface setting value. Under this rotary speed control, the CIDX signal frequency fluctuates. Subsequent to the aforementioned rotary speed control, the CPU 55 goes to Step ST63 and selects the MST-IDX1 signal for C-color surface phase control. After that, the CPU 55 goes to Step ST32 and controls the surface phase of the C-color polygon mirror 42C based on the MST-IDX1 signal.

[BK-color Image Formation on Front Surface from Tray 2]

Parallel to the C-color image formation from the aforementioned Step ST58 through Step ST64 so as to follow processing in each step, the K-VV forming circuit 41K allows the MST-IDX2 counter (not illustrated) to be activated at the aforementioned time T26 in Step ST65, and the pulses of the MST-IDX1 signal are counted. The KVV start timing signal shown in FIG. 16(G) rises at time T29 synchronized with the MST-IDX2 signal. The K-VV forming circuit 41K causes the MVV signal to be generated based on this KVV start timing (STT-K). In this example, the KVV signal shown in FIG. 16(H) rises at time T30 synchronized with the KIDX signal shown in FIG. 16(I). The KVV signal is outputted to the BK-color image memory.

After that, in Step ST66, processing of BK-color image formation is applied to the front surface of the paper P2 from the tray 2. In this case, while the KVV signal shown in FIG. 16(H) is on the H level, a BK-color image is formed on the paper P2 from the tray 2. After that, the KVV signal changes from the H level to L level in Step ST67, whereby completion of the BK-color image formation is detected.

Upon completion of BK-color image formation, the CPU 55 proceeds to the Step ST68 and switches the tray-2 front surface setting value over to the tray-1 rear surface setting value. In this example, paper P1 is recycled paper A, and magnification=−0.5% is set in the front surface image formation mode. In this case, correction is made in such a way that the rotary speed in the front surface image formation mode will be higher than the rotary speed VR at the reference time (V2>VR), based on magnification=0.5%.

After that, the CPU 55 proceeds to the Step ST69 and controls the rotary speed of the K-color polygon mirror 42K based on the tray-1 rear surface setting value. Under this rotary speed control, the KIDX signal frequency fluctuates. Subsequent to the aforementioned rotary speed control, the CPU 55 goes to Step ST70 and selects the MST-IDX1 signal for C-color surface phase control. After that, the CPU 55 goes to Step ST71 and controls the surface-phase of the BK-color polygon mirror 42K based on the MST-IDX1 signal. After that, the CPU 55 goes to the Step ST72 of the flowchart shown in FIG. 20.

[Y-color Image Formation on Rear Surface from Tray 1]

A tray sheet feed system (not illustrated) controls tray-1—sheet reversing and feed in the Step ST72. In this tray-1 sheet reversing and feed control, the paper P1 with an image formed on the front surface is pulled out from the reverse/conveyance path 27B, and is conveyed to the resist roller 28, so that an Y-color image is formed on the rear surface of the paper P1 (an image already formed on the front surface).

Proceeding to the Step ST73, the CPU 55 checks if the leading edge of the rear surface of paper P1 has been detected or not. In this case, the leading edge of the rear surface of paper P1 as the third page is detected by a leading edge sensor (not illustrated). The sensor output is maintained for a register or the like. Paper P1 (rear surface) waits on the resist roller 28.

In the Step ST74, the timing signal generation circuit 40 sets the YVV start timing value in the Y-VV forming circuit 41Y, the MVV start timing value in the M-VV forming circuit 41M, the CVV start timing value in the C-VV forming circuit 41C, and the KVV start timing value in the K-VV forming circuit 41K. At the same time, the timing signal generation circuit 40 selects the IDX count MST-IDX1 signal or MST-IDX2 signal for Y, M, C and BK colors.

After that, in the Step ST75, the CPU 55 outputs the VTOP signal to the timing signal generation circuit 40. In this case, the third VTOP signal shown in FIG. 16(A) rises at time T31 synchronized with the MST-IDX1 signal shown in FIG. 16(J). This VTOP signal is obtained by ANDing the following two signals—a leading edge detection signal for the paper P1 stored in advance in the register of the CPU 55 and the image leading edge signal of an image system (software), for example. An MST-IDX1 counter (not illustrated) is activated at time T31 to count the pulses of the MST-IDX1 signal.

[Y-color Image Formation on Rear Surface from Tray 1]

The Y-VV forming circuit 41Y allows the YVV start timing signal to rise at time T22 synchronized with the MST-IDX1 signal. The Y-VV forming circuit 41Y allows the YVV signal to be generated based on this YVV start timing (STT-Y). In this example, the YVV signal shown in FIG. 16(C) rises at time T23 synchronized with the YIDX signal shown in FIG. 16(D). This YVV signal is outputted to the Y-color image memory 83.

After that, in Step ST77, processing of Y-color image formation is applied to the rear surface of the paper P1 from the tray 1. In this case, while the YVV signal shown in FIG. 16(C) is on the H level, a Y-color image is formed on the paper P1 from reverse/conveyance path 27B. After that, the YVV signal changes from the H level to L level in Step ST78, whereby completion of the Y-color image formation is detected.

Upon completion of Y-color image formation, the CPU 55 proceeds to the Step ST79 and switches the tray-1 rear surface setting value over to the tray-2 rear surface setting value. In this example, paper P2 is recycled paper A, and magnification=−0.6% is set in the rear surface image formation mode. In this case, when the rotary speed of the polygon mirror 42Y is assumed as V1 in the image formation on the rear surface of paper P1, correction is made in such a way that the rotary speed of the polygon mirror at the time of tray-2 selection will be higher than the rotary speed VR at the reference time (V2>VR), based on magnification=−0.6%.

After that, the CPU 55 proceeds to the Step ST80 and controls the rotary speed of the Y-color polygon mirror 42Y based on the tray-2 rear surface setting value. Under this rotary speed control, the YIDX signal frequency fluctuates. Subsequent to the aforementioned rotary speed control, the CPU 55 goes to Step ST81 and selects the MST-IDX2 signal for Y-color surface phase control. After that, the CPU 55 goes to Step ST82 and controls the surface phase of the Y-color polygon mirror 42Y based on the MST-IDX2 signal.

[M-color Image Formation on Rear Surface from Tray 1]

Parallel to the Y-color image formation from the aforementioned Step ST76 through Step ST82 so as to follow processing in each step, the M-VV forming circuit 41M allows the MST-IDX1 counter (not illustrated) to be activated in Step ST83, and the pulses of the MST-IDX1 signal are counted. The MVV start timing signal rises synchronously with the MST-IDX1 signal. The M-VV forming circuit 41M causes the MVV signal to be generated based on this MVV start timing (STT-M). In this example, the MVV signal rises synchronously with the MIDX signal. The MVV signal is outputted to the M-color image memory.

After that, in Step ST84, processing of M-color image formation is applied to the rear surface of the paper P1 from the reverse/conveyance path 27B. In this case, while the MVV signal shown in FIG. 16(E) is on the H level, an M-color image is formed on the paper P1. After that, the MVV signal changes from the H level to L level in Step ST85, whereby completion of the M-color image formation is detected.

Upon completion of M-color image formation, the CPU 55 proceeds to the Step ST86 and switches the tray-1 rear surface setting value over to the tray-2 rear surface setting value. In this example, paper P2 is recycled paper A, and magnification=−0.6% is set in the rear surface image formation mode. In this case, correction is made in such a way that the rotary speed in the rear surface image formation mode will be higher than the rotary speed VR at the reference time (V2>VR), based on magnification=−0.6%.

After that, the CPU 55 proceeds to the Step ST87 and controls the rotary speed of the M-color polygon mirror 42M based on the tray-2 rear surface setting value. Under this rotary speed control, the MIDX signal frequency fluctuates. Subsequent to the aforementioned rotary speed control, the CPU 55 goes to Step ST88 and selects the MST-IDX2 signal for M-color surface phase control. After that, the CPU 55 goes to Step ST89 and controls the surface phase of the M-color polygon mirror 42M based on the MST-IDX2 signal.

[C-color Image Formation on Rear Surface from Tray 1]

Parallel to the M-color image formation from the aforementioned Step ST83 through Step ST89 so as to follow processing in each step, the C-VV forming circuit 41C allows the MST-IDX1 counter (not illustrated) to be activated in Step ST90, and the pulses of the MST-IDX1 signal are counted. The CVV start timing signal rises synchronously with the MST-IDX1 signal. The C-VV forming circuit 41C causes the CVV signal to be generated based on this CVV start timing (STT-C). In this example, the CVV signal rises synchronously with the CIDX signal. The CVV signal is outputted to the C-color image memory.

After that, in Step ST91, processing of C-color image formation is applied to the rear surface of the paper P1 from the reverse/conveyance path 27B. In this case, while the CVV signal shown in FIG. 16(F) is on the H level, a C-color image is formed on the paper P1. After that, the CVV signal changes from the H level to L level in Step ST92, whereby completion of the C-color image formation is detected.

Upon completion of C-color image formation, the CPU 55 proceeds to the Step ST93 and switches the tray-1 rear surface setting value over to the tray-2 rear surface setting value. In this example, paper P2 is recycled paper A, and magnification=−0.6% is set in the front surface image formation mode. In this case, correction is made in such a way that the rotary speed in the front surface image formation mode will be higher than the rotary speed VR at the reference time (V2>VR), based on magnification=−0.6%.

After that, the CPU 55 proceeds to the Step ST94 and controls the rotary speed of the C-color polygon mirror 42C based on the tray-2 rear surface setting value. Under this rotary speed control, the CIDX signal frequency fluctuates. Subsequent to the aforementioned rotary speed control, the CPU 55 goes to Step ST95 and selects the MST-IDX2 signal for C-color surface phase control. After that, the CPU 55 goes to Step ST96 and controls the surface phase of the C-color polygon mirror 42C based on the MST-IDX2 signal.

[BK-color Image Formation on Rear Surface from Tray 1]

Parallel to the C-color image formation from the aforementioned Step ST90 through Step ST96 so as to follow processing in each step, the K-VV forming circuit 41K allows the MST-IDX1 counter (not illustrated) to be activated at the aforementioned time T31 in Step ST97, and the pulses of the MST-IDX1 signal are counted. The KVV start timing signal rises synchronized with the MST-IDX1 signal. The K-VV forming circuit 41K causes the MVV signal to be generated based on this KVV start timing (STT-K). In this example, the KVV signal raised synchronously with the KIDX signal is outputted to the BK-color image memory.

After that, in Step ST98, processing of BK-color image formation is applied to the front surface of the paper P1 from the reverse/conveyance path 27B. In this case, while the KVV signal is on the H level, a BK-color image is formed on the rear surface of paper P1 from the reverse/conveyance path 27B. After that, the KVV signal changes from the H level to L level in Step ST99, whereby completion of the BK-color image formation is detected.

Upon completion of BK-color image formation, the CPU 55 proceeds to the Step ST100 and switches the tray-1 rear surface setting value over to the tray-2 rear surface setting value. In this example, paper P2 is recycled paper A, and magnification=−0.6% is set in the rear surface image formation mode. In this case, correction is made in such a way that the rotary speed in the rear surface image formation mode will be lower than the rotary speed VR at the reference time (V2>VR), based on magnification=−0.6%.

After that, the CPU 55 proceeds to the Step ST101 and controls the rotary speed of the K-color polygon mirror 42K based on the tray-2 rear surface setting value. Under this rotary speed control, the KIDX signal frequency fluctuates. Subsequent to the aforementioned rotary speed control, the CPU 55 goes to Step ST102 and selects the MST-IDX2 signal for BK-color surface phase control. After that, the CPU 55 goes to Step ST103 and controls the surface phase of the BK-color polygon mirror 42K based on the MST-IDX2 signal. After that, the CPU 55 goes to the Step ST104 of the flowchart shown in FIG. 21.

[Y-color Image Formation on Rear Surface from Tray 2]

When a Y-color image is formed on rear surface of paper P2 from the reverse/conveyance path 27B, a sheet reversing and feed system (not illustrated) reverses and feeds the paper P2 from tray 2 having an image already formed on the front surface, in the Step ST104. In the tray-2 sheet reversing and feed control, paper P2 is pulled out from the reverse/conveyance path 27B and is fed to the resist roller 28. After that, proceeding to the Step ST105, the CPU 55 checks if the leading edge of the paper P2 has been detected or not. In this case, the leading edge of the front surface of paper P2 as the fourth page is detected by a leading edge sensor (not illustrated). The sensor output is maintained for a register or the like. Paper P2 waits on the resist roller 28.

In the Step ST106, the timing signal generation circuit 40 sets the YVV start timing value in the Y-VV forming circuit 41Y, the MVV start timing value in the M-VV forming circuit 41M, the CVV start timing value in the C-VV forming circuit 41C, and the KVV start timing value in the K-VV forming circuit 41K. At the same time, the timing signal generation circuit 40 selects the IDX count MST-IDX1 signal or MST-IDX2 signal for Y, M, C and BK colors.

After that, in the Step ST107, the CPU 55 outputs the VTOP signal to the timing signal generation circuit 40. In this case, the fourth VTOP signal (not illustrated) rises synchronously with the MST-IDX2. This VTOP signal is obtained by ANDing the following two signals—a leading edge detection signal for the paper P1 stored in advance in the register of the CPU 55 and the image leading edge signal of an image system (software), for example.

In the Step ST108, the Y-VV forming circuit 41Y allows the MST-IDX2 counter (not illustrated) to be activated, and the pulses of the MST-IDX2 signal are counted. The YVV start timing signal rises synchronously with the MST-IDX2 signal. The Y-VV forming circuit 41Y causes the YVV signal to be generated based on this YVV start timing (STT-Y). In this example, the YVV signal raised synchronously with the YIDX signal is outputted to the Y-color image memory 83.

After that, in Step ST109, processing of Y-color image formation is applied to the rear surface of the paper P2 from the reverse/conveyance path 27B. In this case, while the YVV signal is on the H level, a Y-color image is formed on the rear surface of paper P2. After that, the YVV signal changes from the H level to L level in Step S1110, whereby completion of the Y-color image formation is detected.

Upon completion of Y-color image formation, the CPU 55 goes to the Step ST120, and checks if a specified number of sheets has been reached or not. In this case, the CPU 55 monitors a sheet counter and compares the preset number of sheets with the counter output. Checking by the CPU 55 is done by detecting an agreement of these values. If a specified number of sheets have not been reached, the Y-color image formation terminates and the CPU 55 goes back to the Step ST7. This is intended to ensure improved image formation to achieve high speed in the processing of image formation.

[M-color Image Formation on Rear Surface from Tray 2]

Parallel to the Y-color image formation from the aforementioned Step ST108 through Step ST110 so as to follow processing in each step, the M-VV forming circuit 41M allows the MST-IDX1 counter (not illustrated) to be activated in Step ST111, and the pulses of the MST-IDX2 signal are counted. The MVV start timing signal rises synchronously with the MST-IDX2 signal. The M-VV forming circuit 41M causes the MVV signal to be generated based on this MVV start timing (STT-M). In this example, the MVV signal rises synchronously with the MIDX signal. The MVV signal is outputted to the M-color image memory.

After that, in Step ST112, processing of M-color image formation is applied to the rear surface of the paper P2 from the reverse/conveyance path 27B. In this case, while the MVV signal is on the H level, an M-color image is formed on the paper. After that, the YVV signal changes from the H level to L level in Step ST113, whereby completion of the M-color image formation is detected. Upon completion of the M-color image formation, the CPU 55 goes to the Step ST120 and checks if a specified number of sheets has been reached or not. If not reached, the CPU 55 goes back to Step ST7.

[C-color Image Formation on Rear Surface from Tray 2]

Parallel to the M-color image formation from the aforementioned Step ST111 through Step ST113 so as to follow processing in each step, the C-VV forming circuit 41C allows the MST-IDX2 counter (not illustrated) to be activated in Step ST114, and the pulses of the MST-IDX2 signal are counted. The CVV start timing signal rises synchronously with the MST-IDX2 signal. The C-VV forming circuit 41C causes the CVV signal to be generated based on this CVV start timing (STT-C). In this example, the CVV signal rises synchronously with the CIDX signal. The CVV signal is outputted to the C-color image memory.

After that, in Step ST115, processing of C-color image formation is applied to the rear surface of the paper P2 from the reverse/conveyance path 27B. In this case, while the CVV signal is on the H level, and the color image is formed on the paper. After that, the CVV signal changes from the H level to L level in Step ST116, whereby completion of the C-color image formation is detected. Upon completion of C-color image formation, the CPU 55 goes to the Step ST120, and checks if a specified number of sheets has been reached or not. If the specified number of sheets has not been reached, the CPU 55 goes back to the Step ST7.

[BK-color Image Formation on Rear Surface from Tray 2]

Parallel to the C-color image formation from the aforementioned Step ST114 through Step ST119 so as to follow processing in each step, the K-VV forming circuit 41K allows an earlier activated MST-IDX1 counter to count the pulses of the MST-IDX2 signal. The KVV start timing signal rises synchronously with the MST-IDX1 signal. The K-VV forming circuit 41K causes the MVV signal to be generated based on this KVV start timing (STT-K). In this example, the KVV signal raised synchronously with the KIDX signal is outputted to the BK-color image memory.

After that, in Step ST118, processing of BK-color image formation is applied to the rear surface of the paper P2 from the reverse/conveyance path 27B. In this case, while the KVV signal is on the H level, a BK-color image is formed on the rear surface of paper P2 from the reverse/conveyance path 27B. After that, the KVV signal changes from the H level to L level in Step ST119, whereby completion of the BK-color image formation is detected. Upon completion of BK-color image formation, the CPU 55 goes back to the Step ST120 and the CPU 55 checks if the specified number of sheets has been reached. If the specified number of sheets has not been reached, the CPU 55 goes back to the Step ST7.

In Step ST7, the CPU 55 switches the tray-2 rear surface setting value over to the tray-1 front surface setting value. In this example, paper P1 is plain paper A, and magnification=+ 0.3 is set in the front surface image formation mode. In this case, correction is made in such a way that the rotary speed in the front surface image formation mode will be lower than the rotary speed VR at the reference time (V1<VR), based on magnification=+0.3%. After that, the aforementioned Steps ST7 through ST120 are repeated until the specified number of sheets has been reached.

If the specified number of sheets has been reached, the CPU 55 goes to Step ST121 shown in FIG. 17. In Step ST121, the CPU 55 checks if the print reservation job has been completed or not. In this case, the CPU 55 searches for a list of print reservation job information, and checks if any print reservation job is present or not. If other print reservation jobs have been listed up, the CPU 55 goes back to the Step ST2, and executes the aforementioned page checking header processing, detection of sheet feed tray change request in Step ST3, checking of paper kind-based control table in Step ST4, and detection, in Step ST5, of whether magnification adjustment is required or not. If any print reservation job information is not found, the CPU 55 determines that there is no print reservation job and terminates image formation.

As described above, in the color copying machine 200 as the fourth embodiment of the present invention, when a color image is formed on a predetermined sheet of paper, the pseudo index forming circuit 12' creates an MST-IDX1 signal and MST-IDX2 signal that can be set to a predetermined cycle with respect to the IDX signal whose cycle fluctuates under the control of rotary speed and surface phase of the polygon mirror 42Y and others, wherein this signal is a reference signal used to scan the light beam on the photoconductor drums 1Y through 1K with light beam. Based on this arrangement, the CPU 55 alternately selects the IDX signal for each color and MST-IDX1 signal and MST-IDX2 signal created by the pseudo index forming circuit 12, thereby controlling color image formation on the specified surface of paper P1 and paper P2.

Upon completion of image formation in each color, this arrangement allows the rotary speed change and surface phase change of the polygon mirror 42Y and others to be controlled, based on the MST-IDX1 signal and MST-IDX2 signal set to a predetermined cycle, without depending on the IDX signal of each color. This control procedure provides alignment between the timing of phase change control of the polygon mirror for the relevant color and the timing of rotary speed control of the polygon mirror for other colors, without having to wait for the stabilization of the rotary speed of the polygon mirror 42Y set to a reference color, and without having to wait for the adjustment of timing prior to startup of image formation in all other colors.

This arrangement eliminates the adverse effect of the PLL lock wait time as in the prior art, and permits the next image formation on the next paper P2 to be started, without having to wait for termination of image formation in the final color. It also ensures color image formation without the productivity being reduced.

Embodiment 5

Figure 22:
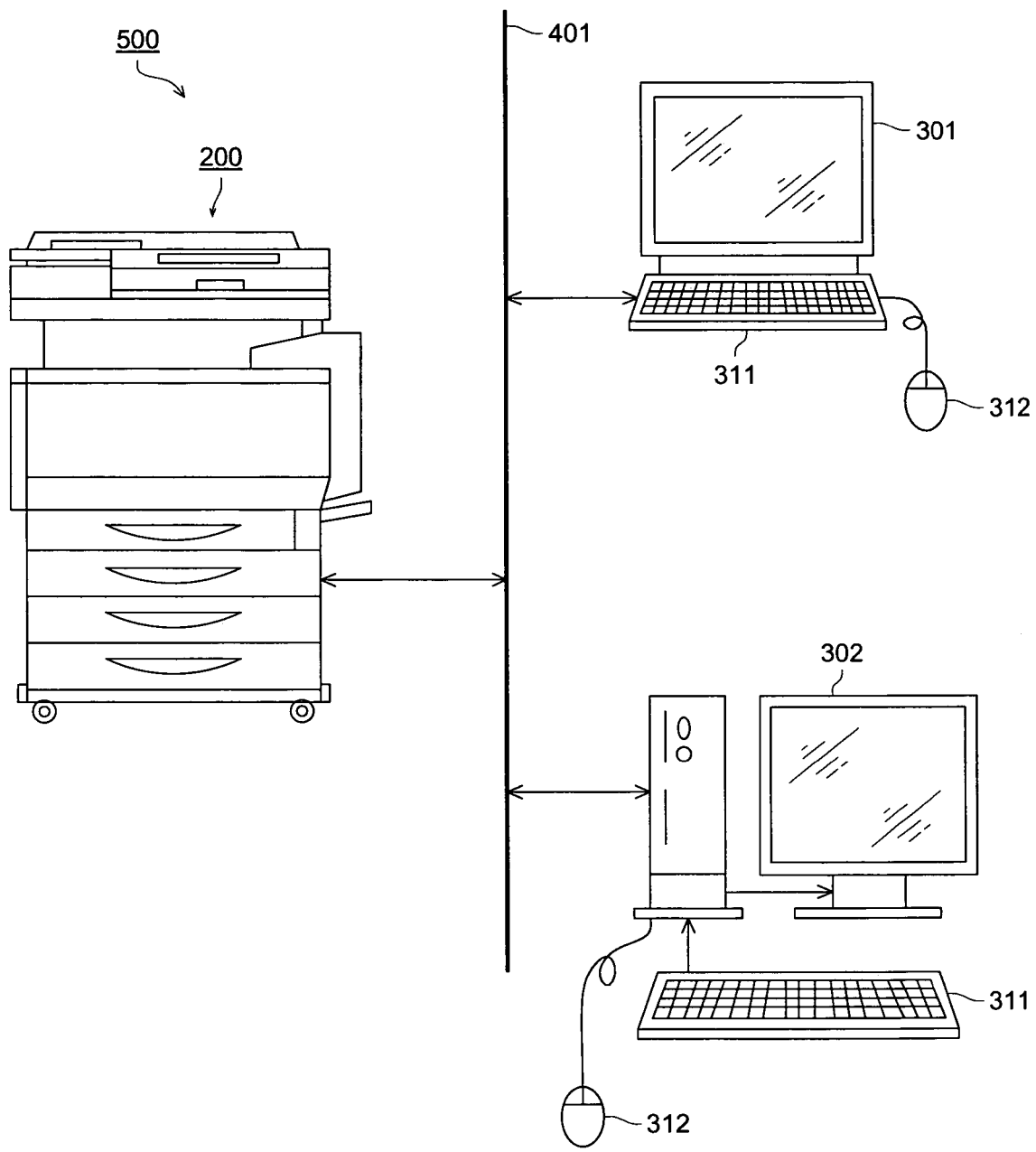
FIG. 22 is a flowchart representing the example of forming an image in the color copying machine 200 as a the fifth embodiment.
Figure 23:
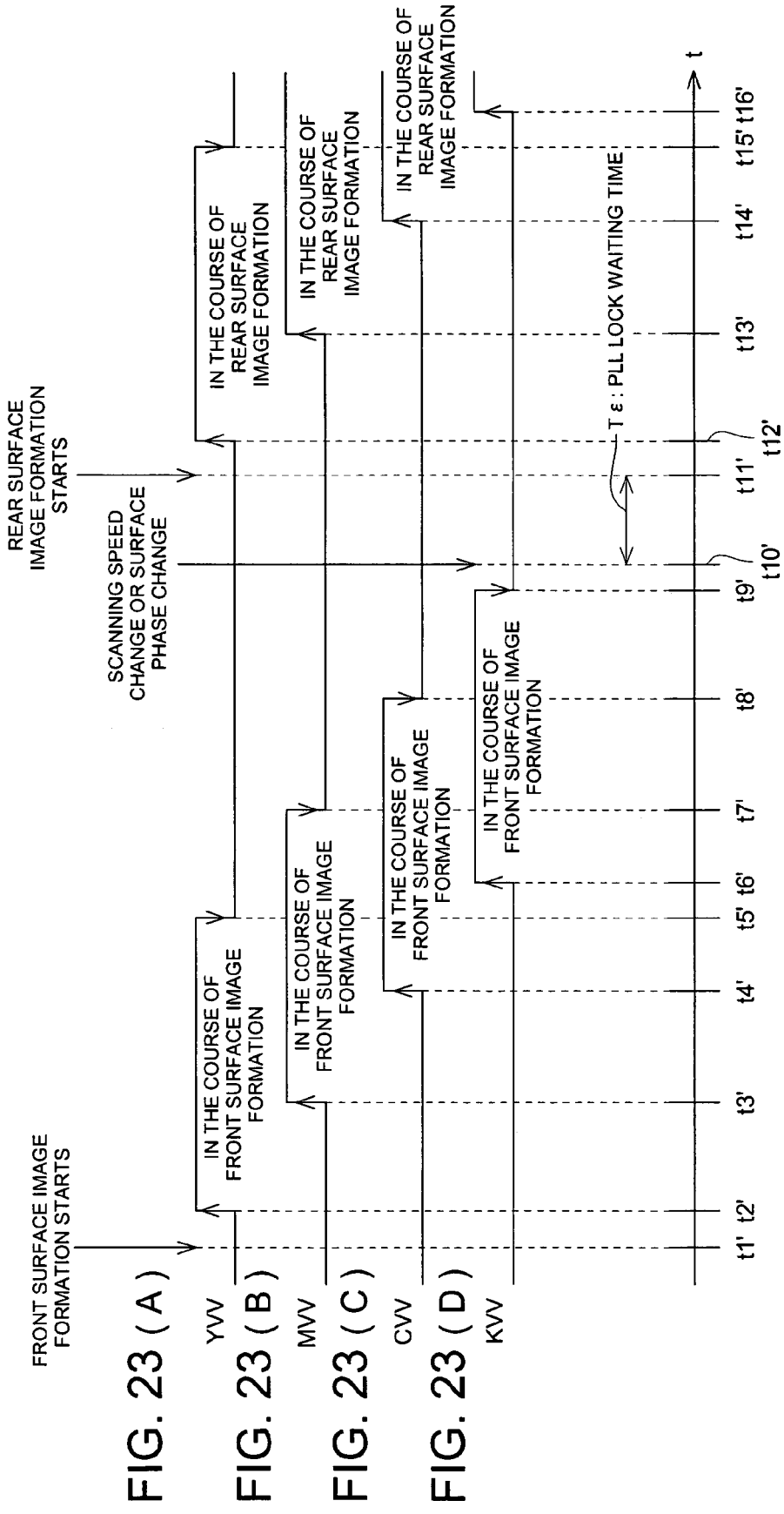
FIGS. 23(A) through (D) are time charts representing an example of operations in the duplex image formation mode of an Y, M, C and BK-color image writing unit of the prior art.
Figure 24:
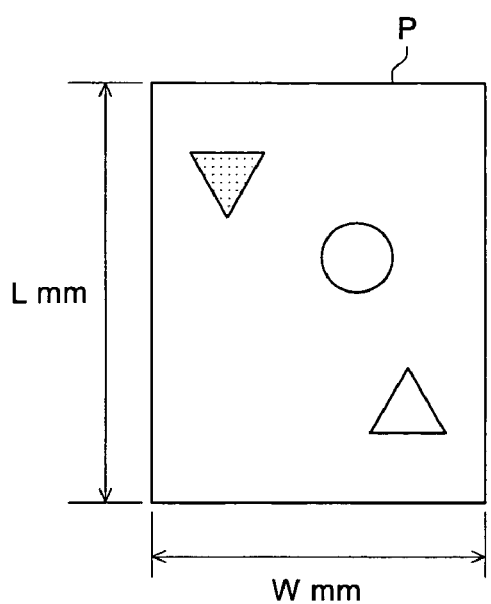
FIGS. 24(A) through (B) are explanatory diagrams representing an example of shrinkage of paper in the duplex image formation mode.
Figure 24:
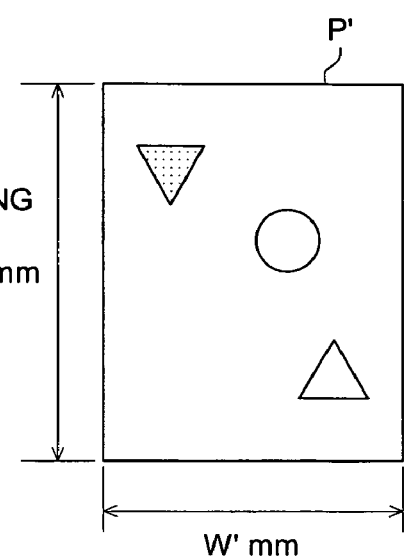

FIG. 22 is a flowchart representing the example of forming an image in the color copying machine 500 as a fifth embodiment of the present invention.

The image formation system shown in FIG. 22 is equipped with a color copying machine 200 as an example of the color image formation apparatus, and is designed to form a color image on a predetermined sheet of paper. The color image formation apparatus uses the color copying machine 200 described with reference to the second through fourth embodiments, in addition to the color copying machine 100 described with reference to the first embodiment.

This system 500 comprises an information processing apparatus in addition to the color copying machine 200. The information processing apparatus uses a notebook-sized computer (hereinafter referred to as a PC) 301, a desktop PC 302 and others. The PC 301 and desktop PC 302 are used to provide an interface function for controlling the input/output of the color copying machine 200. For example, the PC 301 is operated for selecting the image formation conditions and sheet feed tray. A keyboard 311 and a mouse 312 are operated when selecting plain paper, recycled paper, coated paper, OHT paper and the sheet feed tray accommodating the paper, whereby image formation conditions are set.

The color copying machine 200 is connected with the PC 301 and desktop PC 302 through a communication means 401. LAN (Local Area Network) communication system or Internet is used as the communication means 401. The image formation conditions and sheet feed tray selection information set on the PC 301 are outputted to the color copying machine 200 as operation data through the communication means 401.

Based on the operation data received from the PC 301, the aforementioned color copying machine 200 controls color image formation on a specified surface of paper. As described above with reference to the second through fourth embodiments, the color copying machine 200 has a Y-color image writing means 3Y, an M-color image writing means 3M, a C-color image writing means 3C and a K-color image writing means 3K, and forms a color image on a prescribed sheet of paper. In this case, the color copying machine 200 is further provided with a pseudo index forming circuit 12 for creating the MST-IDX1 signal and MST-IDX2 signal that can be set to a specified cycle, with respect to the IDX signal with its cycle changed by the control of the rotary speed and surface phase of the polygon mirror, in which these signals are reference signals for scanning a light beam on the photoconductor drum 1Y; and a control means 15 for controlling the color image formation on a predetermined surface of the sheet of paper, based on the MST-IDX1 signal and MST-IDX2 signal (FIG. 12).

For example, in the color copying machine 200, when forming images on both sides of a predetermined paper P in conformity to the kind of paper set by the PC 301 and others or the preset sheet feed tray, the MST-IDX1 signal or MST-IDX2 signal is selected alternately, and color image formation on a predetermined surface of paper P is controlled based on the MST-IDX1 signal or MST-IDX2 signal and IDX signal.

As described above, in the image formation system as the fifth embodiment of the present invention, the color copying machine 200 of the present embodiment is connected, for example with the PC 301 for providing means of input/output for the color copying machine 200, through a communication means 401 such as LAN. Based on this arrangement, the color copying machine 200 allows color images to be formed on a predetermined sheet of paper through the input/output control of the PC 301.

In the color copying machine 200 to which an image formation instruction is given by the PC 301 and others, processing of image formation can be applied under the control of the changes in the rotary speed and surface phase of the polygon mirror and others, upon termination of image formation in each color, according to the MST-IDX1 signal and MST-IDX2 signal set to a predetermined cycle, without depending on the IDX signal. This arrangement makes it possible to control the changes in the rotary speed and phase of the polygon mirror of the relevant color, without having to wait for the stabilization of the rotary speed of the polygon mirror set to a reference color, and without having to wait for the adjustment of timing prior to startup of image formation in all other colors.

Thus, this arrangement eliminates the adverse effect of the PLL lock wait time as in the prior art, and permits the image formation on the next paper to be started, without having to wait for termination of final color image formation on the relevant paper. This arrangement further allows a PC 301 or the like to control the color copying machine 200 capable of color image formation without the productivity being reduced.

According to the aforementioned embodiment, a signal generation means generates a pseudo main scanning reference signal having a fixed cycle when a color image is formed on paper. Based on this arrangement, the control means controls image formation on a predetermined surface of paper based on: the main scanning reference signal whose cycle fluctuates under the control of the polygon mirror rotary speed and surface phase; and a pseudo main scanning reference signal generated by the signal generation means, wherein the aforementioned main scanning reference signal is a reference signal for scanning a light beam on an image carrier.

For example, when the signal generation means generates the first and second pseudo main scanning reference signals, the control means selects the first and second pseudo main scanning reference signals independently for each color, and controls image formation on a predetermined surface of paper according to the first or second pseudo main scanning reference signals, and main scanning reference signal. This makes it possible to control the changes in polygon mirror rotary speed and surface phase, based on the pseudo main scanning reference signal selected independently for each color, upon completion of image formation in each color.

Further, according to the aforementioned embodiment, when a color image is formed on paper, the signal generation means generates a pseudo main scanning reference signal having a fixed cycle. Based on this arrangement, the control means controls image formation on a predetermined surface of paper, according to the main scanning reference signal generated by detection of a light beam scanned by the polygon mirror and the pseudo main scanning reference signal.

For example, when the signal generation means generates the first and second pseudo main scanning reference signals, the control means selects the first and second pseudo main scanning reference signals independently for each color, and controls color image formation on a predetermined surface of paper according to the first or second pseudo main scanning reference signals, and main scanning reference signal. This makes it possible to control the changes in polygon mirror rotary speed and surface phase, based on the pseudo main scanning reference signal selected independently for each color, upon completion of image formation in each color.

Further, the image formation system of the aforementioned embodiment control the changes in polygon mirror rotary speed and surface phase, based on the pseudo main scanning reference signal set to a predetermined cycle by an information procedure apparatus, upon completion of image formation in each color.

As described above, the aforementioned embodiment makes it possible to control the changes in the rotary speed and phase of the polygon mirror of the relevant color, without having to wait for the stabilization of the rotary speed of the polygon mirror set to a reference color, and without having to wait for the adjustment of timing prior to startup of image formation in all other colors. This arrangement ensures color image formation without the productivity being reduced.

What is claimed is:

1. A color image forming apparatus for forming a color image on a recording medium, comprising:
   a plurality of image carriers for a plurality of colors;
   a plurality of polygon motors for driving a plurality of polygon mirrors;
   a light beam drive circuit for emitting and driving a light beam in response to an image signal for a given color to irradiate the light beam onto one of the polygon mirrors so that the light beam scans and exposes one of the image carriers;
   an index sensor provided on a scanning path of the light beam for receiving the light beam and outputting a main scanning reference signal for the given color;
   a signal source for generating a reference clock signal;
   a pseudo index forming circuit connected to the signal source for generating a pseudo main scanning reference signal having a fixed cycle, by dividing frequency of the reference clock signal generated from the signal source;
   a polygon drive clock generation circuit connected to the signal source for generating a drive clock signal to drive a polygon motor for the given color, by dividing frequency of the reference clock signal generated from the signal source;
   a controller for adjusting the drive clock signal so that a phase difference between the pseudo main scanning reference signal and the main scanning reference signal which has been outputted from the index sensor for the given color is equal to a prescribed phase difference; and
   a signal forming device which forms a plurality of pseudo main scanning reference signals;
   wherein the controller controls image formation on a predetermined surface of the recording medium according to the main scanning reference signal and the plurality of pseudo main scanning reference signals, and
   wherein the signal forming device forms a first pseudo main scanning reference signal having a first cycle and a second pseudo main scanning reference signal having a second cycle different from the first cycle from among the plurality of pseudo main scanning reference signals, and the controller selects one of the first and second pseudo main scanning reference signals, and generates an image formation start trigger signal based on the selected pseudo main scanning reference signal.

2. The color image forming apparatus of claim 1, wherein a relation between one cycle of the drive clock signal and one cycle of the pseudo main scanning reference signal is set to the following expression, $$Tp \times n = Ti \times m \ (n \leq m)$$

where Tp represents a cycle of the drive clock signal, Ti represents a cycle of the pseudo main scanning reference signal, n represents a natural number, and m represents a number of surfaces of the one of the polygon mirrors, and
wherein the drive clock signal and the pseudo main scanning reference signal are formed by a signal processing so that the reference clock signal obtained from the signal source satisfies the set expression.

3. The color image forming apparatus of claim 1, further comprising:
an image forming device which comprises the image carriers and the polygon mirrors, and which forms the image on the predetermined surface of the recording medium according to main scanning reference signals and the pseudo main scanning reference signals,
wherein the image forming device comprises image forming units for yellow, magenta, cyan and black colors, respectively, and comprises polygon motors for driving the respective polygon mirrors for each of the image forming units, and
wherein the controller controls each of frequencies of drive clock signals to be supplied to the polygon motors individually for each of the image forming units for each color.

4. The color image forming apparatus of claim 3, wherein the controller controls a surface phase of each of the polygon mirrors driven by each of the polygon motors individually for each of the image forming units for each color.

5. The color image forming apparatus of claim 4, wherein the controller controls the surface phase of each of the polygon mirrors for each color according to a single pseudo main scanning reference signal.

6. The color image forming apparatus of claim 1, further comprising a setting device which selects and sets at least one of a type of the recording medium and a medium feeding device in which the recording medium of the type is stored,
wherein the controller controls image formation on the predetermined surface of the recording medium according to the at least one of the type of the recording medium and the medium feeding device, which has been selected and set by the setting device.

7. The color image forming apparatus of claim 1, wherein the controller controls an image size for at least one of a type of the recording medium and a medium feeding device.

8. The color image forming apparatus of claim 1, wherein the controller corrects image sizes on front and rear sides of the recording medium, and registrates images on the front and rear sides of the recording medium in response to at least one of a type of the recording medium which is set, and a medium feeding device which is set.

9. The color image forming apparatus of claim 1, further comprising an image forming device which comprises the image carriers and the polygon mirrors, and which forms the image according to main scanning reference signals and the pseudo main scanning reference signals,
wherein when the image forming device starts forming the image, the controller generates the image formation start trigger signal according to the selected pseudo main scanning reference signal.

10. The color image forming apparatus of claim 9, wherein the signal forming device:
counts a number of pulses of the pseudo main scanning reference signals,
generates an effective image area start timing for each color according to the number of pulses counted,
counts a number of pulses of the main scanning reference signal for each color according to the effective image area start timing for each color, and
forms a sub-scanning effective area signal for each color according to the number of pulses of the main scanning reference signal for each color that are counted.

11. The color image forming apparatus of claim 1, further comprising an image forming device which comprises the image carriers and the polygon mirrors, and which forms the image according to main scanning reference signals and the pseudo main scanning reference signals,
wherein the controller selects any one of the plurality of pseudo main scanning reference signals, and the controller generates the image formation start trigger signal according to the selected pseudo main scanning reference signal to start image formation of the image forming device.

12. The color image forming apparatus of claim 11, wherein the controller generates a first image formation start trigger signal for a front surface of the recording medium according to the first pseudo main scanning reference signal among the plurality of pseudo main scanning reference signals, and generates a second image formation start trigger signal for a rear surface of the recording medium according to the second pseudo main scanning reference signal.

13. The color image forming apparatus of claim 12, wherein when the controller changes a rotary speed of one of the polygon mirrors from that for the front surface of the recording medium to that for the rear surface thereof in order of a completion of image formation on the front surface for each color, by controlling a frequency of the polygon drive clock for each color, the controller controls a surface phase of said one of the polygon mirrors with respect to the second pseudo main scanning reference signal.

14. The color image forming apparatus of claim 11, further comprising a setting device which selects and sets at least one of a type of the recording medium and a medium feeding device in which the recording medium of the type is stored,
wherein when at least one of a first type of the recording medium and a first medium feeding device is selected and set by the setting device, the controller generates a first image formation start trigger signal according to the first pseudo main scanning reference signal, and
wherein when the at least one of the first type of the recording medium and the first medium feeding device is switched to at least one of a second type of the recording medium and a second medium feeding device, the controller generates a second image formation start trigger signal according to the second pseudo main scanning reference signal.

15. The color image forming apparatus of claim 1, wherein the signal forming device selects the first and second pseudo main scanning reference signals from the plurality of pseudo main scanning reference signals, and the controller selects one of the first and second pseudo main scanning reference signals for each color, and the controller detects a phase difference between the selected one of the first and second pseudo main scanning reference signals and main scanning reference signals, adjusts the corresponding drive clock signals, and forms the image based on the adjustment.

16. The color image forming apparatus of claim 1, wherein when the signal forming device selects the first and second pseudo main scanning reference signals from the plurality of pseudo main scanning reference signals, the controller selects one of the first and second pseudo main scanning reference signals in response to a process line speed, and the controller controls image formation in response to the process line speed on the predetermined surface of the recording medium based on the one of the first and second pseudo main scanning reference signals and main scanning reference signals.

17. The color image forming apparatus of claim 1, wherein the controller selects any one of the plurality of pseudo main scanning reference signals, and controls a surface phase of the polygon mirrors based on the selected pseudo main scanning reference signal for each color.

18. The color image forming apparatus of claim 1, wherein the signal forming device:
counts a number of pulses of the first pseudo main scanning reference signal,
determines an effective image area start timing of a front surface of the recording medium for each color according to the number of pulses of the first pseudo main scanning reference signal counted,
counts a first number of pulses of the main scanning reference signal for each color according to the determined effective image area start timing, and
forms a sub-scanning effective area signal of the front surface of the recording medium for each color according to the first number of pulses counted, and
wherein the signal forming device:
counts a number of pulses of the second pseudo main scanning reference signal,
determines an effective image area start timing of a rear surface of the recording medium for each color according to the number of pulses of the second pseudo main scanning reference signal counted,
counts a second number of pulses of the main scanning reference signal for each color according to the determined effective image area start timing, and
forms a sub-scanning effective area signal of the rear surface of the recording medium for each color according to the second number of pulses counted.

19. The color image forming apparatus of claim 18, wherein when the controller controls a surface phase of one of the polygon mirrors, the controller selects any one of the plurality of pseudo main scanning reference signals, and the controller controls the surface phase of said one of the polygon mirrors based on the selected pseudo main scanning reference signal.

20. The color image forming apparatus of claim 1, wherein the signal source is a crystal oscillator.

21. The color image forming apparatus of claim 1, wherein the signal forming device forms the plurality of pseudo main scanning reference signals according to a magnification when image formation is carried out on a front surface and a rear surface of the recording medium.

22. An image forming system comprising:
(i) a color image forming apparatus for forming a color image on a recording medium, wherein the color image forming apparatus comprises:
a plurality of image carriers for a plurality of colors;
a plurality of polygon motors for driving a plurality of polygon mirrors;
a light beam drive circuit for emitting and driving a light beam in response to an image signal for a given color to irradiate the light beam onto one of the polygon mirrors so that the light beam scans and exposes one of the image carriers;
an index sensor provided on a scanning path of the light beam for receiving the light beam and outputting a main scanning reference signal for the given color;
a signal source for generating a reference clock signal;
a pseudo index forming circuit connected to the signal source for generating a pseudo main scanning reference signal having a fixed cycle, by dividing frequency of the reference clock signal generated from the signal source;
a polygon drive clock generation circuit connected to the signal source for generating a drive clock signal to drive a polygon motor for the given color, by dividing frequency of the reference clock signal generated from the signal source;
a controller for adjusting the drive clock signal so that a phase difference between the pseudo main scanning reference signal and the main scanning reference signal which has been outputted from the index sensor for the given color is equal to a prescribed phase difference; and
a signal forming device which forms a plurality of pseudo main scanning reference signals;
wherein the controller controls image formation on a predetermined surface of the recording medium according to the main scanning reference signal and the plurality of pseudo main scanning reference signals, and
wherein the signal forming device forms a first pseudo main scanning reference signal having a first cycle and a second pseudo main scanning reference signal having a second cycle different from the first cycle from among the plurality of pseudo main scanning reference signals, and the controller selects one of the first and second pseudo main scanning reference signals, and generates an image formation start trigger signal based on the selected pseudo main scanning reference signal;
(ii) an information processing apparatus which controls an input and an output of the color image forming apparatus; and
(iii) a communication device which connects the color image forming apparatus with the information processing apparatus.

23. The image forming system of claim 22, wherein the controller controls the image formation on the predetermined surface on the recording medium according to at least one of information in relation to a type of the recording medium transmitted from the information processing apparatus and information in relation to a medium feeding device in which the recoding medium is stored.

24. The image forming system of claim 22, wherein the signal forming device forms the plurality of pseudo main scanning reference signals according to a magnification when image formation is carried out on a front surface and a rear surface of the recording medium.

25. A color image forming apparatus for forming a color image on a recording medium, comprising:
an image carrier;
a polygon mirror;
a signal forming device which forms a pseudo main scanning reference signal that has a fixed cycle;

a signal source which generates a reference clock signal, and which is connected to the signal forming device to form a polygon drive clock signal for driving the polygon mirror and the pseudo main scanning reference signal according to the reference clock signal; and a controller which detects a phase difference between the pseudo main scanning reference signal and a main scanning reference signal that is formed by detecting a light beam that is scanned by the polygon mirror, and which adjusts the polygon drive clock signal for each color so as to obtain a prescribed phase difference of the polygon mirror between each color, thereby controlling image formation based on the adjustment;

wherein the signal forming device forms a plurality of pseudo main scanning reference signals, wherein the controller controls image formation on a predetermined surface of the recording medium according to the main scanning reference signal and the plurality of pseudo main scanning reference signals, wherein the signal forming device forms a first pseudo main scanning reference signal having a first cycle and a second pseudo main scanning reference signal having a second cycle different from the first cycle from among the plurality of pseudo main scanning reference signals, and the controller selects one of the first and second pseudo main scanning reference signals, and generates an image formation start trigger signal based on the selected pseudo main scanning reference signal;

wherein a relation between one cycle of the polygon drive clock signal and one cycle of the pseudo main scanning reference signal is set to the following expression, $$Tp \times n = Ti \times m \ (n \leq m)$$

where Tp represents a cycle of the polygon drive clock signal, Ti represents a cycle of the pseudo main scanning reference signal, n represents a natural number, and m represents a number of surfaces of the polygon mirror, and wherein the signal forming device forms the polygon drive clock signal and the pseudo main scanning reference signal by a signal processing so that the reference clock signal obtained from the signal source satisfies the set expression.

26. The color image forming apparatus of claim 25, wherein the signal forming device forms the plurality of pseudo main scanning reference signals according to a magnification when image formation is carried out on a front surface and a rear surface of the recording medium.

* * * * *